United States Patent
Koyama et al.

(10) Patent No.: US 11,668,988 B2
(45) Date of Patent: Jun. 6, 2023

(54) SEMICONDUCTOR DEVICE AND METHOD FOR MANUFACTURING THE SAME

(71) Applicant: Semiconductor Energy Laboratory Co., Ltd., Atsugi (JP)

(72) Inventors: Jun Koyama, Sagamihara (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 257 days.

(21) Appl. No.: 15/342,410

(22) Filed: Nov. 3, 2016

(65) Prior Publication Data

US 2017/0059909 A1    Mar. 2, 2017

Related U.S. Application Data

(63) Continuation of application No. 14/632,075, filed on Feb. 26, 2015, now Pat. No. 9,488,890, which is a (Continued)

(30) Foreign Application Priority Data

Oct. 30, 2009    (JP) .............................. JP2009-250909

(51) Int. Cl.
*G02F 1/1368*    (2006.01)
*G02F 1/1362*    (2006.01)
(Continued)

(52) U.S. Cl.
CPC ............ *G02F 1/1368* (2013.01); *G02F 1/137* (2013.01); *G02F 1/1362* (2013.01); (Continued)

(58) Field of Classification Search
CPC ............. G02F 1/1368; G02F 1/134309; G02F 1/134336; G02F 1/13439; G02F 1/13454; (Continued)

(56) References Cited

U.S. PATENT DOCUMENTS 5,567,967 A * 10/1996 Kusumoto .......... G02F 1/13454
257/349
5,731,856 A    3/1998 Kim et al.
(Continued)

FOREIGN PATENT DOCUMENTS

EP    1737044 A    12/2006
EP    2226847 A    9/2010
(Continued)

OTHER PUBLICATIONS

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

(Continued)

*Primary Examiner* — Edward J Glick
*Assistant Examiner* — David Y Chung
(74) *Attorney, Agent, or Firm* — Robinson Intellectual Property Law Office; Eric J. Robinson

(57) ABSTRACT

When a pixel portion and a driver circuit are formed over one substrate and a counter electrode is formed over an entire surface of a counter substrate, the driver circuit may be adversely affected by an optimized voltage of the counter electrode. A semiconductor device according to the present invention has a structure in which: a liquid crystal layer is provided between a pair of substrates; one of the substrates is provided with a pixel electrode and a driver circuit; the other of the substrates is a counter substrate which is provided with two counter electrode layers in different potentials; and one of the counter electrode layers overlaps with the pixel electrode with the liquid crystal layer therebetween and the other of the counter electrode layers overlaps with the driver circuit with the liquid crystal layer (Continued)

therebetween. An oxide semiconductor layer is used for the driver circuit.

19 Claims, 18 Drawing Sheets

Related U.S. Application Data continuation of application No. 12/912,076, filed on Oct. 26, 2010, now Pat. No. 8,988,623.

(51) Int. Cl.
```
G02F 1/1345      (2006.01)
G02F 1/1343      (2006.01)
G02F 1/137       (2006.01)
G02F 1/1333      (2006.01)
G02F 1/1337      (2006.01)
G02F 1/133       (2006.01)
G02F 1/1335      (2006.01)
G02F 1/1339      (2006.01)
```
(52) U.S. Cl.
CPC ...... *G02F 1/13439* (2013.01); *G02F 1/13454* (2013.01); *G02F 1/134309* (2013.01); *G02F 1/134336* (2013.01); *G02F 1/1339* (2013.01); *G02F 1/13306* (2013.01); *G02F 1/13394* (2013.01); *G02F 1/13793* (2021.01); *G02F 1/133302* (2021.01); *G02F 1/133345* (2013.01); *G02F 1/133357* (2021.01); *G02F 1/133388* (2021.01); *G02F 1/133512* (2013.01); *G02F 1/133742* (2021.01); *G02F 1/133784* (2013.01); *G02F 1/136286* (2013.01); *G02F 2201/121* (2013.01); *G02F 2201/123* (2013.01)

(58) Field of Classification Search
CPC ... G02F 1/1362; G02F 1/137; G02F 1/133784
USPC ............... 349/43, 111, 147, 148; 257/59, 72
See application file for complete search history.

(56) References Cited

U.S. PATENT DOCUMENTS

| | | | |
|---|---|---|---|
| 5,744,864 A | 4/1998 | Cillessen et al. | |
| 6,294,274 B1 | 9/2001 | Kawazoe et al. | |
| 6,462,723 B1 | 10/2002 | Yamazaki et al. | |
| 6,489,952 B1 | 12/2002 | Tanaka et al. | |
| 6,498,369 B1* | 12/2002 | Yamazaki | G02F 1/13454 |
| | | | 257/347 |
| 6,534,788 B1 | 3/2003 | Yeo et al. | |
| 6,563,174 B2 | 5/2003 | Kawasaki. et al. | |
| 6,603,453 B2 | 8/2003 | Yamazaki et al. | |
| 6,635,505 B2 | 10/2003 | Tanaka et al. | |
| 6,727,522 B1 | 4/2004 | Kawasaki et al. | |
| 6,897,919 B2 | 5/2005 | Enomoto et al. | |
| 6,960,787 B2 | 11/2005 | Yamazaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,198,967 B2 | 4/2007 | Tanaka et al. | |
| 7,211,825 B2 | 5/2007 | Shih et al. | |
| 7,247,882 B2 | 7/2007 | Yamazaki et al. | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,522,227 B2 | 4/2009 | Kim | |
| 7,544,981 B2 | 6/2009 | Tanaka et al. | |
| 7,646,015 B2 | 1/2010 | Fujii et al. | |
| 7,655,566 B2 | 2/2010 | Fujii | |
| 7,674,650 B2 | 3/2010 | Akimoto et al. | |
| 7,732,819 B2 | 6/2010 | Akimoto et al. | |
| 7,825,407 B2 | 11/2010 | Fujii et al. | |
| 7,994,581 B2* | 8/2011 | Jeon | B82Y 10/00 |
| | | | 257/368 |
| 8,129,717 B2 | 3/2012 | Yamazaki et al. | |
| 8,330,157 B2 | 12/2012 | Fujii et al. | |
| 8,343,817 B2 | 1/2013 | Miyairi et al. | |
| 8,513,661 B2 | 8/2013 | Takahashi et al. | |
| 8,552,423 B2 | 10/2013 | Yamazaki et al. | |
| 8,704,218 B2 | 4/2014 | Yamazaki | |
| 8,988,623 B2* | 3/2015 | Koyama | G02F 1/13454 |
| | | | 349/149 |
| 9,488,890 B2* | 11/2016 | Koyama | G02F 1/13454 |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0016308 A1* | 1/2003 | Jeon | G02F 1/13454 |
| | | | 349/39 |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0088589 A1* | 4/2005 | Edwards | G02F 1/133308 |
| | | | 349/110 |
| 2005/0134764 A1* | 6/2005 | Jeoung | G02F 1/133512 |
| | | | 349/110 |
| 2005/0199959 A1 | 9/2005 | Chiang et al. | |
| 2006/0012729 A1 | 1/2006 | Tanaka et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Theiss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0072439 A1* | 3/2007 | Akimoto | H01L 21/477 |
| | | | 438/795 |
| 2007/0076143 A1* | 4/2007 | Palk | G02B 5/3058 |
| | | | 349/96 |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |

(56) References Cited

U.S. PATENT DOCUMENTS

| | | | |
|---|---|---|---|
| 2008/0050595 A1 | 2/2008 | Nakagawara et al. | |
| 2008/0068548 A1 | 3/2008 | Kwon et al. | |
| 2008/0073653 A1 | 3/2008 | Iwasaki | |
| 2008/0083950 A1 | 4/2008 | Pan et al. | |
| 2008/0099759 A1 | 5/2008 | Fujii et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0291350 A1* | 11/2008 | Hayashi | H01L 27/1225 349/47 |
| 2008/0296568 A1 | 12/2008 | Ryu et al. | |
| 2009/0009677 A1* | 1/2009 | Yamazaki | G02F 1/1368 349/43 |
| 2009/0009698 A1 | 1/2009 | Moon et al. | |
| 2009/0011551 A1 | 1/2009 | Yamazaki | |
| 2009/0068773 A1 | 3/2009 | Lai et al. | |
| 2009/0073325 A1 | 3/2009 | Kuwabara et al. | |
| 2009/0086117 A1 | 4/2009 | Chen | |
| 2009/0114910 A1 | 5/2009 | Chang | |
| 2009/0134399 A1 | 5/2009 | Sakakura et al. | |
| 2009/0152541 A1 | 6/2009 | Maekawa et al. | |
| 2009/0184946 A1 | 7/2009 | Ahn et al. | |
| 2009/0206332 A1* | 8/2009 | Son | H01L 29/7869 257/E29.296 |
| 2009/0219478 A1 | 9/2009 | Park et al. | |
| 2009/0231241 A1* | 9/2009 | Abe | G09G 3/2011 345/76 |
| 2009/0278122 A1 | 11/2009 | Hosono et al. | |
| 2009/0280600 A1 | 11/2009 | Hosono et al. | |
| 2010/0051933 A1 | 3/2010 | Kim et al. | |
| 2010/0051949 A1 | 3/2010 | Yamazaki et al. | |
| 2010/0295042 A1* | 11/2010 | Yano | H01L 29/7869 257/43 |
| 2011/0068334 A1 | 3/2011 | Yamazaki et al. | |

FOREIGN PATENT DOCUMENTS

| | | | | |
|---|---|---|---|---|
| JP | 60-073666 A | 4/1985 | | |
| JP | 60-198861 A | 10/1985 | | |
| JP | 63-210022 A | 8/1988 | | |
| JP | 63-210023 A | 8/1988 | | |
| JP | 63-210024 A | 8/1988 | | |
| JP | 63-215519 A | 9/1988 | | |
| JP | 63-239117 A | 10/1988 | | |
| JP | 63-265818 A | 11/1988 | | |
| JP | 04-133033 A | 5/1992 | | |
| JP | 05-053147 A | 3/1993 | | |
| JP | 05-251705 A | 9/1993 | | |
| JP | 06-148678 A | 5/1994 | | |
| JP | 06-258661 A | 9/1994 | | |
| JP | 06-289413 A | 10/1994 | | |
| JP | 07-176758 A | 7/1995 | | |
| JP | 08-062635 A | 3/1996 | | |
| JP | 08-227068 A | 9/1996 | | |
| JP | 08-264794 A | 10/1996 | | |
| JP | 10-039336 A | 2/1998 | | |
| JP | 11-052328 A | 2/1999 | | |
| JP | 11-109886 A | 4/1999 | | |
| JP | 11-505377 | 5/1999 | | |
| JP | 11-202366 A | 7/1999 | | |
| JP | 2000-044236 A | 2/2000 | | |
| JP | 2000-150900 A | 5/2000 | | |
| JP | 2000-267137 A | 9/2000 | | |
| JP | 2000-347598 A | 12/2000 | | |
| JP | 2001-051292 A | 2/2001 | | |
| JP | 2001-133766 A | 5/2001 | | |
| JP | 2001-222019 A | 8/2001 | | |
| JP | 2002-076356 A | 3/2002 | | |
| JP | 2002-229052 A | 8/2002 | | |
| JP | 2002-289859 A | 10/2002 | | |
| JP | 2003-017502 A | 1/2003 | | |
| JP | 2003-086000 A | 3/2003 | | |
| JP | 2003-086808 A | 3/2003 | | |
| JP | 2003-338628 A | 11/2003 | | |
| JP | 2004-004526 A | 1/2004 | | |
| JP | 2004-103957 A | 4/2004 | | |
| JP | 2004-273614 A | 9/2004 | | |
| JP | 2004-273732 A | 9/2004 | | |
| JP | 2005-519344 | 6/2005 | | |
| JP | 2005-227513 A | 8/2005 | | |
| JP | 2006-343529 A | 12/2006 | | |
| JP | 2007-059893 A | 3/2007 | | |
| JP | 2007-072242 A | 3/2007 | | |
| JP | 2007-096055 A | 4/2007 | | |
| JP | 2007-123861 A | 5/2007 | | |
| JP | 2008-135731 A | 6/2008 | | |
| JP | WO 2009093625 A1 * | 7/2009 | | H01L 29/7869 |
| JP | 2009-176865 A | 8/2009 | | |
| JP | 2011-118377 A | 6/2011 | | |
| TW | 200837468 | 9/2008 | | |
| WO | WO-2003/077021 | 9/2003 | | |
| WO | WO-2004/114391 | 12/2004 | | |
| WO | WO-2009/093722 | 7/2009 | | |
| WO | WO-2011/052382 | 5/2011 | | |

OTHER PUBLICATIONS

Ikeda.T et al., "Full-Functional System Liquid Crystal Display Using CG-Silicon Technology", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Nakamura.M et al., "The phase relations in the In2O3—Ga2ZnO4—ZnO system at 1350°C", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor", Science, May 23, 2003, vol. 300, No. 5623, pp. 1269-1272.

Osada.T et al., "15.2: Development of Driver-Integrated Panel using Amorphous In—Ga—Zn-Oxide TFT ", SID Digest '09 : SID International Symposium Digest of Technical Papers, May 31, 2009, vol. 40, pp. 184-187.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Lee.J et al. "World'S Largest (15-Inch) XGA AMLCD Panel Using IGZO Oxide TFT", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

(56) References Cited

OTHER PUBLICATIONS

Tsuda.K et al., "Ultra Low Power Consumption Technologies for Mobile TFT-LCDs", IDW '02 : Proceedings of the 9th International Display Workshops, Dec. 4, 2002, pp. 295-298.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems", Journal of Solid-State Circuits , 2008, vol. 43, No. 1, pp. 292-299.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn-Oxide TFTS", IDW '09 : Proceedings of the 16th International Display Workshops, 2009, pp. 689-692.

Park.J et al., "Amorphous Indium-Gallium-Zinc Oxide TFTS and Their Application for Large Size AMOLED", AM-FPD '08 Digest of Technical Papers, Jul. 2, 2008, pp. 275-278.

Park.S et al. "Challenge To Future Displays: Transparent AM-OLED Driven By Peald Grown ZnO TFT", IMID '07 Digest, 2007, pp. 1249-1252.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Osada.T et al. "Development of Driver-Integrated Panel Using Amorphous In—Ga—Zn-Oxide TFT", AM-FPD '09 Digest of Technical Papers, Jul. 1, 2009, pp. 33-36.

Hirao.T et al., "Novel Top-Gate Zinc Oxide Thin-Film Transistors (ZnO TFTS) for AMLCDS", J. Soc. Inf. Display (Journal of the Society for Information Display), 2007, vol. 15, No. 1, pp. 17-22.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Ohara.H et al. "21.3:4.0 In. QVGA AMOLED Display Using In—Ga—Zn-Oxide TFTS With a Novel Passivation Layer", SID Digest '09 : SID International Symposium Digest of Technical Papers, May 31, 2009, pp. 284-287.

Miyasaka.M, "Suftla Flexible Microelectronics on Their Way to Business", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Kikuchi.H et al., "39.1 Invited Paper:Optically Isotropic Nano-Structured Liquid Crystal Composites for Display Applications", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Lee.H et al., "Current Statusof, Challenges to, and Perspective View of AM-OLED ", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kimizuka.N et al., "Spinel,YBFe2O4, and YB2Fe3O7 Types of Structures for Compounds in the In2O3 and Sc2O3—A2O3—BO Systems [A; Fe, Ga, or Al; B: Mg, Mn, Fe, Ni, Cu,Or Zn] at Temperatures Over 1000°C", Journal of Solid State Chemistry, 1985, vol. 60, pp. 382-384.

Kitzerow.H et al., "Observation of Blue Phases in Chiral Networks", Liquid Crystals, 1993, vol. 14, No. 3, pp. 911-916.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.

Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Nakamura.M, "Synthesis of Homologous Compound with New Long-Period Structure", Nirim Newsletter, Mar. 1, 1995, vol. 150, pp. 1-4.

(56) References Cited

OTHER PUBLICATIONS

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors", Jpn. J. Appl. Phys. (Japanese Journal of Applied Physics), 2006, vol. 46, No. 5B, pp. 4303-4308.

Janotti.A et al., "Native Point Defects In ZnO", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.

Hsieh. H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Janotti.A et al., "Oxygen Vacancies In ZnO", Appl. Phys. Lett. (Applied Physics Letters), 2005, vol. 87, pp. 122102-1-122102-3.

Oba.F et al., "Defect energetics in ZnO: A hybrid Hartree-Fock density functional study", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor", Philosophical Magazine, 2001, vol. 81, No. 5, pp. 501-515.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays", IDW '08 : Proceedings of the 6th International Display Workshops, Dec. 3, 2008, pp. 581-584.

Kim.S et al., "High-Performance oxide thin film transistors passivated by various gas plasmas", 214th ECS Meeting, 2008, No. 2317, ECS.

Clark.S et al., "First Principles Methods Using CASTEP", Zeitschrift fur Kristallographle, 2005, vol. 220, pp. 567-570.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ueno.K et al. "Field-Effect Transistor On SrTiO3 With Sputtered Al2O3 Gate Insulator", Appl. Phys. Lett. (Applied Physics Letters), Sep. 1, 2003, vol. 83, No. 9, pp. 1755-1757.

International Search Report (Application No. PCT/JP2010/067995) dated Nov. 22, 2010.

Written Opinion (Application No. PCT/JP2010/067995) dated Nov. 22, 2010.

Taiwanese Office Action (Application No. 099136527) dated Mar. 31, 2015.

\* cited by examiner

SEMICONDUCTOR DEVICE AND METHOD FOR MANUFACTURING THE SAME

TECHNICAL FIELD

The present invention relates to a semiconductor device including a circuit formed using a thin film transistor (hereinafter referred to as TFT) and a manufacturing method thereof. For example, the present invention relates to an electronic device on which an electro-optical device typified by a liquid crystal display panel is mounted as a component.

In this specification, a semiconductor device generally means a device which can function by utilizing semiconductor characteristics, and an electro-optical device, a semiconductor circuit, and an electronic device are all semiconductor devices.

BACKGROUND ART

In recent years, a technique for forming a thin film transistor (TFT) by using a thin semiconductor film (having a thickness of approximately several nanometers to several hundred nanometers) formed over a substrate having an insulating surface has attracted attention. Thin film transistors have been applied to a wide range of electronic devices like integrated circuits (ICs) and electro-optical devices, and development of thin film transistors as switching elements in image display devices, in particular has been hastened.

Metal oxides have been known as materials having semiconductor characteristics. The examples of such metal oxides having semiconductor characteristics include a tungsten oxide, a tin oxide, an indium oxide, a zinc oxide, and the like. A thin film transistor in which a channel formation region is formed using such metal oxides having semiconductor characteristics is already known (for example, see Patent Documents 1 and 2).

A liquid crystal display device is known as an example of image display devices. Compared with passive matrix liquid crystal display devices, high-definition images can be obtained with active matrix liquid crystal display devices; therefore, the active matrix liquid crystal display devices have become widely used. In the active matrix liquid crystal display device, pixel electrodes arranged in matrix are driven to display an image on a screen. Specifically, a video voltage is applied between a selected pixel electrode and a counter electrode corresponding to the pixel electrode, and thus, a liquid crystal layer between the pixel electrode and the counter electrode is modulated optically. Light is modulated so that an image is displayed and an observer recognizes the image.

An image burn-in may be caused when a voltage is applied to a liquid crystal only in one direction all the time. Thus, an AC drive is employed in which a voltage applied to a liquid crystal layer is periodically inverted. In an AC drive, a voltage applied to a liquid crystal is to be periodically inverted; for example, the polarity of a video voltage based on a voltage of a counter electrode (a common electric potential) is inverted every frame.

In addition, an example of an AC drive in which a counter electrode is divided into two counter electrodes and different potentials are applied thereto in a pixel portion is described in Patent Document 3.

REFERENCES

Patent Documents

[Patent Document 1] Japanese Published Patent Application No. 2007-123861

[Patent Document 2] Japanese Published Patent Application No. 2007-096055

[Patent Document 3] Japanese Published Patent Application No. 2000-347598

DISCLOSURE OF INVENTION

A voltage of a counter electrode is adjusted according to a video voltage which is actually applied to a pixel electrode. When the video voltage which is actually applied to a pixel electrode is changed, a defect may occur in a screen; therefore, the voltage of the counter electrode is optimized to correspond to the center of potential amplitude of the pixel electrode.

Further, in the case where a pixel portion and a driver circuit are formed over one substrate and a counter electrode is formed over an entire surface of a counter substrate, the driver circuit may be adversely affected by the optimized voltage of the counter electrode.

An object of one embodiment of the present invention is to provide a semiconductor device which includes a thin film transistor using an oxide semiconductor layer and in which low power consumption is realized.

Another object of an embodiment of the present invention is to provide a highly reliable semiconductor device which includes an oxide semiconductor layer.

In a semiconductor device according to one embodiment of the present invention, a liquid crystal layer is provided between a pair of substrates, one of which is provided with a pixel electrode and a driver circuit. The other of the substrates is a counter substrate which is provided with two counter electrode layers having different potentials. One of the counter electrode layers overlaps with the pixel electrode with the liquid crystal layer therebetween and the other of the counter electrode layers overlaps with the driver circuit with the liquid crystal layer therebetween.

One embodiment of the present invention to be disclosed in this specification is a semiconductor device including: over a first substrate, a first counter electrode layer and a second counter electrode layer having a potential different from that of the first counter electrode layer; a second substrate fixed to the first substrate; a first electrode layer and a second electrode layer over the second substrate; and a liquid crystal layer between the first substrate and the second substrate. The first electrode layer is a pixel electrode formed in a position overlapping with the first counter electrode layer with the liquid crystal layer therebetween. Further, the second electrode layer is an electrode layer of a driver circuit formed in a position overlapping with the second counter electrode layer with the liquid crystal layer therebetween.

When the video voltage which is applied to the pixel electrode is changed, a defect may occur in a screen; therefore, the voltage of the first counter electrode layer is optimized to correspond to the center of potential amplitude of the pixel electrode. In this manner, favorable display is conducted. The electric potential of the second counter electrode layer is a ground potential so that static electricity is diffused and let go.

With the above structure, at least one of the objects is achieved. The second counter electrode layer which is provided in the driver circuit portion diffuses static electricity applied by electrostatic discharge to let it go or prevents local electric charges (localization of electric charges) i.e., prevents local potential difference, whereby electrostatic breakdown of the semiconductor device can be prevented.

In the above-described structure, the first electrode layer is electrically connected to a thin film transistor in a pixel portion, and the second electrode layer is a gate electrode layer of a thin film transistor of the driver circuit.

Further, the above-described semiconductor device further includes: a third electrode layer provided over the second substrate; and between the third electrode layer and the first counter electrode layer, a conductive particle electrically connecting the third electrode layer and the first counter electrode layer.

The above-described semiconductor device further includes: a fourth electrode layer provided over the second substrate; and between the fourth electrode layer and the second counter electrode layer, a conductive particle electrically connecting the fourth electrode layer and the second counter electrode layer.

When a liquid crystal mode such as a TN mode, a VA mode, or an OCB mode which is driven by applying voltage between a pair of substrates, is operated by active matrix driving, voltage is applied through a flexible printed circuit (FPC) which is attached to an active matrix substrate; therefore, in order to generate potential difference between the pair of substrates, a conductor (a common contact portion) which electrically connects a counter electrode of a counter substrate to a connection wiring of the active matrix substrate is needed.

This conductor is manufactured in the following manner: a sealing material in which a plurality of conductive particles is mixed is placed in contact with a conductive portion of one of the pair of substrates; and then the substrates are bonded to each other and the conductive particles in the conductive portion are in contact with each electrode of the pair of substrates. Thus, the counter electrode of the counter substrate and a connection wiring of the active matrix substrate are electrically connected to each other.

In the above structure, the first electrode layer which is electrically connected to the thin film transistor in the pixel portion is in contact with an oxide semiconductor layer of the thin film transistor. Alternatively, the first electrode layer which is electrically connected to the thin film transistor in the pixel portion is electrically connected to the oxide semiconductor layer of the thin film transistor through an oxide conductive layer. Regarding the above-described connection between the first electrode layer and the oxide semiconductor layer, when the oxide conductive layer is sandwiched therebetween, it is expected to prevent an increase in contact resistance which is caused by formation of an insulating oxide on a surface in the connection portion (contact portion); accordingly, a highly reliable semiconductor device can be provided.

As the oxide semiconductor layer, a thin film which is formed using a material denoted as $InMO_3(ZnO)_m$ (m>0) is formed. The thin film is used as an oxide semiconductor layer to fabricate a thin film transistor in an embodiment of the present invention. Note that M denotes one metal element or a plurality of metal elements selected from Ga, Fe, Ni, Mn, and Co. As an example, M may be Ga or may include the above metal element in addition to Ga, for example, M may be Ga and Ni or Ga and Fe. Moreover, in the above oxide semiconductor, in some cases, a transition metal element such as Fe or Ni or an oxide of the transition metal is contained as an impurity element in addition to a metal element contained as M. In this specification, an oxide semiconductor layer whose composition formula is represented as $InMO_3 (ZnO)_m$ (m>0) where Ga is contained as M is referred to as an In—Ga—Zn—O-based oxide semiconductor, and a thin film thereof is also referred to as an In—Ga—Zn—O-based film.

As other examples of a metal oxide applicable to the oxide semiconductor layer, any of the following metal oxides can be applied: an In—Sn—O-based metal oxide; an In—Sn—Zn—O-based metal oxide; an In—Al—Zn—O-based metal oxide; a Sn—Ga—Zn—O-based metal oxide; an Al—Ga—Zn—O-based metal oxide; a Sn—Al—Zn—O-based metal oxide; an In—Zn—O-based metal oxide; a Sn—Zn—O-based metal oxide; an Al—Zn—O-based metal oxide; an In—O-based metal oxide; a Sn—O-based metal oxide; and a Zn—O-based metal oxide. A silicon oxide may be contained in an oxide semiconductor layer formed using any of the above metal oxides.

Further, in an embodiment of the present invention, the oxide semiconductor layer is subjected to heat treatment for dehydration or dehydrogenation after being deposited. Dehydration or dehydrogenation is heat treatment of the oxide semiconductor layer in an atmosphere of an inert gas such as nitrogen or a rare gas (e.g., argon or helium) at a temperature higher than or equal to 400° C. and lower than or equal to 750° C., preferably higher than or equal to 425° C. and lower than the strain point of the substrate, so that impurities such as moisture contained in the oxide semiconductor layer is reduced. Further, water ($H_2O$) can be prevented from being contained in the oxide semiconductor layer again later.

The heat treatment for dehydration or dehydrogenation is preferably performed in a nitrogen atmosphere with an $H_2O$ concentration of less than or equal to 20 ppm. Alternatively, the heat treatment may be performed in ultra-dry air with an $H_2O$ concentration of less than or equal to 20 ppm.

In the heat treatment for dehydration or dehydrogenation, an instantaneous heating method can be employed, such as a heating method using an electric furnace, a gas rapid thermal annealing (GRTA) method using a heated gas, or a lamp rapid thermal annealing (LRTA) method using lamp light.

The conditions of the dehydration or dehydrogenation are determined such that at least a peak at around 300° C. of two peaks derived from water is not detected when the oxide semiconductor layer subjected to the dehydration or dehydrogenation is measured with thermal desorption spectroscopy (TDS) while the temperature is increased to 450° C. Therefore, even if TDS is performed at up to 450° C. on a thin film transistor including an oxide semiconductor layer which is dehydrated or dehydrogenated in the above conditions, at least the peak of water at around 300° C. is not detected.

It is important not to allow the oxide semiconductor layer to contact with water or hydrogen, which is achieved by performing the cooling in a furnace used for dehydration or dehydrogenation without exposure of the oxide semiconductor layer to the air. When a thin film transistor is manufactured using an oxide semiconductor layer which is made to be an i-type oxide semiconductor layer in such a manner that an oxide semiconductor layer is placed in an oxygen-deficient state and changed into a low-resistance oxide semiconductor layer, i.e., an n-type (e.g., $n^-$-type or $n^+$-type) oxide semiconductor layer by dehydration or dehydrogenation and then oxygen is supplied to the low-resistance oxide semiconductor layer so as to change the layer into a high-resistance oxide semiconductor layer, the threshold voltage of the thin film transistor can be a positive voltage, whereby a so-called normally-off switching element can be realized. It is desirable for a display device that a channel be formed with a threshold voltage that is a positive value and as close to 0 V as possible. Note that if the threshold voltage of the thin film transistor is negative, the thin film transistor tends to be normally-on; in other words, current flows between a source electrode and a drain electrode even when gate voltage is 0 V. In an active-matrix display device, electric characteristics of thin film transistors included in a circuit are important and performance of the display device is dependent on the electric characteristics of the thin film transistors. Among the electric characteristics of thin film transistors, in particular, a threshold voltage ($V_{th}$) is important. When the threshold voltage value is high or negative even when the field effect mobility is high, it is difficult to control the circuit. When a thin film transistor has a high threshold voltage value, the thin film transistor cannot perform switching function and may be a load when the transistor is driven at low voltage. In the case of an n-channel thin film transistor, it is preferable that a channel is formed and drain current begins to flow after the positive voltage is applied as a gate voltage. A transistor in which a channel is not formed unless the driving voltage is high enough and a transistor in which a channel is formed and drain current flows even in the case of the negative voltage state are unsuitable for a thin film transistor used in a circuit.

In addition, cooling after the heat treatment may be carried out after switching the gas atmosphere in which the dehydration or dehydrogenation is performed to a different gas. For example, cooling may be performed after the furnace used for dehydration or dehydrogenation is filled with a high-purity oxygen gas, a high-purity $N_2O$ gas, or an ultra-dry air (with a dew point of lower than or equal to −40° C., preferably lower than or equal to −60° C.) without exposure of the oxide semiconductor layer to the air.

The electric characteristics of a thin film transistor are improved using an oxide semiconductor film cooled slowly (or cooled) in a dry atmosphere (with a dew point lower than or equal to −40° C., preferably lower than or equal to −60° C.) which does not substantially contain moisture after moisture which is contained in the film is reduced by heat treatment for dehydration or dehydrogenation, and high-performance thin film transistors which can be mass-produced are realized.

As mentioned above, in this specification, heat treatment for an oxide semiconductor layer in an atmosphere of an inert gas such as nitrogen or a rare gas (e.g., argon or helium) is referred to as dehydration or dehydrogenation. In this specification, "dehydrogenation" does not indicate elimination of only $H_2$ by heat treatment. For convenience, elimination of H, OH, and the like is referred to as "dehydration or dehydrogenation".

FIG. 15 is a longitudinal sectional view illustrating an inverted-staggered thin film transistor which uses an oxide semiconductor. An oxide semiconductor (OS) layer is provided over a gate electrode (GE1) with a gate insulating film (GI) therebetween and a source electrode (S) and a drain electrode (D) are provided thereover.

FIGS. 16A and 16B are energy band diagrams (schematic views) each corresponding to a cross section taken along line A-A' in FIG. 15. A case where the voltage of the source and that of the drain are equal ($V_D=0V$) and a case where a positive potential ($V_D>0$) based on a voltage of the source is applied to the drain are illustrated in FIG. 16A and FIG. 16B, respectively.

FIGS. 17A and 17B are energy band diagrams (schematic views) each corresponding to a cross section taken along line B-B' in FIG. 15. A state where a positive potential (+$V_G$) is applied to the gate (G1), i.e., an on-state in which carriers (electrons) flow between the source and the drain is illustrated in FIG. 17A. A state where a negative potential (−$V_G$) is applied to the gate (G1), i.e., an off-state (in which minority carriers do not flow) is illustrated in FIG. 17B.

FIG. 18 is a diagram illustrating a relation between a vacuum level and a work function of metal ($\phi_M$) and a relation between the vacuum level and electron affinity ($\chi$) of an oxide semiconductor.

A conventional oxide semiconductor generally has n-type conductivity and in that case, a Fermi level ($E_F$) is apart from an intrinsic Fermi level ($E_i$) at the center of a band gap and is closer to a conduction band. It is known that some hydrogen in an oxide semiconductor serves as donors and is one of the factors which make the oxide semiconductor have n-type conductivity.

On the other hand, an oxide semiconductor according to the present invention is made to be an intrinsic (i-type) or substantially intrinsic oxide semiconductor by removal of hydrogen that is an n-type impurity to be highly purified so that impurities that are not main components of the oxide semiconductor are contained as little as possible. In other words, the oxide semiconductor according to the present invention is not an oxide semiconductor which is made to be an i-type oxide semiconductor by being doped with an impurity but an i-type (intrinsic) or almost an i-type oxide semiconductor which is highly purified by removing impurities such as hydrogen and water as much as possible. In this manner, the Fermi level ($E_F$) can be extremely close to the intrinsic Fermi level ($E_i$).

It is said that electron affinity ($\chi$) of an oxide semiconductor is 4.3 eV when a band gap ($E_g$) thereof is 3.15 eV. The work function of titanium (Ti) contained in the source and drain electrodes is almost equivalent to the electron affinity ($\chi$) of the oxide semiconductor. In that case, at an interface between the metal and the oxide semiconductor, a Schottky barrier against an electron is not formed.

That is, in the case where the work function ($\phi_M$) of the metal is equivalent to the electron affinity ($\chi$) of the oxide semiconductor, an energy band diagram (a schematic view) similar to that in FIG. 16A is obtained when the metal and the oxide semiconductor are in contact with each other.

In FIG. 16B, an electron is represented by a black circle (●). When a positive potential is applied to the drain, an electron goes over a barrier to be injected to the oxide semiconductor and flows to the drain. In this case, height (h) of the barrier is varied depending on a gate voltage and a drain voltage and is smaller than height of a barrier in FIG. 16A in which no voltage is applied, i.e., a half value of a band gap ($E_g$).

At this time, an electron moves in a lowest portion in an interface between the gate insulating film and the highly purified semiconductor on the oxide semiconductor side, which is stable in terms of energy.

Further, in FIG. 17B, when a negative potential (a reverse bias voltage) is applied to the gate electrode (G1), a value of current is almost zero because substantially, there is not any holes, i.e., minority carriers.

As described above, the oxide semiconductor is made to be an intrinsic (i-type) or substantially intrinsic oxide semiconductor by being highly purified in such a manner that impurities that are not main components of the oxide semiconductor are contained as little as possible, whereby characteristics at an interface between the oxide semiconductor and the gate insulating film become so distinctive and thus are needed to be considered separately from those in a bulk of the oxide semiconductor. Thus, the gate insulating film is needed to form a favorable interface with the oxide semiconductor. For example, it is preferable to use an insulating film which is formed by a CVD method which uses high density plasma generated with a power frequency from the VHF band to a microwave band or an insulating film formed by a sputtering method.

By highly purifying an oxide semiconductor and forming a favorable interface between the oxide semiconductor and the gate insulating film, even in the case of an element with a channel width W of $1 \times 10^4$ μm and a channel length L of 3 μm, thin film transistor characteristics such as off-current of less than or equal to $10^{-13}$ A and a subthreshold swing value (S value) of 0.1 V/dec. can be expected (the thickness of the gate insulating film=100 nm).

In this manner, by highly purifying an oxide semiconductor so that impurities that are not main components of the oxide semiconductor are contained as little as possible, favorable operation of a thin film transistor can be realized.

In a display device, a voltage of the counter electrode is optimized to correspond to an amplitude center of an electric potential of a pixel electrode and high display quality is realized; in addition, an adverse effect of electrostatic on a driver circuit which includes a thin film transistor using an oxide semiconductor layer is reduced so that reliability is improved.

BEST MODE FOR CARRYING OUT THE INVENTION

Hereinafter, embodiments of the present invention will be described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiments.

Embodiment 1

A semiconductor device of this embodiment is described with reference to FIGS. 1A to 1C. The semiconductor device of this embodiment is a liquid crystal display device.

Figure 1A:
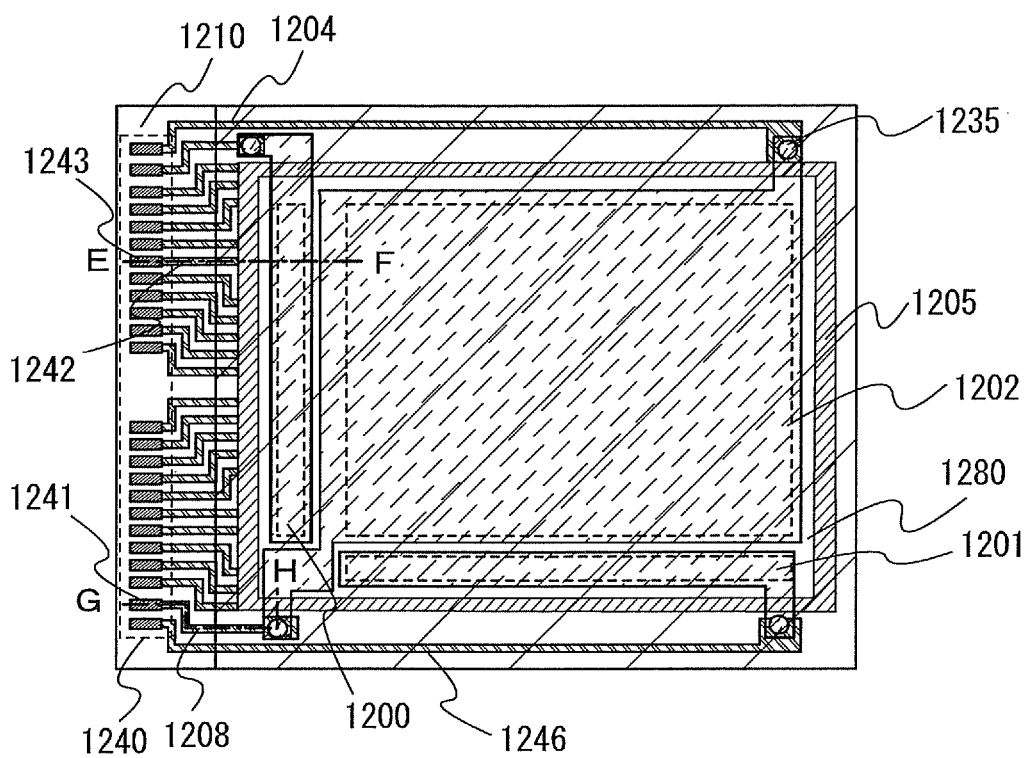
FIGS. 1A to 1C are a top view and cross-sectional views illustrating one embodiment of the present invention.

FIG. 1A is a top view of a semiconductor device of this embodiment. FIG. 1A is a top view of a liquid crystal display device in which an FPC has not been attached to a first substrate 1210. FIG. 1B is a cross-sectional view taken along line G-H in FIG. 1A, which shows a connection region of a conductive particle and a connection wiring. FIG. 1C is a cross-sectional view taken along line E-F in FIG. 1A, which shows a connection region of a pixel portion and a connection wiring.

The first substrate 1210 which serves as an active matrix substrate and is provided with pixel electrode layers, and a second substrate 1204 provided with a first counter electrode layer 1291 and a second counter electrode layer 1292 are attached to each other with a sealing material 1205, and the interior space surrounded by the sealing material 1205 is filled with a liquid crystal 1280. A signal line driver circuit portion 1200, a scan line driver circuit portion 1201, and a pixel portion 1202 in which pixel electrode layers are formed in matrix are formed over the first substrate 1210.

The second counter electrode layer 1292 provided over the driver circuit portion has a potential which is different from that of the first counter electrode layer 1291. The first counter electrode layer 1291 provided over the pixel portion 1202 and the second counter electrode layer 1292 provided over the driver circuit portion are separated electrode layers not being electrically connected to each other and have different potentials.

A potential (voltage) applied to the pixel electrode layer is provided through a pixel thin film transistor. Therefore, there is a possibility that the voltage of the pixel electrode layer is smaller than the voltage which is actually applied to the pixel electrode layer through the pixel thin film transistor by several volts. Thus, it is preferable that a potential (voltage) to be applied to the first counter electrode layer 1291 be set in consideration of the difference.

The signal line driver circuit portion 1200 provided over the first substrate 1210 includes a circuit comprising a driver circuit thin film transistor 1223.

The pixel portion 1202 includes a pixel thin film transistor 1211. Further, a pixel electrode layer 1250 which is connected to the pixel thin film transistor 1211 is formed over and in an insulating layer 1214.

The pixel thin film transistor 1211 and the driver circuit thin film transistor 1223 are formed using an oxide semiconductor layer, a gate insulating layer, and a gate electrode layer. Over the driver circuit thin film transistor 1223, a conductive layer 1293 is provided overlapping with the gate electrode layer and the oxide semiconductor layer with an insulating layer 1214 interposed between the conductive layer 1293, and the gate electrode layer and the oxide semiconductor layer.

In the driver circuit thin film transistor 1223, the oxide semiconductor layer is interposed between the gate electrode layer and the conductive layer 1293. With such a structure, variation in threshold voltage of the driver circuit thin film transistor 1223 can be reduced, so that a semiconductor device provided with the driver circuit thin film transistor 1223, which has stable electric characteristics, can be provided. The conductive layer 1293 may be at the same potential as the gate electrode layer or may be at a floating potential or a fixed potential such as a GND potential or 0 V. By setting the potential of the conductive layer 1293 to an appropriate value, the threshold voltage of the driver circuit thin film transistor 1223 can be controlled though depending on a distance between the pair of substrates.

The conductive layer 1293 may be processed into a pattern having an opening so as to be provided in a region overlapping with the gate electrode layer and the semiconductor layer.

The second counter electrode layer 1292 provided over the driver circuit portion has a flat shape and may be processed into a pattern having an opening. By processing the second counter electrode layer 1292 into the pattern having the opening, parasitic capacitance to be formed between the second counter electrode layer 1292 and the conductive layer included in the thin film transistor in the driver circuit portion can be reduced. Thus, reduction in power consumption of the semiconductor device can be realized.

In this specification, a pattern having an opening (a slit) of the second counter electrode layer 1292 over the driver circuit portion includes patterns which are partly opened, such as a bend portion and a branching comb-like portion as well as a pattern which is opened in a closed space.

As each of the first substrate 1210 and the second substrate 1204, any glass substrate used in the electronics industry, called a non-alkali glass substrate, such as an aluminosilicate glass substrate, an aluminoborosilicate glass substrate, or a barium borosilicate glass substrate, a quartz substrate, a ceramic substrate, a plastic substrate, or the like can be used as appropriate. By using a flexible plastic substrate as each of the first substrate 1210 and the second substrate 1204, a flexible semiconductor device can be manufactured.

The sealing material 1205 is applied over the first substrate 1210 or the second substrate 1204 by a screen printing method, or with an inkjet apparatus or a dispensing apparatus. As the sealing material 1205, typically, a material containing a visible light curable resin, an ultraviolet curable resin, or a thermosetting resin can be used. For example, an epoxy resin such as a liquid bisphenol-A resin, a solid bisphenol-A resin, a bromine-containing epoxy resin, a bisphenol-F resin, a bisphenol-AD resin, a phenol-type epoxy resin, a cresol-type epoxy resin, a novolac-type epoxy resin, a cycloaliphatic epoxy resin, an Epi-Bis type epoxy resin, a glycidyl ester resin, a glycidyl amine resin, a heterocyclic epoxy resin, or a modified epoxy resin can be used. As the sealing material 1205, a material having a viscosity in the range of 40 Pa·s to 400 Pa·s is cured and then used. Further, a filler (1 μm to 24 μm in diameter) may be contained. Note that it is preferable to select, as the sealing material, a sealing material which is insoluble in liquid crystals which are in contact with the sealing material later.

As a conductive particle 1270, a conductive particle in which an insulating sphere is covered with a thin metal film can be used. The insulating sphere is formed using silica glass, hard resin, or the like. The thin metal film can be formed to have a single-layer structure or a stacked-layer structure of gold, silver, palladium, nickel, an indium tin oxide (ITO), and/or an indium zinc oxide (IZO). For example, as the thin metal film, a thin gold film, a stack of a thin nickel film and a thin gold film, or the like can be used. By using the conductive particle 1270 in which an insulating sphere is contained at the center, elasticity can be improved so that possibilities of breakdowns due to external pressure can be suppressed.

The materials of the pixel electrode layer 1250 are different between a transmissive liquid crystal display device and a reflective liquid crystal display device. In the case of a transmissive liquid crystal display device, the pixel electrode layer 1250 is formed using a light-transmitting material. As examples of the light-transmitting material, an indium tin oxide (ITO), a zinc oxide (ZnO), an indium zinc oxide (IZO), a gallium-doped zinc oxide (GZO), and the like can be given.

Further, the pixel electrode layer 1250 can be formed using a conductive composition containing a conductive high-molecular weight material (also referred to as a conductive polymer), as well. The pixel electrode layer formed using the conductive composition has preferably a sheet resistance of less than or equal to 10000 Ω/square and a transmittance greater than or equal to 70% at a wavelength of 550 nm. Further, the resistivity of the conductive high-molecular weight material contained in the conductive composition is preferably less than or equal to 0.1 Ω·cm.

As the high-molecular weight material, a so-called π-electron conjugated conductive polymer can be used. For example, polyaniline or a derivative thereof, polypyrrole or a derivative thereof, polythiophene or a derivative thereof, a copolymer of two or more kinds of them, and the like can be given.

On the other hand, in the case of a reflective liquid crystal display device, a metal electrode having high reflectivity is used as the pixel electrode layer 1250. Specifically, aluminum, silver, or the like is used. Further, the reflectivity is increased by making the surface of the pixel electrode layer 1250 rough. Therefore, the insulating layer 1214 under the pixel electrode layer 1250 may be made rough.

Further, in the case of a semi-transmissive liquid crystal display device, a transmissive material and a reflective material are used for the pixel electrode layer 1250.

Further, a terminal portion 1240 is formed in an edge portion of the first substrate 1210. In the terminal portion 1240, a connection terminal 1241 is formed over the connection wiring 1208.

Figure 1B:
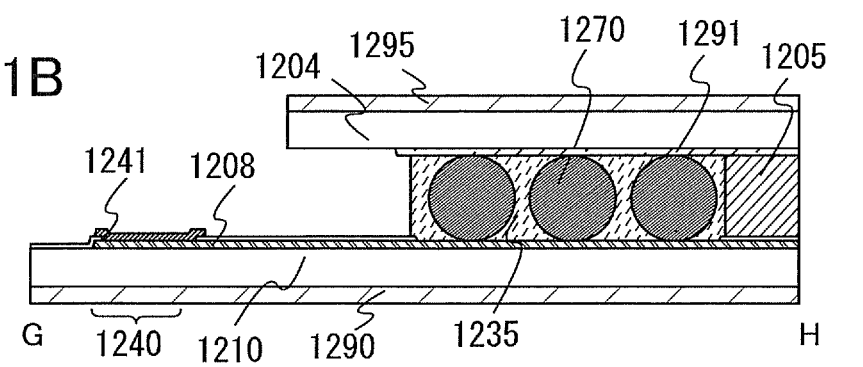

FIG. 1B is a cross-sectional view of a region where the connection terminal 1241 and the conductive particle 1270 are connected to each other. A connection wiring 1208 is formed over the first substrate 1210. A connection terminal 1241 formed at the same time as the pixel electrode layer 1250 is formed over the connection wiring 1208. The connection terminal 1241 is electrically connected to the first counter electrode layer 1291 through the connection wiring 1208 and the conductive particle 1270. Further, the connection terminal 1241 is connected to an FPC (not shown). Note that in FIG. 1B, the conductive particle 1270 is fixed by the resin layer 1235. The resin layer 1235 can be formed using an organic resin insulating material like that used for the sealing material 1205.

Figure 1C:
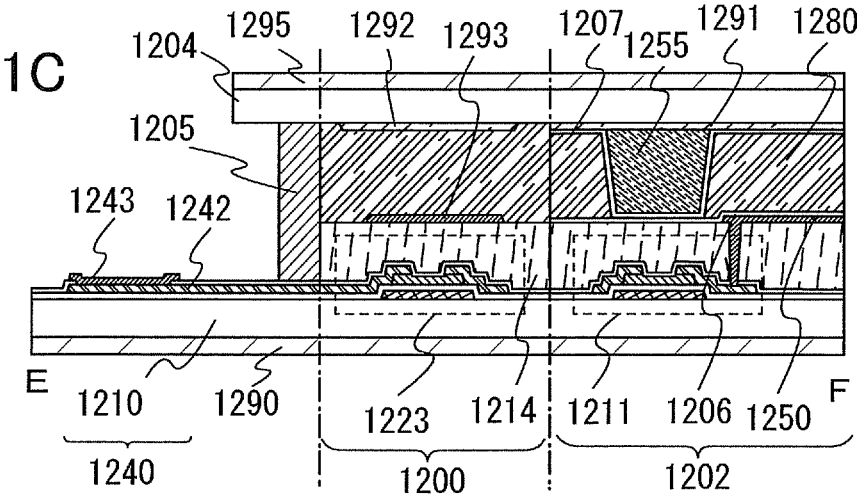

FIG. 1C is a cross-sectional view of a region where the pixel electrode layer 1250 and a connection terminal 1243 are connected. A connection wiring 1242 formed at the same time as source electrode layers and drain electrode layers of the pixel thin film transistor 1211 and the driver circuit thin film transistor 1223 are formed over the first substrate 1210. A connection terminal 1243 formed at the same time as the pixel electrode layer 1250 is formed over the connection wiring 1242. The connection terminal 1243 is electrically connected to the pixel electrode layer 1250 through the connection wiring 1242. Note that, since an active matrix liquid crystal display device is used in this embodiment, the pixel electrode layer 1250 and the connection wiring 1242 are not directly connected but are connected through the pixel thin film transistor 1211 or a thin film transistor in the signal line driver circuit portion 1200.

A first alignment film 1206 is provided over the pixel electrode layer 1250, and rubbing is performed thereon. The first alignment film 1206 and the rubbing are not necessarily required, which depends on the mode of liquid crystals.

For the second substrate 1204 which serves as a counter substrate, a black matrix may be provided in a position overlapping with the signal line driver circuit portion 1200, and a color filter, a protective layer, and the like may be provided in a position overlapping with the pixel portion 1202. In a case where color display is performed by a color sequential method called "field sequential", the color filter is not necessarily provided. The second substrate 1204 which serves as a counter substrate is provided with the first counter electrode layer 1291 and the second counter electrode layer 1292, and a second alignment film 1207 is provided for the first counter electrode layer 1291, and rubbing is performed thereon. Similarly to the case of the first substrate 1210, as for the second substrate 1204, an alignment film and rubbing are not necessarily required, which depends on the mode of liquid crystals.

Alternatively, liquid crystals exhibiting a blue phase for which an alignment film is unnecessary may be used. A blue phase is one of liquid crystal phases, which is generated just before a cholesteric phase changes into an isotropic phase while the temperature of cholesteric liquid crystal is increased. Since the blue phase appears within a narrow range of temperatures, a liquid crystal composition containing a chiral agent at greater than or equal to 5 wt % is used for the liquid crystal 1280 in order to increase the temperature range. The liquid crystal composition which includes a liquid crystal showing a blue phase and a chiral agent has a short response time less than or equal to 1 msec, has optical isotropy, which makes the alignment step unneeded, and has a small viewing angle dependence.

The second substrate 1204 provided with the first counter electrode layer 1291 and the second counter electrode layer 1292 or the first substrate 1210 provided with the pixel electrode layer 1250 is further provided with a pillar spacer 1255. The pillar spacer 1255 is provided to keep a distance between the first substrate 1210 and the second substrate 1204. In this embodiment, an example is described in which the pillar spacer 1255 is provided on the second substrate 1204 side. The pillar spacer 1255 is also called a photolitho spacer, a post spacer, a scallop spacer, or a column spacer. Alternatively, a spherical spacer may be used. In this embodiment, a pillar spacer is used. As for a method for forming the pillar spacer 1255, an organic insulating material such as photosensitive acrylic is applied to an entire surface of the substrate by a spin coating method, and a series of photolithography steps is performed thereon. Photosensitive acrylic which remains over the substrate serves as the spacer. With this method, a place for disposing a spacer can be exposed to light in accordance with a mask pattern at the time of light exposure; therefore, the pillar spacer 1255 at a portion where the liquid crystal is not driven makes it possible to prevent light of the liquid crystal from leaking as well as to maintain the distance between the upper and lower substrates. Further, the pillar spacer 1255 can be formed by discharging a composition containing an organic insulating material by an inkjet method and performing baking thereon.

The space around the conductive particle 1270 may be filled with a conductive polymer as the resin layer 1235 instead of an organic resin insulating material. As typical examples of the conductive polymer, a conductive polyaniline, a conductive polypyrrole, a conductive polythiophene, a mixture of poly(ethylenedioxythiophene) (PEDOT) and poly(styrenesulfonic acid) (PSS), and the like can be given. Further, any of the aforementioned examples of the conductive polymer which can be used for the pixel electrode layer 1250 can be used as appropriate, as well. The conductive polymer is formed by applying the conductive polymer with an inkjet apparatus, a dispensing apparatus, or the like. That is, when the conductive polymer is in contact with the second counter electrode layer 1292 or the connection wiring 1208, the conductive particle 1270 and the conductive polymer are in contact with each other, so that connection resistance between the second counter electrode layer 1292 and the connection wiring 1208 can be reduced.

Note that the connection wiring 1208 and the first counter electrode layer 1291 formed for the second substrate 1204 are electrically connected to each other through the conductive particle 1270. Further, the connection wiring 1246 and the second counter electrode layer 1292 formed for the second substrate 1204 are electrically connected to each other through the conductive particle 1270. The connection wiring 1246 and the connection wiring 1208 have different potentials.

Further, nanoparticles in each of which a conductive material is covered with a thin organic film may be used as the conductive particle 1270. When such nanoparticles are used, the thin organic films are decomposed in a heating step for realigning the orientation of liquid crystals and hardening the sealing material after the first substrate 1210 and the second substrate 1204 are attached to each other, so that the conductive materials of the nanoparticles are in contact and fused with one another, whereby a conductive particle can be formed.

The nanoparticles are dispersed by a droplet discharging method. A droplet discharging method is a method for forming a pattern by discharging droplets containing a predetermined substance through a fine opening. In this embodiment, a composition in which nanoparticles in each of which a conductive material is covered with a thin organic film are dispersed in a solvent, is discharged (jetted) as a droplet, and dried so that the solvent is evaporated.

A conductive material for forming nanoparticles may be a metal element selected from gold (Au), silver (Ag), platinum (Pt), nickel (Ni), copper (Cu), palladium (Pd), tantalum (Ta), iridium (Ir), rhodium (Rh), tungsten (W), aluminum (Al), and the like or an alloy material containing such an element as a main component. Further, a metal sulfide of cadmium (Cd) or zinc (Zn), an oxide of iron (Fe), titanium (Ti), germanium (Ge), silicon (Si), zirconium (Zr), barium (Ba), or the like, or one or more silver halides may be mixed. Note that in the case where two or more kinds of elements or compounds are used as conductive materials, the mixture form is not limited in particular, for example, they may be homogeneously mixed, or any one of them may be localized in the center. Further, at least the surfaces of the nanoparticles are formed of a conductive material, and the inside thereof may be formed of an insulating material.

The grain diameter of a nanoparticle is greater than or equal to 1 nm and less than or equal to 200 nm, preferably greater than or equal to 1 nm and less than or equal to 100 nm, and grain diameters of the nanoparticles included in the discharged material are preferably uniform.

Note that when voltage is applied, voids may be generated between particles depending on the kind of the conductive material(s) forming the nanoparticles. This is because crystal growth of the conductive material proceeds very fast, and such void generation can be suppressed by setting a voltage to be applied to a liquid crystal display device to be low or using an alloy material for each nanoparticle. Consequently, a highly reliable liquid crystal display device can be provided.

The thin organic films coating the nanoparticles correspond to a dispersant having functions of preventing nanoparticles from flocculating in a solvent and stably dispersing the particles. Accordingly, the compound forming the thin organic films is formed using a surfactant, a material which can form a coordinate bond with a metal element contained in the conductive material, or the like. Here, as the substance forming a coordinate bond with a metal element, a substance having a lone electron-pair on an atom of nitrogen, sulfur, oxygen, or the like such as an amino group, a thiol group (—SH), a sulfide group (—S—), a hydroxy group (—OH), an ether group (—O—), a carboxyl group (—COOH), a cyano group (—CN), or the like can be given. For example, a hydroxylamine such as ethanolamine, an amine-based compound such as polyethyleneimine, an amide compound such as polyvinylpyrrolidone, an alcohol such as poly(vinyl alcohol), an alkanethiol, a dithiol, a glycol such as ethylene glycol, or diethylene glycol, an ether compound such as polyethylene glycol, poly(acrylic acid), carboxymethylcellulose, or the like can be used. Further, as the surfactant, for example, an anionic surfactant such as sodium bis(2-ethylhexyl)sulfosuccinate or sodium dodecylbenzenesulfonate, a nonionic surfactant such as an alkyl ester of poly(alkyl glycol), alkyl phenyl ether, a fluorosurfactant, a copolymer of ethyleneimine with a poly(ethylene oxide), or the like can be used. Note that when a dispersant is greater than or equal to 30 wt % with respect to nanoparticles, the viscosity of the discharge material becomes high, so that 1.0 wt % to 30 wt % is preferable.

Such nanoparticles in each of which a conductive material is covered with a thin organic film are dispersed in a solvent and discharged. For the solvent, water or an organic solvent can be used, and an organic solvent may be either a water-soluble organic solvent or a water-insoluble organic solvent. For example, as the water-soluble organic solvent, an alcohol such as methanol, ethanol, propanol, butyl alcohol, glycerin, dipropylene glycol, or ethylene glycol, a ketone such as acetone or methyl ethyl ketone, a glycol ether such as ethylene glycol monomethyl ether, ethylene glycol monoethyl ether, ethylene glycol monobutyl ether, or diethylene glycol monobutyl ether, a water-soluble nitrogen-containing organic compound such as 2-pyrrolidone or N-methyl pyrrolidone, or the like can be given. Further, as the water-insoluble organic solvent, an ester such as ethyl acetate, a linear alkane such as octane, nonane, or decane, a cycloalkane such as cyclohexane, an aromatic compound such as toluene, xylene, benzene, or dichlorobenzene, or the like can be given. Naturally, not only one solvent is necessarily used but a mixture of a plurality of solvents may be used as long as phase separation does not occur between the solvents.

The sealing material 1205 and the conductive particle 1270 are discharged over the first substrate 1210 or the second substrate 1204, and then liquid crystals are discharged in a space surrounded by the sealing material 1205. After that, the first substrate 1210 and the second substrate 1204 are attached to each other under reduced pressure, UV light irradiation is performed thereon to cure the sealing material 1205, and then heat treatment is performed thereon to further cure the sealing material 1205, so that the first substrate 1210 and the second substrate 1204 are firmly fixed. In addition, the alignment of the liquid crystals is made uniform by the heat treatment.

Consequently, the first substrate 1210 and the second substrate 1204 can be attached to each other.

Then, the first substrate 1210 and the second substrate 1204 are cut to have a panel shape. Furthermore, in order to improve the contrast, a first polarizing plate 1290 and a second polarizing plate 1295 are provided for the outsides of the first substrate 1210 and the second substrate 1204 respectively. Note that the first polarizing plate 1290 is not necessarily provided in the case of a reflective display device.

Although not illustrated in this embodiment, a black matrix (a light-blocking layer), an optical member (an optical substrate) such as a retardation member, or an anti-reflection member, and the like are provided as appropriate. For example, circular polarization obtained by using a polarizing substrate and a retardation substrate may be used. In addition, a backlight, a side light, or the like may be used as a light source.

In an active matrix liquid crystal display device, pixel electrodes arranged in matrix are driven to form a display pattern on a screen. Specifically, voltage is applied between a selected pixel electrode and a counter electrode corresponding to the pixel electrode, so that a liquid crystal layer provided between the pixel electrode and the counter electrode is optically modulated and this optical modulation is recognized as a display pattern by an observer.

In displaying moving images, a liquid crystal display device has a problem in that a long response time of liquid crystal molecules themselves causes afterimages or blurring of moving images. In order to improve the moving-image characteristics of a liquid crystal display device, a driving method called black insertion is employed in which black is displayed on the whole screen every other frame period.

Further, there is a driving technique which is so-called double-frame rate driving. In the double-frame rate driving, a vertical synchronizing frequency is set 1.5 times or more, preferably, 2 times or more as high as a usual vertical synchronizing frequency, whereby the response speed is increased, and the grayscale to be written is selected for every plural fields which have been divided in each frame.

Further alternatively, in order to improve the moving-image characteristics of a liquid crystal display device, a driving method may be employed, in which a plurality of LEDs (light-emitting diodes) or a plurality of EL light sources are used to form a surface light source as a backlight, and each light source of the surface light source is independently driven in a pulsed manner in one frame period. As the surface light source, three or more kinds of LEDs may be used and an LED emitting white light may be used. Since a plurality of LEDs can be controlled independently, the light emission timing of LEDs can be synchronized with the timing at which a liquid crystal layer is optically modulated. According to this driving method, LEDs can be partly turned off; therefore, an effect of reducing power consumption can be obtained particularly in the case of displaying an image having a large part on which black is displayed.

By combining these driving methods, the display characteristics of a liquid crystal display device, such as moving-image characteristics, can be improved as compared with those of conventional liquid crystal display devices.

In an embodiment of the present invention, a counter electrode layer is provided over a driver circuit portion, whereby the electrostatic breakdown of a thin film transistor can be prevented. However, a protective circuit may be provided as well. The protective circuit is preferably formed with a non-linear element including an oxide semiconductor layer. For example, protective circuits are provided between the pixel portion and a scan line input terminal and between the pixel portion and a signal line input terminal. In this embodiment, a plurality of protective circuits are provided so as to prevent breakage of a pixel transistor and the like which can be caused when a surge voltage due to static electricity or the like is applied to a scan line, a signal line, and a capacitor bus line. Therefore, the protective circuit is formed so as to release charge to a common wiring when a surge voltage is applied to the protective circuit. Further, the protective circuit includes non-linear elements arranged in parallel to each other with the scan line therebetween. The non-linear element includes a two-terminal element such as a diode or a three-terminal element such as a transistor. For example, the non-linear element can also be formed in the same step as the thin film transistor in the pixel portion, and can be made to have the same properties as a diode by connecting a gate terminal to a drain terminal of the non-linear element.

In the above-described manner, a liquid crystal display device which includes a thin film transistor using an oxide semiconductor layer and in which resistance to static electricity is high and low power consumption is achieved, can be provided.

Embodiment 2

Another example is described in which, over the first substrate, a common connection portion is formed in the connection region for electrical connection of the counter electrode layers (the first counter electrode layer and the second counter electrode layer) which are provided for the second substrate to the connection wiring, in the semiconductor device including the liquid crystal layer between the first substrate and the second substrate as described in Embodiment 1. Note that a thin film transistor is formed as a switching element over the first substrate, and the common connection portion is manufactured in the same process as the switching element in a pixel portion, thereby avoiding complicating the process.

In this embodiment, an example is described in which the common connection portion is provided in a position overlapping with a sealing material for bonding the first substrate and the second substrate and is electrically connected to the counter electrode layer through a conductive particle in the sealing material. Alternatively, as illustrated in FIG. 1A, the common connection portion is provided in a position that is outside of the pixel portion and does not overlap with the sealing material and a paste containing conductive particles is provided separately from the sealing material so as to overlap with the common connection portion, whereby the common connection portion is electrically connected to the counter electrode layer.

Figure 2A:
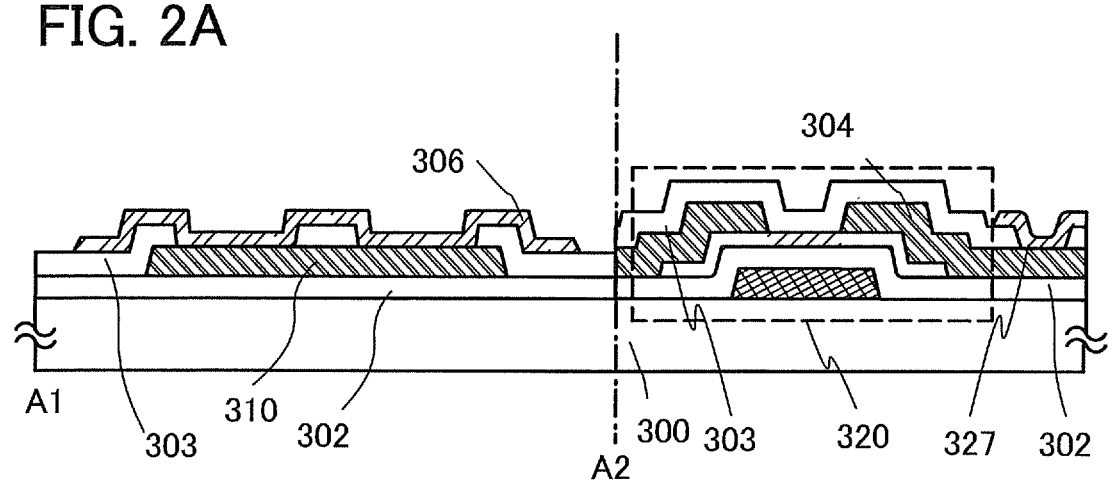
FIGS. 2A and 2B are a cross-sectional view and a top view illustrating one embodiment of the present invention.

FIG. 2A is a cross-sectional structural view of a semiconductor device in which a thin film transistor and a common connection portion are formed over one substrate (a first substrate 300).

In FIG. 2A, a thin film transistor 320 which is electrically connected to a pixel electrode layer 327 is a channel-etched thin film transistor provided in a pixel portion.

Figure 2B:
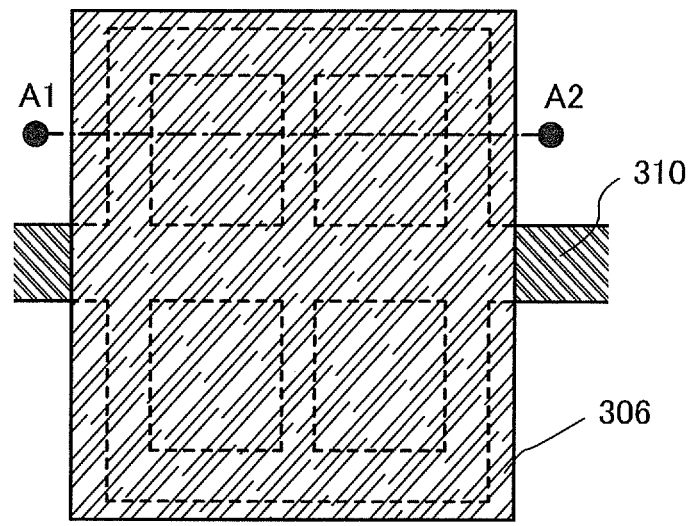

FIG. 2B illustrates an example of a top view of the common connection portion, and dashed line A1-A2 in FIG. 2B corresponds to a cross section of the common connection portion in FIG. 2A. Note that in FIG. 2B, the same portions as in FIG. 2A are denoted by the same reference numerals.

A common potential line 310 is provided over the gate insulating layer 302, and formed by using the same material and the same step as a source electrode layer and a drain electrode layer of the thin film transistor 320.

The common potential line 310 is covered with the protective insulating layer 303. The protective insulating layer 303 has a plurality of opening portions in positions overlapping with the common potential line 310. These opening portions are formed in the same step as a contact hole that connects the drain electrode layer of the thin film transistor 320 and the pixel electrode layer 327.

Note that the contact hole in the pixel portion and the opening portions in the common connection portion are distinctively described because their sizes differ considerably. Further, in FIG. 2A, the pixel portion and the common connection portion are not illustrated on the same scale. For example, the length of the dashed line A1-A2 in the common connection portion is about 500 μm while the width of the thin film transistor is less than 50 μm; thus, the common connection portion actually has greater than or equal to ten times as large area as the thin film transistor. However, for simplicity, the pixel portion and the common connection portion are shown on different scales in FIG. 2A.

A common electrode layer 306 is provided over the protective insulating layer 303 and formed using the same material and the same step as the pixel electrode layer 327 in the pixel portion.

In this manner, the common connection portion is manufactured in the same process as the switching element in the pixel portion.

The first substrate provided with the pixel portion and the common connection portion and the second substrate having the counter electrode layer are fixed with the sealing material.

In the case where the sealing material contains conductive particles, the first and second substrates are aligned so that the sealing material overlaps with the common connection portion. For example, in the case of a small liquid crystal panel, two common connection portions overlap with the sealing material at opposite corners of the pixel portion. In the case of a large liquid crystal panel, four or more common connection portions overlap with the sealing material.

Note that the common electrode layer 306 is an electrode in contact with the conductive particles contained in the sealing material, and is electrically connected to the counter electrode layer of the second substrate.

In the case of using a liquid crystal injection method, the first and second substrates are fixed with a sealing material, and then a liquid crystal is injected between the first substrate and the second substrate. In the case of using a liquid crystal dropping method, a sealing material is drawn on the second substrate or the first substrate and a liquid crystal is dropped thereon; then, the first and second substrates are bonded to each other under a reduced pressure.

This embodiment shows an example of the common connection portion electrically connected to the counter electrode layer. However, the present invention is not particularly limited to the connection of the counter electrode layer with the common connection portion and can be applied to a connection portion for the connection of the counter electrode layer to another wiring or to an external connection terminal or the like.

This embodiment can be freely combined with Embodiment 1.

Embodiment 3

In Embodiment 2, an example is described in which a common connection portion is manufactured using a wiring which is formed using the same material and the same step as source and drain electrode layers as a common potential line. In this embodiment, an example of a common connection portion different from that of FIGS. 2A and 2B is described.

Figure 3A:
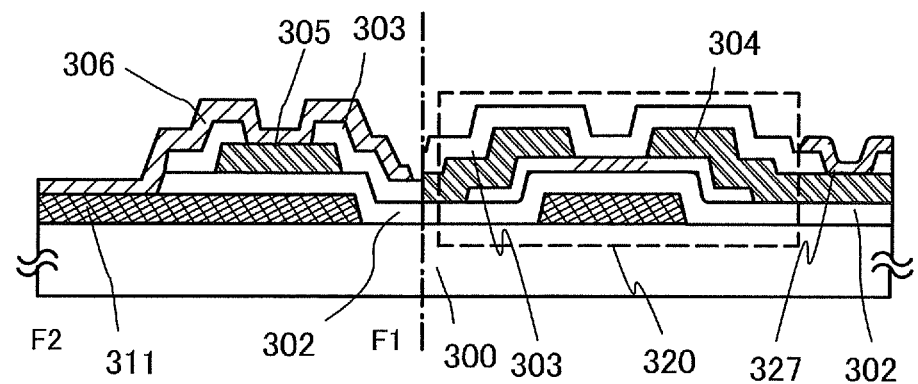
FIGS. 3A and 3B are a cross-sectional view and a top view illustrating one embodiment of the present invention.
Figure 3B:
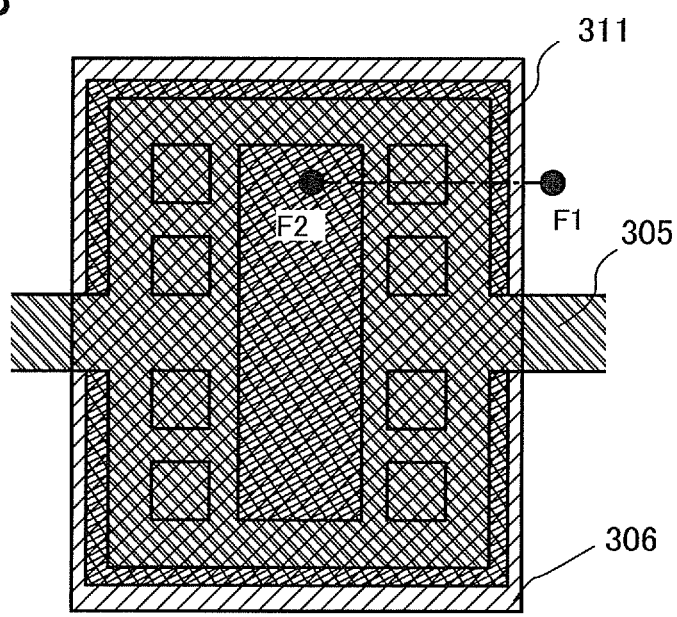

In this embodiment, an example of manufacturing a common connection portion, in which an electrode formed using the same material and the same step as a gate wiring is formed and a wiring formed using the same material and the same step as a drain electrode layer is provided as a common potential line over the electrode, will be illustrated in FIGS. 3A and 3B.

FIG. 3B illustrates an example of a top view of the common connection portion, and dashed line F1-F2 in FIG. 3B corresponds to a cross section of the common connection portion in FIG. 3A.

Note that as illustrated in FIG. 3A, a thin film transistor in a pixel portion has the same structure as that of Embodiment 2; thus, portions similar to those in FIG. 2A are denoted by the same reference numerals and detailed description is omitted here.

A common electrode 311 is provided over the first substrate 300 and formed using the same material and the same step as a gate electrode of the thin film transistor 320.

In addition, the common electrode 311 is covered with the gate insulating layer 302 and the protective insulating layer 303. The gate insulating layer 302 and the protective insulating layer 303 have an opening portion in a position overlapping with the common electrode 311. This opening portion, unlike in Embodiment 2, has a large depth which corresponds to the thickness of the two insulating layers. Note that this opening portion is manufactured by etching in the same step as a contact hole for connecting the drain electrode layer 304 and the pixel electrode layer 327, and then further etching the gate insulating layer selectively.

A common potential line 305 is provided over the gate insulating layer 302 and formed using the same material and the same step as the drain electrode layer 304.

The common potential line 305 is covered with the protective insulating layer 303, and the protective insulating layer 303 has a plurality of opening portions in positions overlapping with the common potential line 305. These opening portions are formed in the same step as a contact hole that connects the drain electrode layer 304 and the pixel electrode layer 327.

The common electrode layer 306 is provided over the protective insulating layer 303 and formed using the same material and the same step as the pixel electrode layer 327 in the pixel portion.

In this manner, the common connection portion is manufactured in the same process as the switching element in the pixel portion.

Then, the first substrate provided with the pixel portion and the common connection portion and a second substrate having a counter electrode are fixed with a sealing material.

Note that in this embodiment, a plurality of conductive particles is selectively disposed in the opening portion of the gate insulating layer. That is, the plurality of conductive particles is disposed in a region where the common electrode layer 306 and the common electrode 311 are in contact with each other. The common electrode layer 306 touching both the common electrode 311 and the common potential line 305 is an electrode in contact with the conductive particles, and is electrically connected to the counter electrode of the second substrate.

In the case of using a liquid crystal injection method, after the pair of substrates is fixed with a sealing material, a liquid crystal is injected between the pair of substrates. In the case of using a liquid crystal dropping method, after a sealing material is drawn on the second substrate or the first substrate and a liquid crystal is dropped thereon, the pair of substrates is bonded to each other under a reduced pressure.

This embodiment shows an example of the common connection portion electrically connected to the counter electrode. However, the present invention is not particularly limited to the connection of the counter electrode with the common connection portion and can be applied to a connection portion for the connection of the counter electrode to another wiring or to an external connection terminal or the like.

This embodiment can be freely combined with Embodiment 1 or 2. For example, the connection wiring 1208 and the connection wiring 1246 of Embodiment 1, which are adjacent to each other, have different potentials and are connected to the respective counter electrode layers. An electrical short circuit can be prevented and a distance between the wirings can be smaller in the following manner: a structure in which one of the wirings and one of the counter electrode layers are connected is employed in the common connection portion using the common potential line of Embodiment 2 which is formed using the same material and the same step as the source and drain electrode layers; and a structure in which the other of the wirings and the other of the counter electrode layers are connected is employed in the common connection portion using a structure of the common potential line of this embodiment which is formed using the same material and the same step as the drain electrode layer.

Embodiment 4

In this embodiment, an example of a thin film transistor which is applicable to the semiconductor device disclosed in this specification is described. Thin film transistors 410 and 420 which are described in this embodiment can be used as the driver circuit thin film transistor 1223 and the pixel thin film transistor 1211 in Embodiment 1, and the thin film transistor 320 in Embodiment 2 or 3.

One embodiment of a semiconductor device and a manufacturing method of the semiconductor device of this embodiment is described with reference to FIGS. 4A to 4E.

Figure 4A:
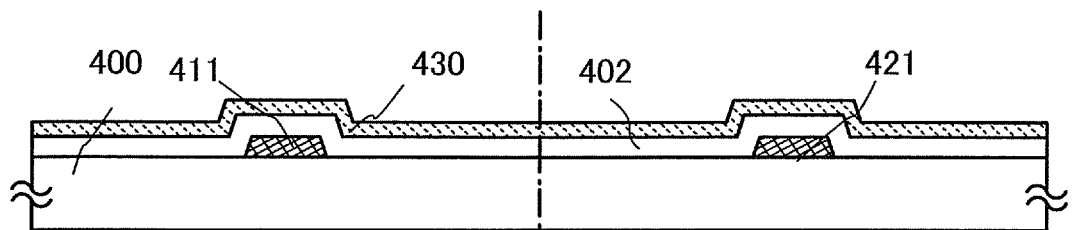
FIGS. 4A to 4E are cross-sectional views illustrating a manufacturing method of a semiconductor device.
Figure 4B:
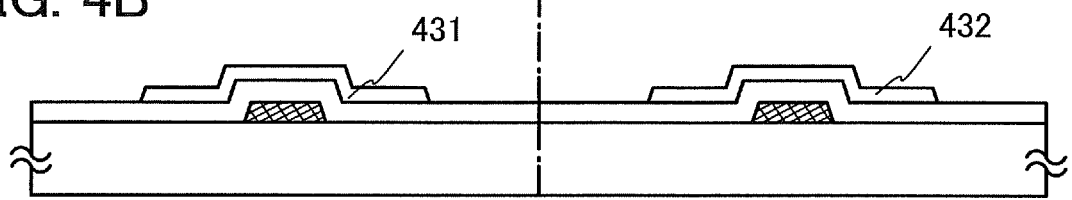
Figure 4C:
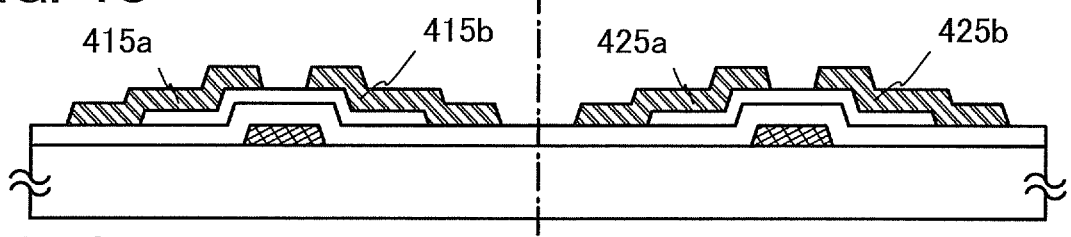
Figure 4D:
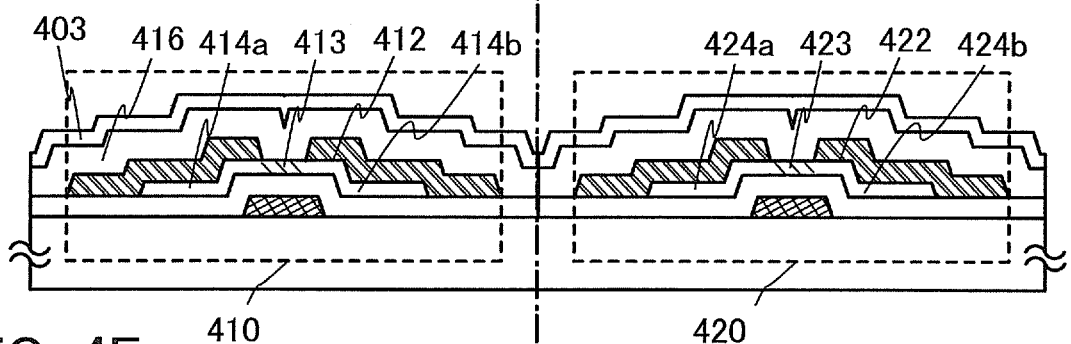

FIGS. 4A to 4E illustrate cross-sectional structures of a semiconductor device. The thin film transistors 410 and 420 in FIG. 4D each have one of bottom-gate structures called a channel-etched type and are also referred to as an inverted-staggered thin film transistor. In FIG. 4D, the thin film transistor 410 is the driver circuit thin film transistor and the thin film transistor 420 is the pixel thin film transistor.

Although description is given using single-gate thin film transistors as the thin film transistors 410 and 420, multi-gate thin film transistors each including a plurality of channel formation regions may be formed as needed.

A process of manufacturing the thin film transistors 410 and 420 over a substrate 400 is described below with reference to FIGS. 4A to 4E.

First, a conductive film is formed over the substrate 400 having an insulating surface, and then, gate electrode layers 411 and 421 are formed in a first photolithography step. Note that a resist mask may be formed by an inkjet method. When the resist mask is formed by an inkjet method, a photomask is not used; therefore, manufacturing costs can be reduced.

There is no particular limitation on a substrate that can be used as the substrate 400 having an insulating surface as long as it has at least heat resistance to withstand heat treatment performed later. A glass substrate formed using barium borosilicate glass, aluminoborosilicate glass, or the like can be used.

When the temperature of the heat treatment performed later is high, a substrate having a strain point higher than or equal to 730° C. is preferably used as the glass substrate. As a material of the glass substrate, a glass material such as aluminosilicate glass, aluminoborosilicate glass, or barium borosilicate glass is used, for example. Note that by containing a larger amount of a barium oxide (BaO) than a boric oxide, a glass substrate is heat-resistant and of more practical use. Therefore, a glass substrate containing a larger amount of BaO than $B_2O_3$ is preferably used.

Note that, instead of the glass substrate described above, a substrate formed using an insulator such as a ceramic substrate, a quartz substrate, or a sapphire substrate may be used as the substrate 400. Alternatively, crystallized glass or the like may be used.

An insulating film serving as a base film may be provided between the substrate 400 and the gate electrode layer 411 and between the substrate 400 and the gate electrode layer 421. The base film has a function of preventing diffusion of an impurity element from the substrate 400, and can be formed to have a single-layer or stacked-layer structure using one or more of a silicon nitride film, a silicon oxide film, a silicon nitride oxide film, and a silicon oxynitride film.

The gate electrode layers 411 and 421 can each be formed to have a single-layer structure or a stacked-layer structure using any of metal materials such as molybdenum, titanium, chromium, tantalum, tungsten, aluminum, copper, neodymium, and scandium; or an alloy material containing any of these metal materials as its main component.

As a two-layer stacked structure of each of the gate electrode layers 411 and 421, for example, a two-layer stacked structure in which a molybdenum layer is stacked over an aluminum layer, a two-layer stacked structure in which a molybdenum layer is stacked over a copper layer, a two-layer structure in which a titanium nitride layer or a tantalum nitride layer is stacked over a copper layer, or a two-layer stacked structure in which a titanium nitride layer and a molybdenum layer are stacked is preferable. As a three-layer stacked structure, a stacked layer of a tungsten layer or a tungsten nitride layer, an alloy of aluminum and silicon or an alloy of aluminum and titanium, and a titanium nitride layer or a titanium layer is preferable.

Next, a gate insulating layer 402 is formed over the gate electrode layers 411 and 421.

The gate insulating layer 402 can be formed to have a single-layer or stacked-layer structure using a silicon oxide layer, a silicon nitride layer, a silicon oxynitride layer, a silicon nitride oxide layer, a hafnium oxide layer, or an aluminum oxide layer by a plasma CVD method, a sputtering method, or the like. For example, a silicon oxynitride layer may be formed using $SiH_4$, oxygen, and nitrogen as deposition gases by a plasma CVD method. The thickness of the gate insulating layer 402 is greater than or equal to 100 nm and less than or equal to 500 nm; in the case where the gate insulating layer 402 is formed to have a stacked-layer structure, for example, a first gate insulating layer with a thickness greater than or equal to 50 nm and less than or equal to 200 nm and a second gate insulating layer with a thickness greater than or equal to 5 nm and less than or equal to 300 nm are stacked.

An oxide semiconductor which is made intrinsic or substantially intrinsic (a highly purified oxide semiconductor) is sensitive to an interface state or interface electric charge. Thus, a gate insulating film (GI) which is to be in contact with a highly purified oxide semiconductor needs to have high quality.

For example, a high-density plasma CVD method with the use of microwaves (2.45 GHz), by which a dense and high-quality insulating film having high withstand voltage can be formed, is preferable. This is because an interface state can be reduced and interface characteristics can be favorable when the highly purified oxide semiconductor and the high quality gate insulating film are in contact with each other.

In this embodiment, a silicon oxynitride layer (also referred to as $SiO_xN_y$, where x>y>0) with a thickness less than or equal to 100 nm is formed as the gate insulating layer 402 using a high-density plasma apparatus. Here, a high-density plasma apparatus refers to an apparatus which can realize a plasma density greater than or equal to $1 \times 10^{11}/cm^3$. For example, plasma is generated by applying a microwave power greater than or equal to 3 kW and less than or equal to 6 kW so that the insulating film is formed.

A monosilane gas ($SiH_4$), nitrous oxide ($N_2O$), and a rare gas are introduced into a chamber as a source gas to generate high-density plasma under a pressure greater than or equal to 10 Pa and less than or equal to 30 Pa so that an insulating film is formed over a substrate having an insulating surface, such as a glass substrate. After that, the supply of a monosilane gas is stopped, and nitrous oxide ($N_2O$) and a rare gas are introduced without exposure to the air, so that plasma treatment may be performed on a surface of the insulating film. The plasma treatment performed on the surface of the insulating film by introducing nitrous oxide ($N_2O$) and a rare gas is performed at least after the insulating film is formed. The insulating film formed through the above process procedure has a small thickness and corresponds to an insulating film whose reliability can be ensured even though it has a thickness less than 100 nm, for example.

In forming the gate insulating layer 402, the flow ratio of a monosilane gas ($SiH_4$) to nitrous oxide ($N_2O$) which are introduced into the chamber is in the range of 1:10 to 1:200. In addition, as a rare gas which is introduced into the chamber, helium, argon, krypton, xenon, or the like can be used. In particular, argon, which is inexpensive, is preferably used.

In addition, since the insulating film formed by using the high-density plasma apparatus can have certain thickness, the insulating film has excellent step coverage. Further, as for the insulating film formed by using the high-density plasma apparatus, the thickness of a thin film can be controlled precisely.

The insulating film formed through the above process procedure is greatly different from an insulating film formed using a conventional parallel plate plasma CVD apparatus. The etching rate of the insulating film formed through the above process procedure is lower than that of the insulating film formed using the conventional parallel plate plasma CVD apparatus by greater than or equal to 10% or greater than or equal to 20% in the case where the etching rates with the same etchant are compared with each other. Thus, it can be said that the insulating film formed using the high-density plasma apparatus is a dense film. Needless to say, another method such as a sputtering method or a plasma CVD method can be employed as long as an insulating film having good quality can be formed. Alternatively, an insulating film whose film quality and interface characteristics with an oxide semiconductor are modified by heat treatment after film deposition may be formed. In any case, the gate insulating film needs not only good film quality but also a reduced interface state density of an interface between the gate insulating film and an oxide semiconductor, which can realize a favorable interface.

Then, an oxide semiconductor film 430 is formed to a thickness greater than or equal to 2 nm and less than or equal to 200 nm over the gate insulating layer 402.

Note that before the oxide semiconductor film 430 is formed by a sputtering method, dust attached to a surface of the gate insulating layer 402 is preferably removed by reverse sputtering in which an argon gas is introduced and plasma is generated. The reverse sputtering refers to a method in which, without application of voltage to a target side, an RF power source is used for application of voltage to a substrate side in an argon atmosphere to generate plasma in the vicinity of the substrate to modify a surface. Note that instead of an argon atmosphere, nitrogen, helium, oxygen, or the like may be used.

The oxide semiconductor film 430 is formed as an In—Ga—Zn—O-based oxide semiconductor film, an In—Sn—Zn—O-based oxide semiconductor film, an In—Al—Zn—O-based oxide semiconductor film, a Sn—Ga—Zn—O-based oxide semiconductor film, an Al—Ga—Zn—O-based oxide semiconductor film, a Sn—Al—Zn—O-based oxide semiconductor film, an In—Zn—O-based oxide semiconductor film, a Sn—Zn—O-based oxide semiconductor film, an Al—Zn—O-based oxide semiconductor film, an In—O-based oxide semiconductor film, a Sn—O-based oxide semiconductor film, or a Zn—O-based oxide semiconductor film. In this embodiment, the oxide semiconductor film 430 is formed by a sputtering method with the use of an In—Ga—Zn—O-based metal oxide target. A cross-sectional view of this stage is illustrated in FIG. 4A. Further, the oxide semiconductor film 430 can be formed by a sputtering method in a rare gas (typically argon) atmosphere, an oxygen atmosphere, or an atmosphere of a rare gas (typically argon) and oxygen. In the case of using a sputtering method, deposition may be performed with the use of a target containing $SiO_2$ at greater than or equal to 2 wt % and less than or equal to 10 wt %.

Here, film deposition is performed using a metal oxide target containing In, Ga, and Zn ($In_2O_3$:$Ga_2O_3$:ZnO=1:1:1 [molar ratio]). The deposition condition is set as follows: the distance between the substrate 400 and the target is 100 mm; the pressure is 0.2 Pa; the direct current (DC) power supply is 0.5 kW; and the atmosphere is a mixed atmosphere of argon and oxygen (argon:oxygen=30 sccm:20 sccm and the oxygen flow rate is 40%). Note that a pulse direct current (DC) power supply is preferable because powder substances (also referred to as particles or dust) generated in film formation can be reduced and the film thickness can be uniform. The In—Ga—Zn—O-based film is formed to a thickness greater than or equal to 5 nm and less than or equal to 200 nm. In this embodiment, as the oxide semiconductor film, a 20-nm-thick In—Ga—Zn—O-based film is formed by a sputtering method with the use of an In—Ga—Zn—O-based metal oxide target. As a metal oxide target containing In, Ga, and Zn, a target having a composition ratio of $In_2O_3$:$Ga_2O_3$:ZnO=1:1:2 [molar ratio] or a target having a composition ratio of $In_2O_3$:$Ga_2O_3$:ZnO=1:1:4 [molar ratio] can also be used.

Examples of a sputtering method include an RF sputtering method in which a high-frequency power source is used as a sputtering power source, a DC sputtering method, and a pulsed DC sputtering method in which a bias is applied in a pulsed manner. An RF sputtering method is mainly used in the case of forming an insulating film, and a DC sputtering method is mainly used in the case of forming a metal film.

In addition, there is a multi-source sputtering apparatus in which a plurality of targets of different materials can be set. With the multi-source sputtering apparatus, films of different materials can be deposited to be stacked in the same chamber, and a film of plural kinds of materials can be deposited by electric discharge at the same time in the same chamber.

In addition, there are a sputtering apparatus provided with a magnet system inside the chamber and used for a magnetron sputtering method, and a sputtering apparatus used for an ECR sputtering method in which plasma generated with the use of microwaves is used without using glow discharge.

Furthermore, as a deposition method using sputtering, there are also a reactive sputtering method in which a target substance and a sputtering gas component are chemically reacted with each other during deposition to form a thin compound film thereof, and a bias sputtering method in which a voltage is also applied to a substrate during deposition.

Then, in a second photolithography step, the oxide semiconductor film 430 is processed into island-shaped oxide semiconductor layers. The resist mask for forming the island-shaped oxide semiconductor layers may be formed by an inkjet method. When the resist mask is formed by an inkjet method, a photomask is not used; therefore, manufacturing costs can be reduced.

Next, the oxide semiconductor layers are subjected to dehydration or dehydrogenation. The temperature of first heat treatment for dehydration or dehydrogenation is higher than or equal to 400° C. and lower than or equal to 750° C., preferably higher than or equal to 400° C. and lower than the strain point of the substrate. Here, the substrate is introduced into an electric furnace which is a kind of heat treatment apparatus, heat treatment is performed on the oxide semiconductor layers in a nitrogen atmosphere at 450° C. for one hour, and then, the oxide semiconductor layers are not exposed to the air so that entry of water and hydrogen into the oxide semiconductor layers is prevented; thus, oxide semiconductor layers 431 and 432 are obtained (see FIG. 4B).

The apparatus for the heat treatment is not limited to the electric furnace and may be the one provided with a device for heating an object to be processed, using heat conduction or heat radiation from a heating element such as a resistance heating element. For example, a rapid thermal anneal (RTA) apparatus such as a gas rapid thermal anneal (GRTA) apparatus or a lamp rapid thermal anneal (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the gas, an inert gas which does not react with an object to be processed by heat treatment, such as nitrogen or a rare gas such as argon is used.

For example, as the first heat treatment, GRTA may be performed as follows. The substrate is placed in an inert gas which has been heated to a high temperature of 650° C. to 700° C., heated for several minutes, and transferred and taken out from the heated inert gas. With GRTA, high-temperature heat treatment for a short period of time can be achieved.

Note that in the first heat treatment, it is preferable that water, hydrogen, and the like be not contained in nitrogen or a rare gas such as helium, neon, or argon. Alternatively, it is preferable that nitrogen or a rare gas such as helium, neon, or argon introduced into an apparatus for the heat treatment have a purity of greater than or equal to 6N (99.9999%), preferably, greater than or equal to 7N (99.99999%) (that is, an impurity concentration is set to less than or equal to 1 ppm, preferably, less than or equal to 0.1 ppm).

The oxide semiconductor layers might be crystallized to be a microcrystalline film or a polycrystalline film depending on a condition of the first heat treatment or a material of the oxide semiconductor layers. For example, the oxide semiconductor layers may be crystallized to become microcrystalline oxide semiconductor layers having a degree of crystallization of greater than or equal to 90%, or greater than or equal to 80%. Further, depending on the condition of the first heat treatment and the material of the oxide semiconductor layers, the oxide semiconductor layers may become amorphous oxide semiconductor layers containing no crystalline component. The oxide semiconductor layers might become oxide semiconductor layers in which a microcrystalline portion (with a grain diameter greater than or equal to 1 nm and less than or equal to 20 nm, typically greater than or equal to 2 nm and less than or equal to 4 nm) is mixed in an amorphous oxide semiconductor. A needle-like crystal in a longitudinal direction (the film-thickness direction) might be generated on the surface side of the oxide semiconductor layers in the case where heat treatment at a high temperature is performed using RTA (e.g., GRTA or LRTA).

Alternatively, the first heat treatment may be performed on the oxide semiconductor film 430 which has not yet been processed into the island-shaped oxide semiconductor layers. In that case, after the first heat treatment, the substrate is taken out of the heating apparatus and a photolithography step is performed.

The heat treatment for dehydration or dehydrogenation of the oxide semiconductor layers may be performed at any of the following timings: after the oxide semiconductor layer is formed; after a source electrode and a drain electrode are formed over the oxide semiconductor layer; and after a protective insulating film is formed over the source electrode and the drain electrode.

Further, the step of forming the contact hole in the gate insulating layer 402 may be performed either before or after the oxide semiconductor film 430 is subjected to dehydration or dehydrogenation treatment.

Note that the etching of the oxide semiconductor film may be dry etching, without being limited to wet etching.

As an etching gas for dry etching, a gas containing chlorine (chlorine-based gas such as chlorine ($Cl_2$), boron chloride ($BCl_3$), silicon chloride ($SiCl_4$), or carbon tetrachloride ($CCl_4$)) is preferably used.

Alternatively, a gas containing fluorine (fluorine-based gas such as carbon tetrafluoride ($CF_4$), sulfur fluoride ($SF_6$), nitrogen fluoride ($NF_3$), or trifluoromethane ($CHF_3$)); hydrogen bromide (HBr); oxygen ($O_2$); any of these gases to which a rare gas such as helium (He) or argon (Ar) is added; or the like can be used.

As the dry etching method, a parallel plate reactive ion etching (RIE) method or an inductively coupled plasma (ICP) etching method can be used. In order to etch the oxide semiconductor film into a desired shape, the etching condition (the amount of electric power applied to a coil-shaped electrode, the amount of electric power applied to an electrode on a substrate side, the temperature of the electrode on the substrate side, or the like) is adjusted as appropriate.

As an etchant used for wet etching of the oxide semiconductor film, a solution obtained by mixing phosphoric acid, acetic acid, and nitric acid, an ammonia peroxide mixture (hydrogen peroxide water at 31 wt %:ammonia water at 28 wt %:water=5:2:2), or the like can be used. Alternatively, ITO07N (produced by KANTO CHEMICAL CO., INC.) may be used.

The etchant used in the wet etching is removed by cleaning together with the material which is etched off. The waste liquid containing the etchant and the material etched off may be purified and the material may be reused. When a material such as indium contained in the oxide semiconductor layer is collected from the waste liquid after the etching and reused, the resources can be efficiently reused and the cost can be reduced.

The etching conditions (such as an etchant, etching time, and temperature) are appropriately adjusted depending on the material so that the material can be etched into a desired shape.

Next, a metal conductive film is formed over the gate insulating layer 402 and the oxide semiconductor layers 431 and 432. The metal conductive film may be formed by a sputtering method or a vacuum evaporation method. As a material of the metal conductive film, there are an element selected from Al, Cr, Cu, Ta, Ti, Mo, and W; an alloy containing any of the above elements as its component; an alloy film containing a combination of any of these elements; and the like. Further, one or more materials selected from manganese, magnesium, zirconium, beryllium, and thorium may be used. The metal conductive film may have a single-layer structure or a stacked-layer structure of two or more layers. For example, a single-layer structure of an aluminum film containing silicon, a two-layer structure in which a titanium film is stacked over an aluminum film, a three-layer structure in which a Ti film, an aluminum film, and a Ti film are stacked in the order presented, and the like can be given. Alternatively, a film, an alloy film, or a nitride film of a combination of Al and one or plurality of elements selected from the followings may be used: titanium (Ti), tantalum (Ta), tungsten (W), molybdenum (Mo), chromium (Cr), neodymium (Nd), and scandium (Sc).

If heat treatment is performed after formation of the metal conductive film, it is preferable that the metal conductive film have heat resistance enough to withstand the heat treatment.

A third photolithography step is performed. A resist mask is formed over the metal conductive film and selective etching is performed, so that a source electrode layer 415a, a drain electrode layer 415b, a source electrode layer 425a, and a drain electrode layer 425b are formed. Then, the resist mask is removed (see FIG. 4C).

Note that materials and etching conditions are adjusted as appropriate so that the oxide semiconductor layers 431 and 432 are not removed by etching of the metal conductive film.

In this embodiment, a Ti film is used as the metal conductive film, an In—Ga—Zn—O-based metal oxide is used as the oxide semiconductor layers 431 and 432, and an ammonia peroxide mixture (31 wt % hydrogen peroxide in water: 28 wt % ammonia water:water=5:2:2) is used as the etchant for the Ti film.

Note that in the third photolithography step, parts of the oxide semiconductor layers 431 and 432 are etched, whereby oxide semiconductor layers each having a groove (a depressed portion) might be formed. The resist mask used for forming the source electrode layer 415a, the drain electrode layer 415b, the source electrode layer 425a, and the drain electrode layer 425b may be formed by an inkjet method. When the resist mask is formed by an inkjet method, a photomask is not used; therefore, manufacturing costs can be reduced.

In order to reduce the number of photomasks and steps in photolithography steps, etching may be performed with the use of a resist mask formed using a multi-tone mask which is a light-exposure mask through which light is transmitted so as to have a plurality of intensities. Since a resist mask formed with the use of a multi-tone mask has a plurality of film thicknesses and further can be changed in shape by performing etching on the resist mask, the resist mask can be used in a plurality of etching steps of making different patterns. Therefore, a resist mask corresponding at least two or more kinds of different patterns can be formed using one multi-tone mask. Thus, the number of light-exposure masks can be reduced and the number of corresponding photolithography steps can be also reduced, whereby simplification of a process can be realized.

Then, plasma treatment with a gas such as $N_2O$, $N_2$, or Ar is performed. By this plasma treatment, water adsorbed to surfaces of exposed portions of the oxide semiconductor layers, and the like are removed. Alternatively, plasma treatment may be performed using a mixed gas of oxygen and argon.

After the plasma treatment, an oxide insulating layer 416 which serves as a protective insulating film and is in contact with parts of the oxide semiconductor layers 431 and 432 is formed without exposure to the air.

The oxide insulating layer 416 can be formed to a thickness of at least 1 nm by a method in which impurities such as water and hydrogen do not enter the oxide insulating layer 416, such as a sputtering method. When hydrogen is contained in the oxide insulating layer 416, entry of the hydrogen to the oxide semiconductor layers 431 and 432 or abstraction of oxygen in the oxide semiconductor layers by the hydrogen is caused, thereby making backchannels of the oxide semiconductor layers 431 and 432 have a lower resistance (have n-type conductivity) and forming parasitic channels. Therefore, it is important that a film formation method in which hydrogen is not used is employed in order to form the oxide insulating layer 416 containing as little hydrogen as possible.

In this embodiment, a silicon oxide film is formed to a thickness of 200 nm by a sputtering method for the oxide insulating layer 416. The substrate temperature in deposition may be higher than or equal to a room temperature and lower than or equal to 300° C. and is 100° C. in this embodiment. The silicon oxide film can be formed by a sputtering method in a rare gas (typically argon) atmosphere, an oxygen atmosphere, or an atmosphere containing a rare gas (typically argon) and oxygen. As a target, a silicon oxide target or a silicon target can be used. For example, the silicon oxide film can be formed using a silicon target by a sputtering method in an atmosphere of oxygen and nitrogen. For the oxide insulating layer 416 formed in contact with the oxide semiconductor layers 431 and 432 having reduced resistance, an inorganic insulating film that does not contain impurities such as moisture, a hydrogen ion, and OH— and blocks entry of these from the outside is used. Typically, a silicon oxide film, a silicon nitride oxide film, an aluminum oxide film, an aluminum oxynitride film, or the like is used.

Next, second heat treatment (preferably higher than or equal to 200° C. and lower than or equal to 400° C., for example, higher than or equal to 250° C. and lower than or equal to 350° C.) is performed in an inert gas atmosphere or an oxygen gas atmosphere. For example, the second heat treatment is performed in a nitrogen atmosphere at 250° C. for one hour. In the second heat treatment, parts of the oxide semiconductor layers 431 and 432 (the channel formation regions) are heated while in contact with the oxide insulating layer 416.

Through the above steps, the oxide semiconductor layers 431 and 432 are placed in an oxygen-deficient state and are decreased in resistance by the heat treatment for dehydration or dehydrogenation; then, parts of the oxide semiconductor layers 431 and 432 are selectively placed in an oxygen-excess state. As a result, a channel formation region 413 overlapping with the gate electrode layer 411 becomes i-type, and a high-resistance source region 414a overlapping with the source electrode layer 415a and a high-resistance drain region 414b overlapping with the drain electrode layer 415b are formed in a self-aligned manner. Through the above steps, the thin film transistor 410 is formed. Similarly, a channel formation region 423 overlapping with the gate electrode layer 421 becomes i-type, and a high-resistance source region 424a overlapping with the source electrode layer 425a and a high-resistance drain region 424b overlapping with the drain electrode layer 425b are formed in a self-aligned manner. Through the above steps, the thin film transistor 420 is formed.

Further, heat treatment may be performed at a temperature higher than or equal to 100° C. and lower than or equal to 200° C. for greater than or equal to one hour and less than or equal to 30 hours in the air. In this embodiment, the heat treatment is performed at 150° C. for 10 hours. This heat treatment may be performed at a fixed heating temperature. Alternatively, the following temperature cycle may be applied plural times repeatedly: the temperature is increased from a room temperature to a temperature higher than or equal to 100° C. and lower than or equal to 200° C. and then decreased to a room temperature. Further, this heat treatment may be performed under a reduced pressure before formation of the oxide insulating layer 416. Under a reduced pressure, the heating time can be shortened. With such heat treatment, hydrogen is introduced from the oxide semiconductor layers 431 and 432 to the oxide insulating layer 416; thus, normally-off thin film transistors can be obtained. Therefore, reliability of the semiconductor device can be improved.

Note that by forming the high-resistance drain regions 414b and 424b (or the high-resistance source regions 414a and 424a) in the oxide semiconductor layers 431 and 432 overlapping with the drain electrode layers 415b and 425b (and the source electrode layers 415a and 425a), reliability of the thin film transistors 410 and 420 can be improved. Specifically, by forming the high-resistance drain regions 414b and 424b, the structure can be obtained in which conductivities of the drain electrode layers 415b and 425b, the high-resistance drain regions 414b and 424b, and the channel formation regions 413 and 423 vary stepwise. Therefore, in the case where the thin film transistors 410 and 420 operate with the drain electrode layers 415b and 425b connected to a wiring for supplying a high power supply potential $V_{DD}$, the high-resistance drain regions 414b and 424b serve as a buffer and a high electric field is not applied locally even if the high electric field is applied between the gate electrode layer 411 and the drain electrode layer 415b and between the gate electrode layer 421 and the drain electrode layer 425b; thus, the withstand voltage of the thin film transistor can be increased.

Further, the high-resistance source regions 414a and 424a or the high-resistance drain regions 414b and 424b in the oxide semiconductor layers 431 and 432 are formed in the entire thickness direction in the case where the thickness of the oxide semiconductor layers 431 and 432 is less than or equal to 15 nm. In the case where the thickness of the oxide semiconductor layer is greater than or equal to 30 nm and less than or equal to 50 nm, parts of the oxide semiconductor layers 431 and 432, that is, regions in contact with the source electrode layers 415a and 425a or the drain electrode layers 415b and 425b and the vicinity thereof are reduced in resistance and become a high-resistance source regions 414a and 424a or a high-resistance drain regions 414b and 424b, while regions in the oxide semiconductor layers 431 and 432 which are close to the gate insulating layer 402 can be made to be i-type.

A protective insulating layer 403 may be additionally formed over the oxide insulating layer 416. For example, a silicon nitride film is formed by an RF sputtering method. An RF sputtering method is preferable as a formation method of the protective insulating layer because of high productivity. The protective insulating layer 403 is formed using an inorganic insulating film which does not contain impurities such as moisture, a hydrogen ion, and OH and blocks entry of these from the outside; for example, a silicon nitride film, an aluminum nitride film, a silicon nitride oxide film, an aluminum oxynitride film, or the like is used. In this embodiment, the protective insulating layer 403 is formed using a silicon nitride film (see FIG. 4D).

Figure 4E:
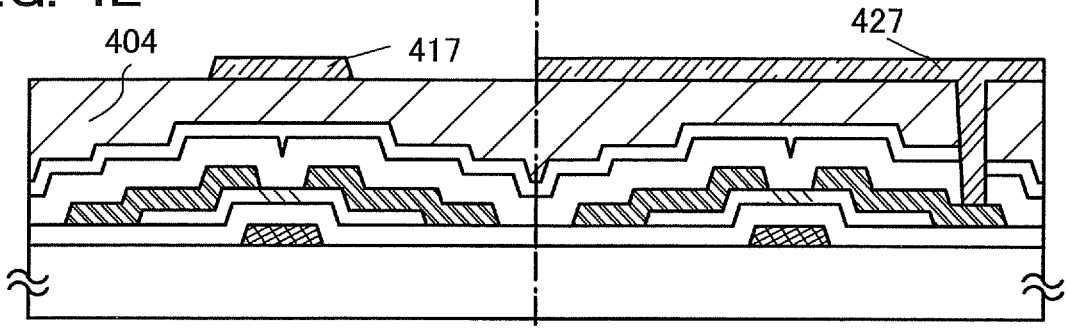
Figure 5A:
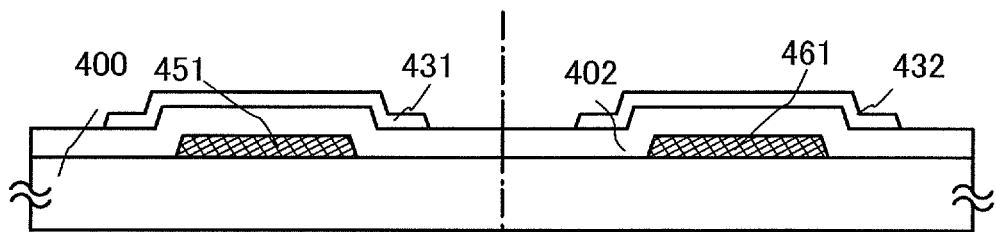
FIGS. 5A to 5E are cross-sectional views illustrating a manufacturing method of a semiconductor device.
Figure 5B:
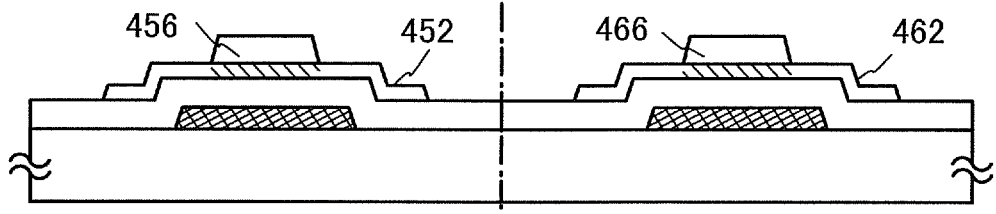
Figure 5C:
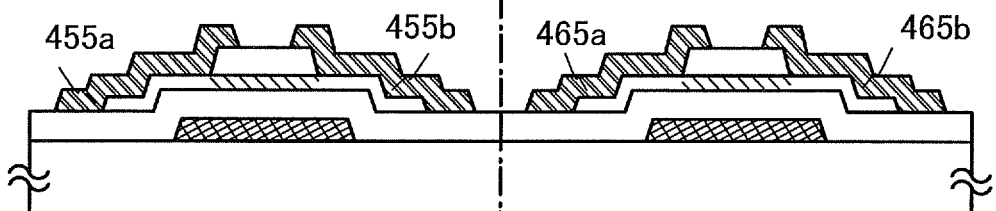
Figure 5D:
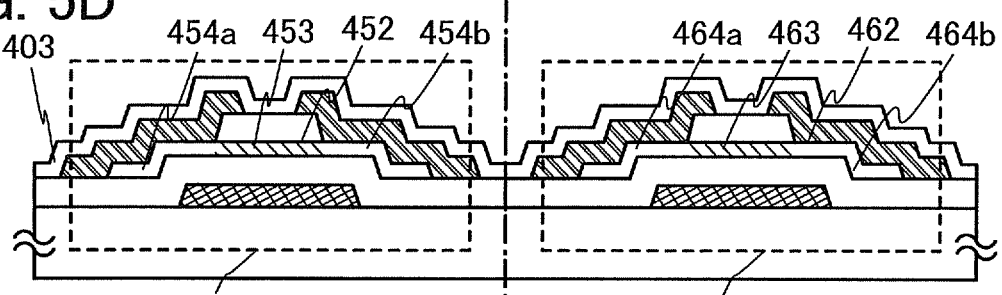
Figure 5E:
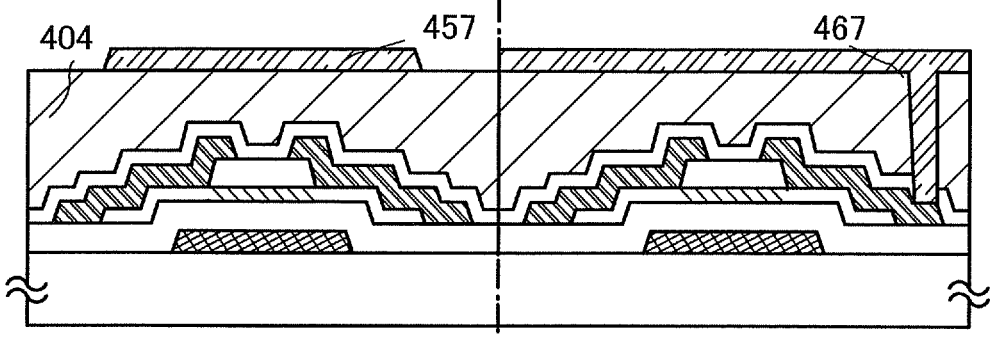

A planarization insulating layer for planarization may be provided over the protective insulating layer 403. As illustrated in FIG. 4E, a planarization insulating layer 404 is formed in this embodiment.

The planarization insulating layer 404 can be formed using an organic material having heat resistance, such as a polyimide, an acrylic resin, a benzocyclobutene-based resin, a polyamide, or an epoxy resin. Other than such organic materials, it is also possible to use a low-dielectric constant material (a low-k material), a siloxane-based resin, phosphosilicate glass (PSG), borophosphosilicate glass (BPSG), or the like. The planarization insulating layer 404 may be formed by stacking plural insulating films formed using any of these materials.

Note that the siloxane-based resin corresponds to a resin containing a Si—O—Si bond formed using a siloxane-based material as a starting material. The siloxane-based resin may contain as a substituent an organic group (e.g., an alkyl group or an aryl group) or a fluoro group. In addition, the organic group may contain a fluoro group.

There is no particular limitation on the method for forming the planarization insulating layer 404, and the planarization insulating layer 404 can be formed, depending on the material, by a method such as a sputtering method, an SOG method, spin coating, dip coating, spray coating, or a droplet discharge method (e.g., an inkjet method, screen printing, or offset printing), or a tool (equipment) such as a doctor knife, a roll coater, a curtain coater, or a knife coater.

A fourth photolithography step is performed. A resist mask is formed and selective etching is performed to remove parts of the oxide insulating layer 416, the protective insulating layer 403, and the planarization insulating layer 404, so that an opening reaching the drain electrode layer 425b is formed.

Next, a light-transmitting conductive film is formed. The light-transmitting conductive film is formed using an indium oxide ($In_2O_3$), an indium oxide-tin oxide mixed oxide ($In_2O_3$—$SnO_2$, abbreviated as ITO), or the like by a sputtering method, a vacuum evaporation method, or the like. Alternatively, an Al—Zn—O-based film containing nitrogen, that is, an Al—Zn—O—N-based film, a Zn—O—N-based film, or a Sn—Zn—O—N-based film may be used. Note that the composition (at. %) of zinc in the Al—Zn—O—N-based film is less than or equal to 47 at. % and is higher than that of aluminum in the film; the composition (at. %) of aluminum in the film is higher than that of nitrogen in the film. Such a material is etched with a hydrochloric acid-based solution. However, since an etching residue is easily precipitated and left over the substrate particularly in etching ITO, an indium oxide-zinc oxide mixed oxide ($In_2O_3$—ZnO) may be used to improve etching processability.

Note that the unit of the composition of components in the light-transmitting conductive film is atomic percent (at. %), and the composition of components is evaluated by analysis using an electron probe X-ray microanalyzer (EPMA).

Next, a fifth photolithography step is performed. A resist mask is formed and an unnecessary portion of the light-transmitting conductive film is removed by etching to form a pixel electrode layer 427 and a conductive layer 417. Then, the resist mask is removed (see FIG. 4E).

In this embodiment, the step of forming the opening in the gate insulating layer is not illustrated in a drawing; however, the step of forming an opening in the gate insulating layer may be performed in either the same photolithography step as that of the oxide insulating layer and the protective insulating layer or another photolithography step. When the opening is formed in another photolithography step, the number of photolithography steps is six.

This embodiment can be implemented in appropriate combination with any of the other embodiments.

As described above, a semiconductor device which includes a thin film transistor formed using an oxide semiconductor layer and consumes less power can be provided.

Further, a semiconductor device which includes a thin film transistor formed using an oxide semiconductor layer and has high reliability can be provided.

Embodiment 5

In this embodiment, another example of a thin film transistor which is applicable to the semiconductor device disclosed in this specification is described. Thin film transistors 450 and 460 which are described in this embodiment can be used as the driver circuit thin film transistor 1223 and the pixel thin film transistor 1211 in Embodiment 1, and the thin film transistor 320 in Embodiment 2.

One embodiment of a semiconductor device and a manufacturing method of the semiconductor device of this embodiment is described with reference to FIGS. 5A to 5E.

FIGS. 5A to 5E illustrate cross-sectional structures of a semiconductor device. The thin film transistors 450 and 460 in FIG. 5D each have one of the bottom-gate structures called a channel-protection type (also referred to as a channel-stop type) and are also referred to as an inverted-staggered thin film transistor.

Although description is given using single-gate thin film transistors as the thin film transistors 450 and 460, multi-gate thin film transistors each including a plurality of channel formation regions may be formed as needed.

A process of manufacturing the thin film transistors 450 and 460 over the substrate 400 is described below with reference to FIGS. 5A to 5E.

First, a conductive film is formed over the substrate 400 having an insulating surface, and then, gate electrode layers 451 and 461 are formed in a first photolithography step. Note that a resist mask may be formed by an inkjet method. When the resist mask is formed by an inkjet method, a photomask is not used; therefore, manufacturing costs can be reduced.

The gate electrode layers 451 and 461 can each be formed to have a single-layer structure or a stacked-layer structure using any of metal materials such as molybdenum, titanium, chromium, tantalum, tungsten, aluminum, copper, neodymium, and scandium; or an alloy material containing any of these metal materials as its main component.

Next, the gate insulating layer 402 is formed over the gate electrode layers 451 and 461.

In this embodiment, a silicon oxynitride layer is formed to a thickness less than or equal to 100 nm by a plasma CVD method as the gate insulating layer 402.

Next, an oxide semiconductor film is formed over the gate insulating layer 402 to have a thickness greater than or equal to 2 nm and less than or equal to 200 nm and is processed into island-shaped oxide semiconductor layers in a second photolithography step. In this embodiment, the oxide semiconductor film is formed by a sputtering method with the use of an In—Ga—Zn—O-based metal oxide target.

Next, the oxide semiconductor layers are subjected to dehydration or dehydrogenation. The temperature of first heat treatment for dehydration or dehydrogenation is higher than or equal to 400° C. and lower than or equal to 750° C., preferably higher than or equal to 400° C. and lower than the strain point of the substrate. Here, the substrate is introduced into an electric furnace which is a kind of heat treatment apparatus, heat treatment is performed on the oxide semiconductor layers in a nitrogen atmosphere at 450° C. for one hour, and then, the oxide semiconductor layers are not exposed to the air so that entry of water and hydrogen into the oxide semiconductor layers is prevented. Thus, oxide semiconductor layers 431 and 432 are obtained (see FIG. 5A).

Then, plasma treatment with a gas such as $N_2O$, $N_2$, or Ar is performed. By this plasma treatment, water adsorbed to surfaces of exposed portions of the oxide semiconductor layers, and the like are removed. Alternatively, plasma treatment may be performed using a mixed gas of oxygen and argon.

Next, after an oxide insulating layer is formed over the gate insulating layer 402 and the oxide semiconductor layers 431 and 432, a third photolithography step is performed. A resist mask is formed and etching is performed selectively, whereby oxide insulating layers 456 and 466 are formed. After that, the resist mask is removed.

In this embodiment, a silicon oxide film is formed to a thickness of 200 nm by a sputtering method as the oxide insulating layers 456 and 466. The substrate temperature in deposition may be higher than or equal to a room temperature and lower than or equal to 300° C. and is 100° C. in this embodiment. The silicon oxide film can be formed by a sputtering method in a rare gas (typically argon) atmosphere, an oxygen atmosphere, or an atmosphere containing a rare gas (typically argon) and oxygen. As a target, a silicon oxide target or a silicon target can be used. For example, the silicon oxide film can be formed using a silicon target by a sputtering method in an atmosphere of oxygen and nitrogen. For the oxide insulating layers 456 and 466 formed in contact with the oxide semiconductor layers 431 and 432, an inorganic insulating film that does not contain impurities such as moisture, a hydrogen ion, and OH and blocks entry of these from the outside is used. Typically, a silicon oxide film, a silicon nitride oxide film, an aluminum oxide film, an aluminum oxynitride film, or the like is used.

Next, second heat treatment (preferably higher than or equal to 200° C. and lower than or equal to 400° C., for example, higher than or equal to 250° C. and lower than or equal to 350° C.) may be performed in an inert gas atmosphere or an oxygen gas atmosphere. For example, the second heat treatment is performed in a nitrogen atmosphere at 250° C. for one hour. In the second heat treatment, parts of the oxide semiconductor layers (the channel formation regions) are heated while in contact with the oxide insulating layers 456 and 466.

In this embodiment, heat treatment is further performed on the oxide semiconductor layers 431 and 432 over which the oxide insulating layers 456 and 466 are provided and thus parts of the oxide semiconductor layers 431 and 432 are exposed in an inert gas atmosphere such as nitrogen or under reduced pressure. By performing heat treatment in an inert gas atmosphere such as nitrogen or under reduced pressure, regions of the oxide semiconductor layers 431 and 432, which are not covered with the oxide insulating layers 456 and 466 and are thus exposed, can be reduced in resistance. For example, heat treatment is performed in a nitrogen atmosphere at 250° C. for one hour.

By the heat treatment for the oxide semiconductor layers 431 and 432 provided with the oxide insulating layers 456 and 466, respectively, in a nitrogen atmosphere, the resistance of the exposed regions of the oxide semiconductor layers 431 and 432 is reduced. Thus, oxide semiconductor layers 452 and 462 each including regions with different resistances (indicated as shaded regions and white regions in FIG. 5B) are formed.

Next, after a metal conductive film is formed over the gate insulating layer 402, the oxide semiconductor layers 452 and 462, and the oxide insulating layers 456 and 466, a fourth photolithography step is performed. A resist mask is formed and selective etching is performed, whereby source electrode layers 455a and 465a and drain electrode layers 455b and 465b are formed. After that, the resist mask is removed (see FIG. 5C). The source electrode layer 455a and the drain electrode layer 455b are in contact with part of the oxide insulating layer 456 and with part of the oxide semiconductor layer 452. Similarly, the source electrode layer 465a and the drain electrode layer 465b are in contact with part of the oxide insulating layer 466 and with part of the oxide semiconductor layer 462.

As a material of the source electrode layers 455a and 465a and the drain electrode layers 455b and 465b, there are an element selected from Al, Cr, Cu, Ta, Ti, Mo, and W; an alloy containing any of these elements as its component; an alloy film containing a combination of any of these elements; and the like. Further, the metal conductive film may have a single-layer structure or a stacked-layer structure of two or more layers.

Through the above steps, the oxide semiconductor layers 431 and 432 are placed in an oxygen-deficient state and are decreased in resistance by the heat treatment for dehydration or dehydrogenation; then, parts of the oxide semiconductor layers 431 and 432 are selectively placed in an oxygen-excess state. As a result, channel formation regions 453 and 463 overlapping with the gate electrode layers 451 and 461 become i-type, and high-resistance source regions 454a and 464a overlapping with the source electrode layers 455a and 465a and high-resistance drain regions 454b and 464b overlapping with the drain electrode layers 455b and 465b are formed in a self-aligned manner. Through the above steps, the thin film transistors 450 and 460 are formed.

Further, heat treatment may be performed at a temperature higher than or equal to 100° C. and lower than or equal to 200° C. for greater than or equal to one hour and less than or equal to 30 hours in the air. In this embodiment, the heat treatment is performed at 150° C. for 10 hours. This heat treatment may be performed at a fixed heating temperature. Alternatively, the following temperature cycle may be applied plural times repeatedly: the temperature is increased from a room temperature to a temperature higher than or equal to 100° C. and lower than or equal to 200° C. and then decreased to a room temperature. Further, this heat treatment may be performed under a reduced pressure before formation of the oxide insulating layers 456 and 466. Under a reduced pressure, the heating time can be shortened. With such heat treatment, hydrogen is introduced from the oxide semiconductor layers 452 and 462 to the oxide insulating layers 456 and 466; thus, normally-off thin film transistors can be obtained. Therefore, reliability of the semiconductor device can be improved.

Note that by forming the high-resistance drain regions 454b and 464b (or the high-resistance source regions 454a and 464a) in the oxide semiconductor layers 452 and 462 overlapping with the drain electrode layers 455b and 465b (and the source electrode layers 455a and 465a), reliability of the thin film transistors 450 and 460 can be improved. Specifically, by forming the high-resistance drain regions 454b and 464b, the structure can be obtained in which conductivities of the drain electrode layers 455b and 465b, the high-resistance drain regions 454b and 464b, and the channel formation regions 453 and 463 vary stepwise. Therefore, in the case where the thin film transistors operate with the drain electrode layers 455b and 465b connected to a wiring for supplying a high power supply potential $V_{DD}$, the high-resistance drain regions 454b and 464b serve as a buffer and a high electric field is not applied locally even if the high electric field is applied between the gate electrode layer 451 and the drain electrode layer 455b and between the gate electrode layer 461 and the drain electrode layer 465b; thus, the withstand voltage of the transistor can be increased.

A protective insulating layer 403 is formed over the source electrode layers 455a and 465a, the drain electrode layers 455b and 465b, and the oxide insulating layers 456 and 466. In this embodiment, the protective insulating layer 403 is formed using a silicon nitride film (see FIG. 5D).

Alternatively, an oxide insulating layer may be further formed over the source electrode layers 455a and 465a, the drain electrode layers 455b and 465b, and the oxide insulating layers 456 and 466, and the protective insulating layer 403 may be stacked over the oxide insulating layer. In this embodiment, the planarization insulating layer 404 is formed over the protective insulating layer 403.

Next, a fifth photolithography step is performed. A resist mask is formed and selective etching is performed to remove parts of the planarization insulating layer 404 and the protective insulating layer 403, so that an opening reaching the drain electrode layer 465b is formed.

Next, a light-transmitting conductive film is formed, and a sixth photolithography step is performed. A resist mask is formed and an unnecessary portion is removed by etching, whereby a pixel electrode layer 467 and a conductive layer 457 are formed. Then, the resist mask is removed (see FIG. 5E).

In this embodiment, the step of forming the opening in the gate insulating layer is not illustrated in a drawing; however, the step of forming an opening in the gate insulating layer may be performed in either the same photolithography step as that of the oxide insulating layer and the protective insulating layer or another photolithography step. When the opening is formed in another photolithography step, the number of photolithography steps is seven.

This embodiment can be implemented in appropriate combination with any of the other embodiments.

As described above, a semiconductor device which includes a thin film transistor formed using an oxide semiconductor layer and consumes less power can be provided.

Further, a semiconductor device which includes a thin film transistor formed using an oxide semiconductor layer and has high reliability can be provided.

Embodiment 6

In this embodiment, another example of a thin film transistor which is applicable to the semiconductor device disclosed in this specification is described. Thin film transistors 240 and 260 which are described in this embodiment can be used as the driver circuit thin film transistor 1223 and the pixel thin film transistor 1211 in Embodiment 1, and the thin film transistor 320 in Embodiment 2.

One embodiment of a semiconductor device and a manufacturing method of the semiconductor device of this embodiment is described with reference to FIGS. 6A to 6E.

Although description is given using single-gate thin film transistors as the thin film transistors 240 and 260, multi-gate thin film transistors each including a plurality of channel formation regions may be formed as needed.

A process of manufacturing the thin film transistors 240 and 260 over a substrate 290 is described below with reference to FIGS. 6A to 6E.

First, a conductive film is formed over the substrate 290 having an insulating surface, and then, gate electrode layers 241 and 261 are formed in a first photolithography step. In this embodiment, as the gate electrode layers 241 and 261, a tungsten film is formed to a thickness of 150 nm by a sputtering method.

Next, a gate insulating layer 292 is formed over the gate electrode layers 241 and 261. In this embodiment, a silicon oxynitride layer is formed to a thickness less than or equal to 100 nm by a plasma CVD method as the gate insulating layer 292.

Next, a metal conductive film is formed over the gate insulating layer 292, and a second photolithography step is performed. A resist mask is formed over the metal conductive film and selective etching is performed, whereby source electrode layers 245a and 265a and drain electrode layers 245b and 265b are formed. After that, the resist mask is removed (see FIG. 6A).

Figure 6A:
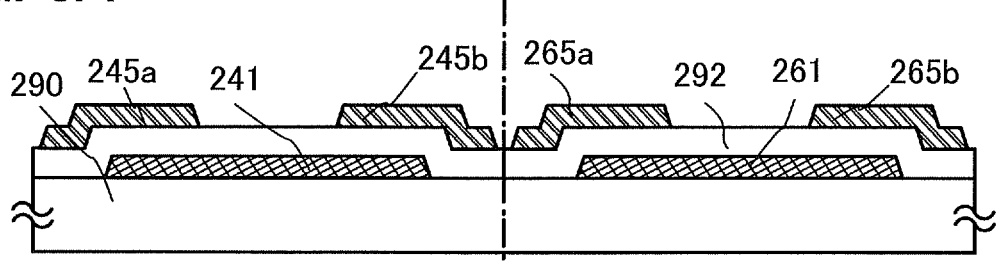
FIGS. 6A to 6E are cross-sectional views illustrating a manufacturing method of a semiconductor device.
Figure 6B:
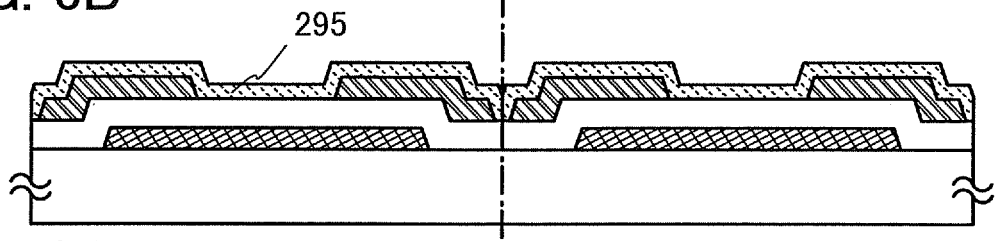
Figure 6C:
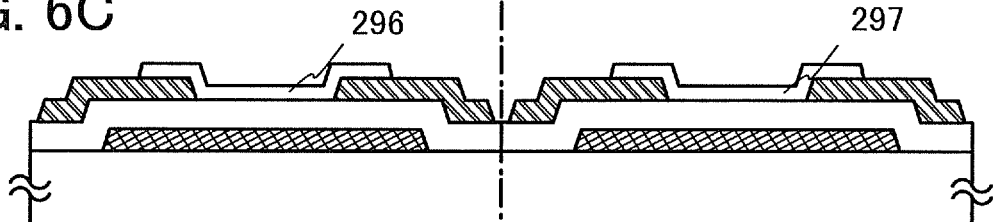
Figure 6D:
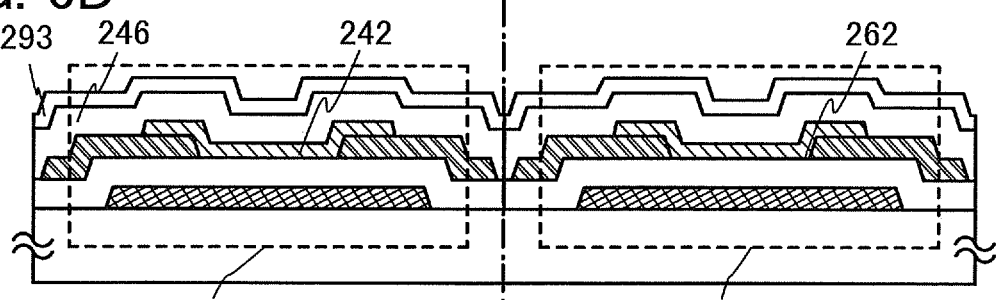
Figure 6E:
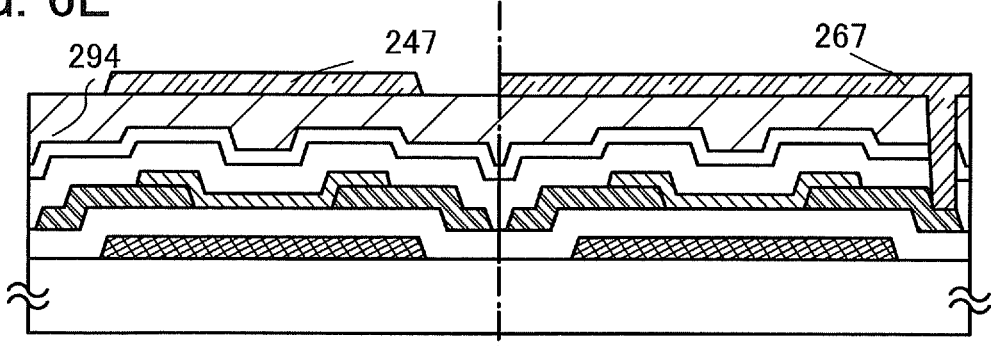

Next, an oxide semiconductor film 295 is formed (see FIG. 6B). In this embodiment, the oxide semiconductor film 295 is formed by a sputtering method with the use of an In—Ga—Zn—O-based metal oxide target. The oxide semiconductor film 295 is processed into island-shaped oxide semiconductor layers in a third photolithography step.

Next, the oxide semiconductor layers are subjected to dehydration or dehydrogenation. The temperature of first heat treatment for dehydration or dehydrogenation is higher than or equal to 400° C. and lower than or equal to 750° C., preferably higher than or equal to 400° C. and lower than the strain point of the substrate. Here, the substrate is introduced into an electric furnace which is a kind of heat treatment apparatus, heat treatment is performed on the oxide semiconductor layers in a nitrogen atmosphere at 450° C. for one hour, and then, the oxide semiconductor layers are not exposed to the air so that entry of water and hydrogen into the oxide semiconductor layers is prevented. Thus, oxide semiconductor layers 296 and 297 are obtained (see FIG. 6C).

As the first heat treatment, GRTA may be performed as follows. The substrate is placed in an inert gas which has been heated to a high temperature of 650° C. to 700° C., heated for several minutes, and transferred and taken out from the heated inert gas. With GRTA, high-temperature heat treatment for a short period of time can be achieved.

An oxide insulating layer 246 to be a protective insulating film is formed in contact with the oxide semiconductor layers 296 and 297.

The oxide insulating layer 246 can be formed to a thickness of at least 1 nm by a method in which impurities such as water and hydrogen do not enter the oxide insulating layer 246, such as a sputtering method. When hydrogen is contained in the oxide insulating layer 246, entry of the hydrogen to the oxide semiconductor layers 296 and 297 or abstraction of oxygen in the oxide semiconductor layers 296 and 297 by the hydrogen is caused, thereby making back-channels of the oxide semiconductor layers 296 and 297 have a lower resistance (have n-type conductivity) and forming parasitic channels. Therefore, it is important that a film formation method in which hydrogen is not used is employed in order to form the oxide insulating layer 246 containing as little hydrogen as possible.

In this embodiment, a silicon oxide film is formed to a thickness of 200 nm as the oxide insulating layer 246 by a sputtering method. The substrate temperature in deposition may be higher than or equal to a room temperature and lower than or equal to 300° C. and is 100° C. in this embodiment. The silicon oxide film can be formed by a sputtering method in a rare gas (typically argon) atmosphere, an oxygen atmosphere, or an atmosphere containing a rare gas (typically argon) and oxygen. As a target, a silicon oxide target or a silicon target can be used. For example, the silicon oxide film can be formed using a silicon target by a sputtering method in an atmosphere of oxygen and nitrogen. For the oxide insulating layer 246 formed in contact with the oxide semiconductor layers 296 and 297 having reduced resistance, an inorganic insulating film that does not contain impurities such as moisture, a hydrogen ion, and OH and blocks entry of these from the outside is used. Typically, a silicon oxide film, a silicon nitride oxide film, an aluminum oxide film, an aluminum oxynitride film, or the like is used.

Next, second heat treatment (preferably higher than or equal to 200° C. and lower than or equal to 400° C., for example, higher than or equal to 250° C. and lower than or equal to 350° C.) is performed in an inert gas atmosphere or an oxygen gas atmosphere. For example, the second heat treatment is performed in a nitrogen atmosphere at 250° C. for one hour. In the second heat treatment, parts (channel formation regions) of the oxide semiconductor layers 296 and 297 are heated while in contact with the oxide insulating layer 246.

Through the above steps, the oxide semiconductor layers 296 and 297 are placed in an oxygen-deficient state, are decreased in resistance by the heat treatment for dehydration or dehydrogenation, and are placed in an oxygen-excess state. As a result, i-type oxide semiconductor layers 242 and 262 are formed. Through the above steps, the thin film transistors 240 and 260 are formed.

Further, heat treatment may be performed at a temperature higher than or equal to 100° C. and lower than or equal to 200° C. for greater than or equal to one hour and less than or equal to 30 hours in the air. In this embodiment, the heat treatment is performed at 150° C. for 10 hours. This heat treatment may be performed at a fixed heating temperature. Alternatively, the following temperature cycle may be applied plural times repeatedly: the temperature is increased from a room temperature to a temperature higher than or equal to 100° C. and lower than or equal to 200° C. and then decreased to a room temperature. Further, this heat treatment may be performed under a reduced pressure before formation of the oxide insulating layer. Under a reduced pressure, the heating time can be shortened. With such heat treatment, hydrogen is introduced from the oxide semiconductor layers to the oxide insulating layer; thus, normally-off thin film transistors can be obtained. Therefore, reliability of the semiconductor device can be improved.

A protective insulating layer 293 may be additionally formed over the oxide insulating layer 246. For example, a silicon nitride film is formed by an RF sputtering method. In this embodiment, the protective insulating layer 293 is formed using a silicon nitride film (see FIG. 6D).

A planarization insulating layer 294 for planarization may be provided over the protective insulating layer 293. In this embodiment, the planarization insulating layer 294 is formed over the protective insulating layer 293.

Next, a fourth photolithography step is performed. A resist mask is formed and selective etching is performed to remove parts of the planarization insulating layer 294, the protective insulating layer 293, and the oxide insulating layer 246, whereby an opening reaching the drain electrode layer 265b is formed.

Next, a light-transmitting conductive film is formed, and a fifth photolithography step is performed. A resist mask is formed and an unnecessary portion is removed by etching, so that a pixel electrode layer 267 and a conductive layer 247 are formed. Then, the resist mask is removed (see FIG. 6E).

In this embodiment, the step of forming the opening in the gate insulating layer is not illustrated in a drawing; however, the step of forming an opening in the gate insulating layer may be performed in either the same photolithography step as that of the oxide insulating layer and the protective insulating layer or another photolithography step. When the opening is formed in another photolithography step, the number of photolithography steps is six.

This embodiment can be implemented in appropriate combination with any of the other embodiments.

As described above, a semiconductor device which includes a thin film transistor formed using an oxide semiconductor layer and consumes less power can be provided.

Further, a semiconductor device which includes a thin film transistor formed using an oxide semiconductor layer and has high reliability can be provided.

Embodiment 7

In this embodiment, another example of a thin film transistor which is applicable to the semiconductor device disclosed in this specification is described. Thin film transistors 210 and 220 which are described in this embodiment can be used as the driver circuit thin film transistor 1223 and the pixel thin film transistor 1211 in Embodiment 1, and the thin film transistor 320 in Embodiment 2.

In this embodiment, an example of a manufacturing process of a semiconductor device including a thin film transistor, part of which is different from that in Embodiment 4, is described with reference to FIGS. 8A to 8E. FIGS. 8A to 8E are the same as FIGS. 4A to 4E except that part of the process in FIGS. 8A to 8E is different from that in FIGS. 4A to 4E; thus, detailed description of the same portions as those in FIGS. 4A to 4E is omitted. In this embodiment, a mask layer formed using a multi-tone mask is used in photolithography steps.

Since a mask layer formed with the use of a multi-tone mask has a plurality of film thicknesses and further can be changed in shape by performing etching on the mask layer, the mask layer can be used in a plurality of etching steps of making different patterns. Therefore, a mask layer corresponding to two or more kinds of different patterns can be formed using one multi-tone mask. Thus, the number of light-exposure masks can be reduced and the number of corresponding photolithography steps can be also reduced, whereby simplification of a process can be realized.

In accordance with Embodiment 1, gate electrode layers 211 and 221 are formed over the substrate 200 in a first photolithography step and then, a gate insulating layer 202 is stacked thereover. An oxide semiconductor film is formed over the gate insulating layer 202. In this embodiment, the oxide semiconductor film is formed by a sputtering method with the use of an In—Ga—Zn—O-based metal oxide target.

The substrate is introduced into an electric furnace which is a kind of heat treatment apparatus, and first heat treatment for dehydration or dehydrogenation is performed on the oxide semiconductor film in a nitrogen atmosphere at 450° C. for one hour. Then, the oxide semiconductor film is not exposed to the air so that entry of water and hydrogen into the oxide semiconductor film is prevented. Thus, an oxide semiconductor film 230 is obtained.

Figure 8A:
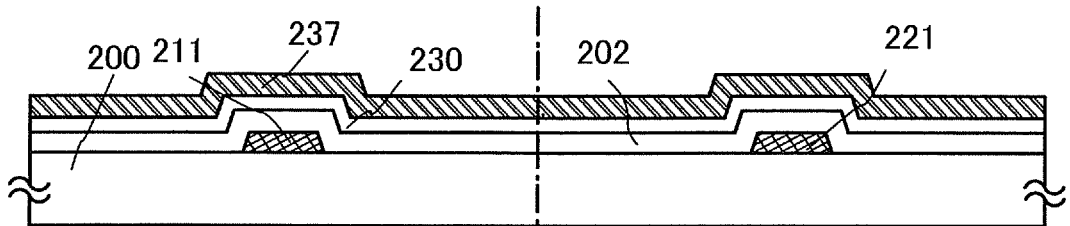
FIGS. 8A to 8E are cross-sectional views illustrating a manufacturing method of a semiconductor device.

Next, a metal conductive film 237 is formed over the oxide semiconductor film 230 by a sputtering method or a vacuum evaporation method (see FIG. 8A).

The metal conductive film 237 is a conductive film to be source and drain electrode layers. As a material of the metal conductive film, there are an element selected from Al, Cr, Cu, Ta, Ti, Mo, and W; an alloy containing any of the above elements as its component; an alloy film containing a combination of any of these elements; and the like. Further, one or more materials selected from manganese, magnesium, zirconium, beryllium, and thorium may be used.

In a second photolithography step, resist masks 231a and 231b are formed over the oxide semiconductor film 230 and the metal conductive film 237.

In this embodiment, an example is described in which light exposure is performed using a multi-tone (high-tone) mask for forming the resist masks 231a and 231b. First, a resist is formed in order to form the resist masks 231a and 231b. As the resist, a positive resist or a negative resist can be used. Here, a positive resist is used. The resist may be formed by a spin coating method or may be selectively formed by an inkjet method. When the resist is selectively formed by an inkjet method, a resist can be prevented from being formed in an unintended portion, which results in reducing waste of the material.

Next, the resist is irradiated with light with the use of a multi-tone mask 81 as a light-exposure mask, so that the resist is exposed to light.

Here, light exposure using the multi-tone mask 81 is described with reference to FIGS. 9A to 9D.

A multi-tone mask is a mask capable of light exposure of three levels to provide an exposed region, a half-exposed region, and an unexposed region. A multi-tone mask is a light-exposure mask through which light is transmitted to have a plurality of intensities. One-time light exposure and development process allow a resist mask with plural thicknesses (typically, two kinds of thicknesses) to be formed. Therefore, with the use of a multi-tone mask, the number of light-exposure masks can be reduced.

Figure 9A:
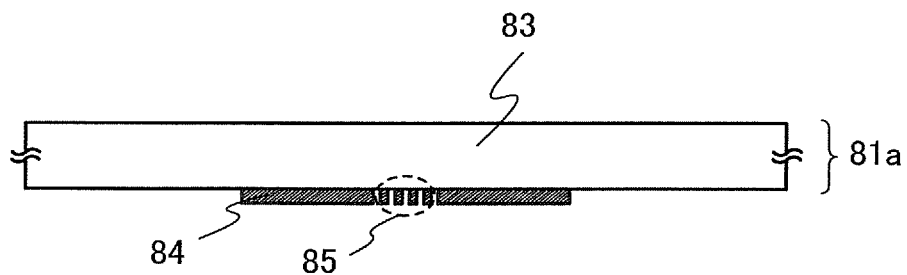
FIGS. 9A to 9D are diagrams illustrating a multi-tone mask.
Figure 9B:
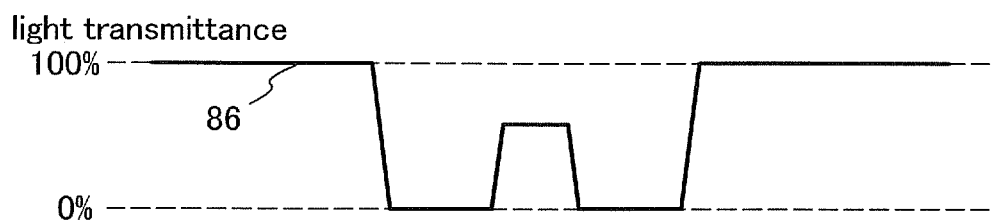
Figure 9C:
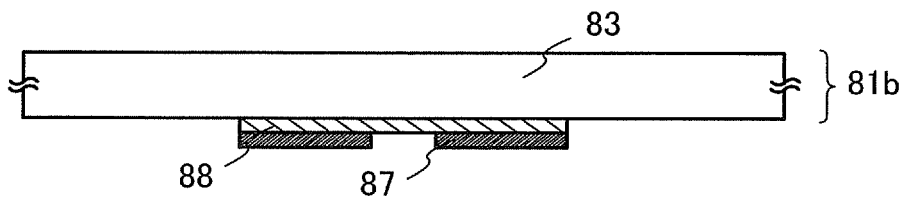

Typical examples of the multi-tone mask include a gray-tone mask 81a illustrated in FIG. 9A and a half-tone mask 81b illustrated in FIG. 9C.

As illustrated in FIG. 9A, the gray-tone mask 81a includes a light-transmitting substrate 83, and a light-blocking portion 84 and a diffraction grating 85 which are formed on the light-transmitting substrate 83. The light transmittance of the light-blocking portion 84 is 0%. Meanwhile, the diffraction grating 85 has a light-transmitting portion in a slit form, a dot form, a mesh form, or the like with intervals that are less than or equal to the resolution limit of light used for the exposure, whereby the light transmittance can be controlled. Note that the diffraction grating 85 can be in a slit form, a dot form, or a mesh form with regular intervals; or in a slit form, a dot form, or a mesh form with irregular intervals.

As the light-transmitting substrate 83, a light-transmitting substrate such as a quartz substrate can be used. The light-blocking portion 84 and the diffraction grating 85 can be formed using a light-blocking material that absorbs light, such as chromium or a chromium oxide.

When the gray-tone mask 81a is irradiated with light for exposure, a light transmittance 86 of the light-blocking portion 84 is 0% and the light transmittance 86 of a region where neither the light-blocking portion 84 nor the diffraction grating 85 is provided is 100%, as illustrated in FIG. 9B. The light transmittance 86 of the diffraction grating 85 can be controlled in the range of 10% to 70%. The light transmittance of the diffraction grating 85 can be controlled by adjusting the interval or pitch of slits, dots, or meshes of the diffraction grating.

As illustrated in FIG. 9C, the half-tone mask 81b includes the light-transmitting substrate 83 provided with a semi-light-transmitting portion 87 and a light-blocking portion 88. The semi-light-transmitting portion 87 can be formed using MoSiN, MoSi, MoSiO, MoSiON, CrSi, or the like. The light-blocking portion 88 can be formed using a light-blocking material that absorbs light, such as chromium or a chromium oxide.

Figure 9D:
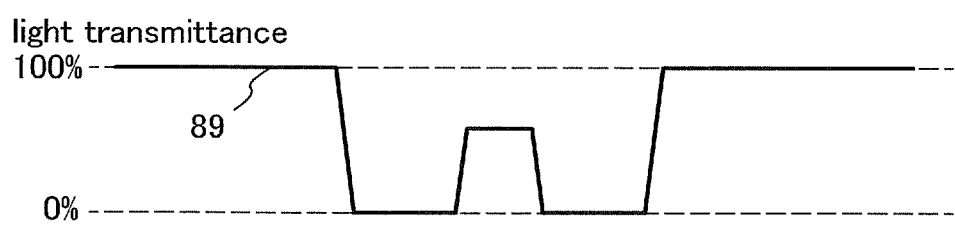

When the half-tone mask 81b is irradiated with light for exposure, a light transmittance 89 of the light-blocking portion 88 is 0% and the light transmittance 89 of a region where neither the light-blocking portion 88 nor the semi-light-transmitting portion 87 is provided is 100%, as illustrated in FIG. 9D. The light transmittance 89 of the semi-light-transmitting portion 87 can be controlled in the range of 10% to 70%. The light transmittance of the semi-light-transmitting portion 87 can be controlled with the material of the semi-light-transmitting portion 87.

Figure 8B:
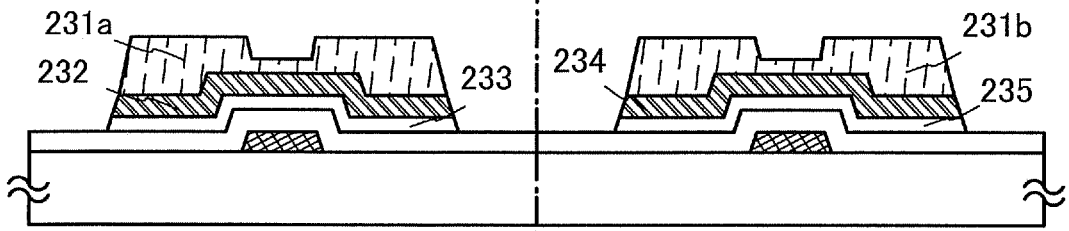

After the light exposure using the multi-tone mask, development is performed, whereby the resist masks 231a and 231b each with regions having different thicknesses can be formed as illustrated in FIG. 8B.

Next, a first etching step is performed using the resist masks 231a and 231b, so that the oxide semiconductor film 230 and the metal conductive film 237 are etched to have island shapes. As a result, oxide semiconductor layers 233 and 235 and metal conductive layers 232 and 234 can be formed (see FIG. 8B).

Next, the resist masks 231a and 231b are subjected to ashing. Consequently, the areas (the volume, considering three dimensions) and the thicknesses of the resist masks are reduced. At that time, resists of the resist masks in regions with small thicknesses (a region overlapping with part of the gate electrode layer 211 and a region overlapping with part of the gate electrode layer 221) is removed so that separated resist masks 236a, 236b, 236d, and 236e can be formed.

Figure 8C:
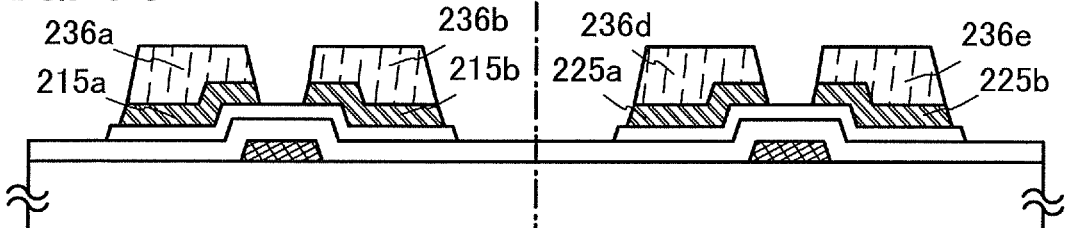
Figure 8D:
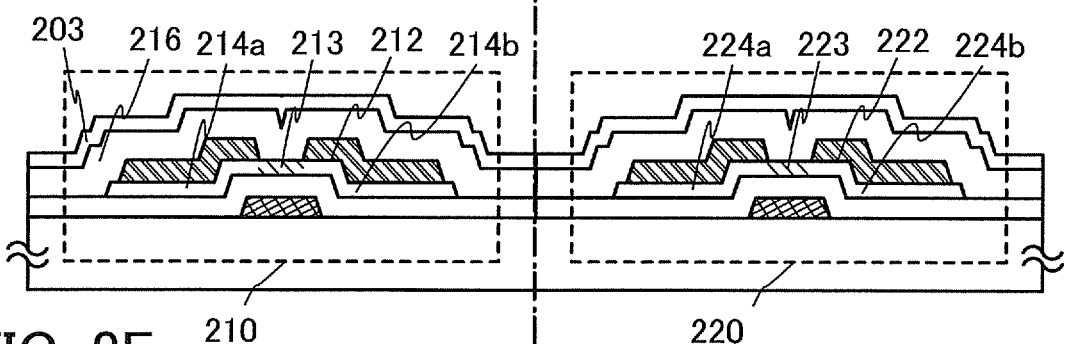
Figure 8E:
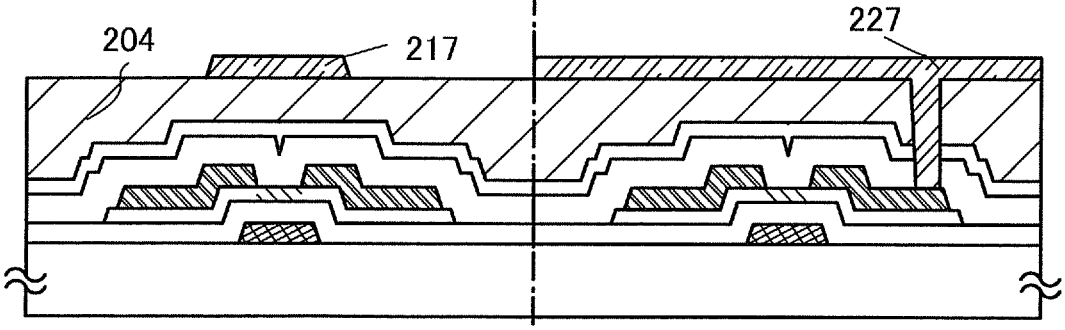

Unnecessary portions are removed by etching with the use of the separated resist masks 236a, 236b, 236d, and 236e, so that the source electrode layers 215a and 225a and the drain electrode layers 215b and 225b are formed (see FIG. 8C).

Note that materials and etching conditions are adjusted as appropriate so that the oxide semiconductor layers 233 and 235 are not removed by etching of the metal conductive layers 232 and 234.

In this embodiment, a Ti film is used as the metal conductive layers 232 and 234, an In—Ga—Zn—O-based metal oxide is used for the oxide semiconductor layers 233 and 235, and an ammonia hydrogen peroxide solution (31 wt % hydrogen peroxide in water: 28 wt % ammonia water: water=5:2:2) is used as an etchant for the Ti film.

Note that the etching of the metal conductive film and the oxide semiconductor film may be dry etching, without being limited to wet etching.

As an etching gas for dry etching, a gas containing chlorine (chlorine-based gas such as chlorine ($Cl_2$), boron chloride ($BCl_3$), silicon chloride ($SiCl_4$), or carbon tetrachloride ($CCl_4$)) is preferably used.

Alternatively, a gas containing fluorine (fluorine-based gas such as carbon tetrafluoride ($CF_4$), sulfur fluoride ($SF_6$), nitrogen fluoride ($NF_3$), or trifluoromethane ($CHF_3$)); hydrogen bromide (HBr); oxygen ($O_2$); any of these gases to which a rare gas such as helium (He) or argon (Ar) is added; or the like can be used.

As the dry etching method, a parallel plate reactive ion etching (RIE) method or an inductively coupled plasma (ICP) etching method can be used. In order to etch the films into desired shapes, the etching conditions (the amount of electric power applied to a coil-shaped electrode, the amount of electric power applied to an electrode on the substrate side, the temperature of the electrode on the substrate side, and the like) are adjusted as appropriate.

As an etchant used for wet etching, a solution obtained by mixing phosphoric acid, acetic acid, and nitric acid, or the like can be used. Alternatively, ITO07N (produced by KANTO CHEMICAL CO., INC.) may be used.

The etchant used in the wet etching is removed by cleaning together with the material which is etched off. The waste liquid containing the etchant and the material etched off may be purified and the material may be reused. When a material such as indium contained in the oxide semiconductor layer is collected from the waste liquid after the etching and reused, the resources can be efficiently reused and the cost can be reduced.

The etching conditions (such as an etchant, etching time, and temperature) are appropriately adjusted depending on the material so that the material can be etched to have a desired shape.

Next, the separated resist masks 236a, 236b, 236d, and 236e are removed and an oxide insulating layer 216 to be a protective insulating film is formed in contact with the oxide semiconductor layers 233 and 235. In this embodiment, a silicon oxide film is formed to a thickness of 200 nm by a sputtering method as the oxide insulating layer 216.

Next, second heat treatment (preferably higher than or equal to 200° C. and lower than or equal to 400° C., for example, higher than or equal to 250° C. and lower than or equal to 350° C.) is performed in an inert gas atmosphere or an oxygen gas atmosphere. For example, the second heat treatment is performed in a nitrogen atmosphere at 250° C. for one hour. In the second heat treatment, parts of the oxide semiconductor layers (channel formation regions) are heated while in contact with the oxide insulating layer 216.

Through the above steps, the oxide semiconductor layers 233 and 235 are placed in an oxygen-deficient state and are decreased in resistance by the heat treatment for dehydration or dehydrogenation; then, parts of the oxide semiconductor layers 233 and 235 are selectively placed in an oxygen-excess state. As a result, a channel formation region 213 overlapping with the gate electrode layer 211 becomes i-type and a high-resistance source region 214a overlapping with the source electrode layer 215a and a high-resistance drain region 214b overlapping with the drain electrode layer 215b are formed in a self-aligned manner. Through the above steps, the thin film transistor 210 is formed. In a similar manner, a channel formation region 223 overlapping with the gate electrode layer 221 becomes i-type and a high-resistance source region 224a overlapping with the source electrode layer 225a and a high-resistance drain region 224b overlapping with the drain electrode layer 225b are formed in a self-aligned manner. Through the above steps, the thin film transistor 220 is formed.

Further, heat treatment may be performed at a temperature higher than or equal to 100° C. and lower than or equal to 200° C. for greater than or equal to one hour and less than or equal to 30 hours in the air. In this embodiment, the heat treatment is performed at 150° C. for 10 hours. This heat treatment may be performed at a fixed heating temperature. Alternatively, the following temperature cycle may be applied plural times repeatedly: the temperature is increased from a room temperature to a temperature higher than or equal to 100° C. and lower than or equal to 200° C. and then decreased to a room temperature. Further, this heat treatment may be performed under a reduced pressure before formation of the oxide insulating layer 216. Under a reduced pressure, the heating time can be shortened. With such heat treatment, hydrogen is introduced from the oxide semiconductor layers 233 and 235 to the oxide insulating layer 216; thus, normally-off thin film transistors can be obtained. Therefore, reliability of the semiconductor device can be improved.

A protective insulating layer 203 is formed over the oxide insulating layer 216. In this embodiment, the protective insulating layer 203 is formed using a silicon nitride film (see FIG. 8D).

A planarization insulating layer for planarization may be provided over the protective insulating layer 203. In this embodiment, a planarization insulating layer 204 is formed over the protective insulating layer 203.

Next, a third photolithography step is performed. A resist mask is formed and selective etching is performed to remove parts of the planarization insulating layer 204, the protective insulating layer 203, and the oxide insulating layer 216, so that an opening reaching the drain electrode layer 225b is formed.

Next, a light-transmitting conductive film is formed, and a fourth photolithography step is performed. A resist mask is formed and an unnecessary portion is removed by etching, whereby a pixel electrode layer 227 and a conductive layer 217 are formed. Then, the resist mask is removed (see FIG. 8E).

In this embodiment, the step of forming the opening in the gate insulating layer is not illustrated in a drawing; however, the step of forming an opening in the gate insulating layer may be performed in either the same photolithography step as that of the oxide insulating layer and the protective insulating layer or another photolithography step. When the opening is formed in another photolithography step, the number of photolithography steps is four.

This embodiment can be implemented in appropriate combination with any of the other embodiments.

As described above, a semiconductor device which includes a thin film transistor formed using an oxide semiconductor layer and consumes less power can be provided.

Further, a semiconductor device which includes a thin film transistor formed using an oxide semiconductor layer and has high reliability can be provided.

Embodiment 8

In this embodiment, an example of a thin film transistor which is applicable to the semiconductor device disclosed in this specification is described. Thin film transistors 270 and 280 which are described in this embodiment can be used as the driver circuit thin film transistor 1223 and the pixel thin film transistor 1211 in Embodiment 1, and the thin film transistor 320 in Embodiment 2.

Figure 7:
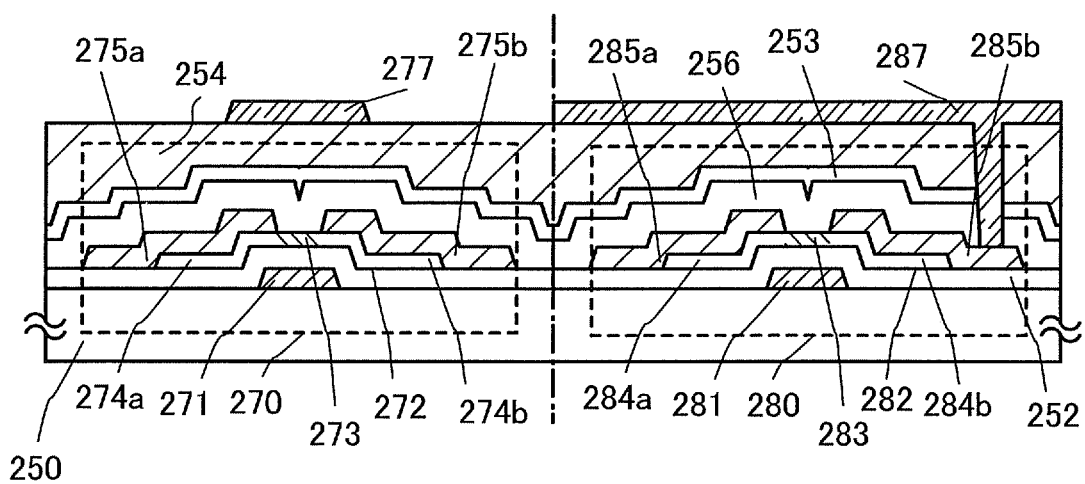
FIG. 7 is a cross-sectional view illustrating one embodiment of the present invention.

This embodiment describes an example in which a gate electrode layer, a source electrode layer, and a drain electrode layer are formed using a light-transmitting conductive material with reference to FIG. 7. Except the gate electrode layer, the source electrode layer, and the drain electrode layer, this embodiment can be implemented in a manner similar to those in the above embodiments; accordingly, repetitive description of the same portions as those of the above embodiments or portions having functions similar to those of the above embodiments and repetitive description of steps similar to those of the above embodiments are omitted.

The thin film transistors 270 and 280 illustrated in FIG. 7 are channel-etched thin film transistors and include, over a substrate 250 having an insulating surface, gate electrode layers 271 and 281; a gate insulating layer 252; an oxide semiconductor layer 272 including at least a channel formation region 273, a high-resistance source region 274a, and a high-resistance drain region 274b; an oxide semiconductor layer 282 including at least a channel formation region 283, a high-resistance source region 284a, and a high-resistance drain region 284b; and source and drain electrode layers 275a, 275b, 285a, and 285b. In addition, an oxide insulating layer 256 is provided so as to cover the thin film transistors 270 and 280 and be in contact with the channel formation regions 273 and 283. Moreover, a protective insulating layer 253 and a planarization insulating layer 254 are formed over the oxide insulating layer 256.

In a pixel portion, an opening (contact hole) reaching the source or drain electrode layer 285b is formed so as to penetrate the oxide insulating layer 256, the protective insulating layer 253, and the planarization insulating layer 254, and a pixel electrode layer 287 is formed in and over the opening. On the other hand, in a driver circuit portion, a conductive layer 277 is formed over the planarization insulating layer 254 so as to overlap with the gate electrode layer 271 and the oxide semiconductor layer 272.

The source and drain electrode layers 275a, 275b, 285a, and 285b are formed using a thin metal conductive film and thus can have light-transmitting properties.

In FIG. 7, light-transmitting conductive films are used for the gate electrode layers 271 and 281 and the source and drain electrode layers 275a, 275b, 285a, and 285b of the thin film transistors 270 and 280.

As materials of the gate electrode layers 271 and 281 and the source and drain electrode layers 275a, 275b, 285a, and 285b, any of the following conductive materials which transmit visible light can be used: for example, an In—Sn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, a Sn—Al—Zn—O-based metal oxide, an In—Zn—O-based metal oxide, a Sn—Zn—O-based metal oxide, an Al—Zn—O-based metal oxide, an In—O-based metal oxide, a Sn—O-based metal oxide, and a Zn—O-based metal oxide. The thicknesses of the gate electrode layers 271 and 281 and the source and drain electrode layers 275a, 275b, 285a, and 285b are set as appropriate in the range greater than or equal to 50 nm and less than or equal to 300 nm. As a deposition method of the light-transmitting conductive materials used for the gate electrode layers 271 and 281 and the source and drain electrode layers 275a, 275b, 285a, and 285b, a sputtering method, a vacuum evaporation method (such as an electron beam evaporation method), an arc discharge ion plating method, or a spray method is used. When a sputtering method is used, it is preferable that a target containing $SiO_2$ at greater than or equal to 2 wt % and less than or equal to 10 wt % is used for deposition and the light-transmitting conductive films are made to contain $SiO_x$ (x>0) which suppresses crystallization, so that crystallization by the heat treatment for dehydration or dehydrogenation performed in a later step is prevented.

Thus, the thin film transistors 270 and 280 can be light-transmitting thin film transistors.

In the pixel provided with the thin film transistor 280, a conductive film which transmits visible light is used for the pixel electrode layer 287, another electrode layer (such as a capacitor electrode layer), or a wiring layer (such as a capacitor wiring layer), whereby a display device having a high aperture ratio is realized. It is needless to say that the gate insulating layer 252, the oxide insulating layer 256, the protective insulating layer 253, and the planarization insulating layer 254 are each also preferably formed using a film which transmits visible light.

In this specification, a film which transmits visible light refers to a film with a visible light transmittance of 75% to 100% and in the case where the film has a conductive property, it is also referred to as a transparent conductive film. Further, a conductive film which is semi-transparent to visible light may be used for a material used for the gate electrode layer, the source electrode layer, the drain electrode layer, the pixel electrode layer, any other electrode layer, or a wiring layer. Being semi-transparent to visible light means that a transmittance of visible light is 50% to 75%.

Since the thin film transistor 280 has a light transmitting property, the aperture ratio can be increased. For small liquid crystal display panels of 10 inches or smaller in particular, a high aperture ratio can be achieved even when the size of pixels is decreased in order to realize higher resolution of display images by increasing the number of gate wirings, for example. Moreover, wide viewing angle is realized by using a light-transmitting film for components in the thin film transistor 280, so that a high aperture ratio can be achieved even when one pixel is divided into a plurality of subpixels. That is, high aperture ratio can be maintained even when thin film transistors are densely arranged, and the display region can have a sufficient area. For example, even when one pixel includes two to four subpixels, the aperture ratio can be increased because the thin film transistor has a light transmitting property. When a storage capacitor is formed using the same steps and the same materials as those of the thin film transistor, the storage capacitor can also have a light-transmitting property; therefore, the aperture ratio can be further increased.

This embodiment can be implemented in appropriate combination with any of the other embodiments.

Embodiment 9

In this embodiment, a liquid crystal display device is described as an example of a semiconductor device disclosed in this specification.

There is no particular limitation on the semiconductor device disclosed in this specification, and a liquid crystal display device including a TN liquid crystal, an OCB liquid crystal, an STN liquid crystal, a VA liquid crystal, an ECB liquid crystal, a GH liquid crystal, a polymer dispersed liquid crystal, a discotic liquid crystal, or the like can be used. Among them, a normally black liquid crystal panel such as a transmissive liquid crystal display device utilizing a vertical alignment (VA) mode is preferable. Some examples are given as a vertical alignment mode. For example, a multi-domain vertical alignment (MVA) mode, a patterned vertical alignment (PVA) mode, an ASV mode, or the like can be employed.

An example of a VA liquid crystal display device is described below.

A vertical alignment (VA) is a mode for controlling alignment of liquid crystal molecules of a liquid crystal display panel. In the VA liquid crystal display device, liquid crystal molecules are aligned in a vertical direction with respect to a panel surface when no voltage is applied. In this embodiment, in particular, a pixel is divided into some regions (subpixels), and liquid crystal molecules are aligned in different directions in their respective regions. This is referred to as multi-domain or multi-domain design. Liquid crystal display devices of the multi-domain design are described below.

Figure 10:
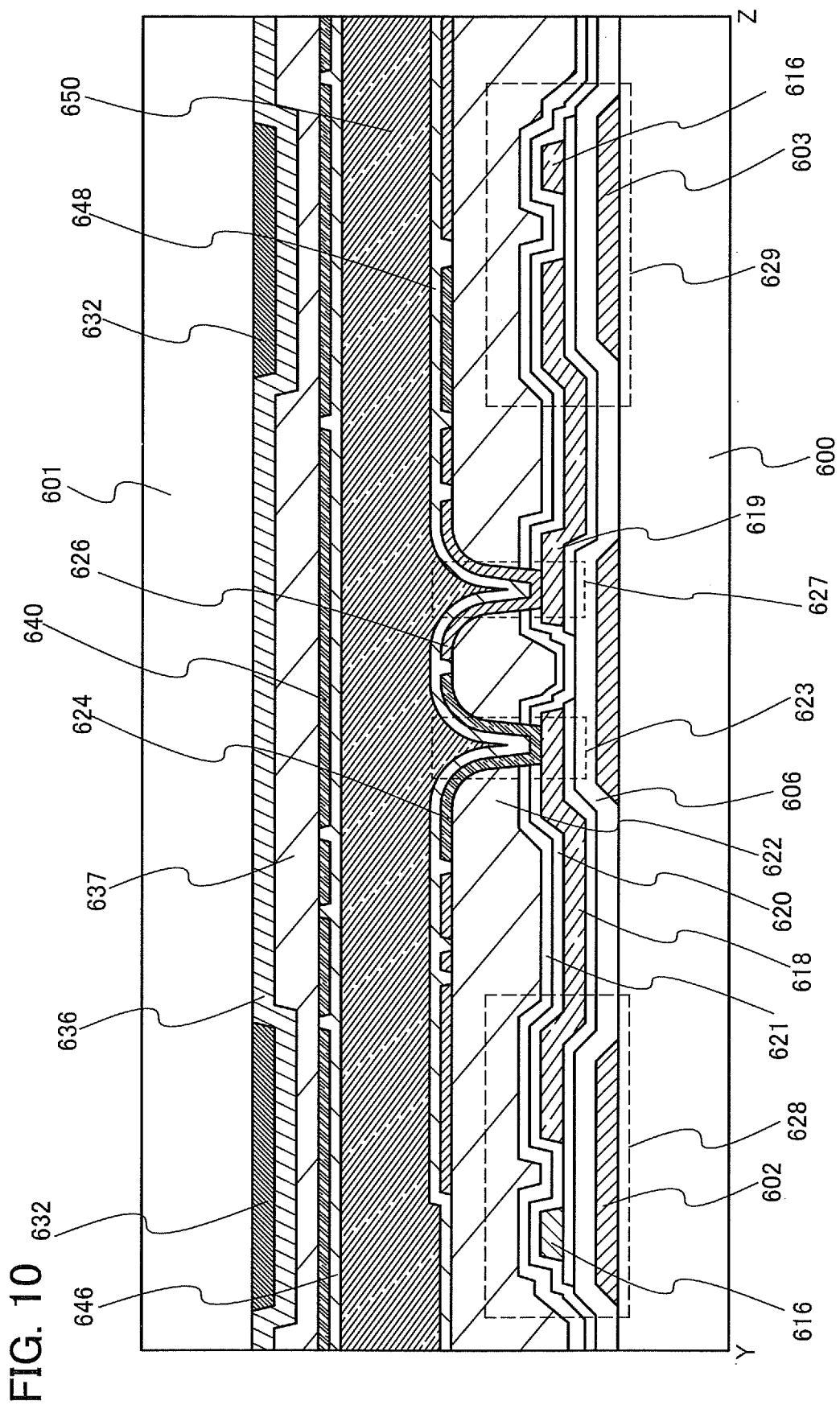
FIG. 10 is a cross-sectional view illustrating one embodiment of the present invention.
Figure 11:
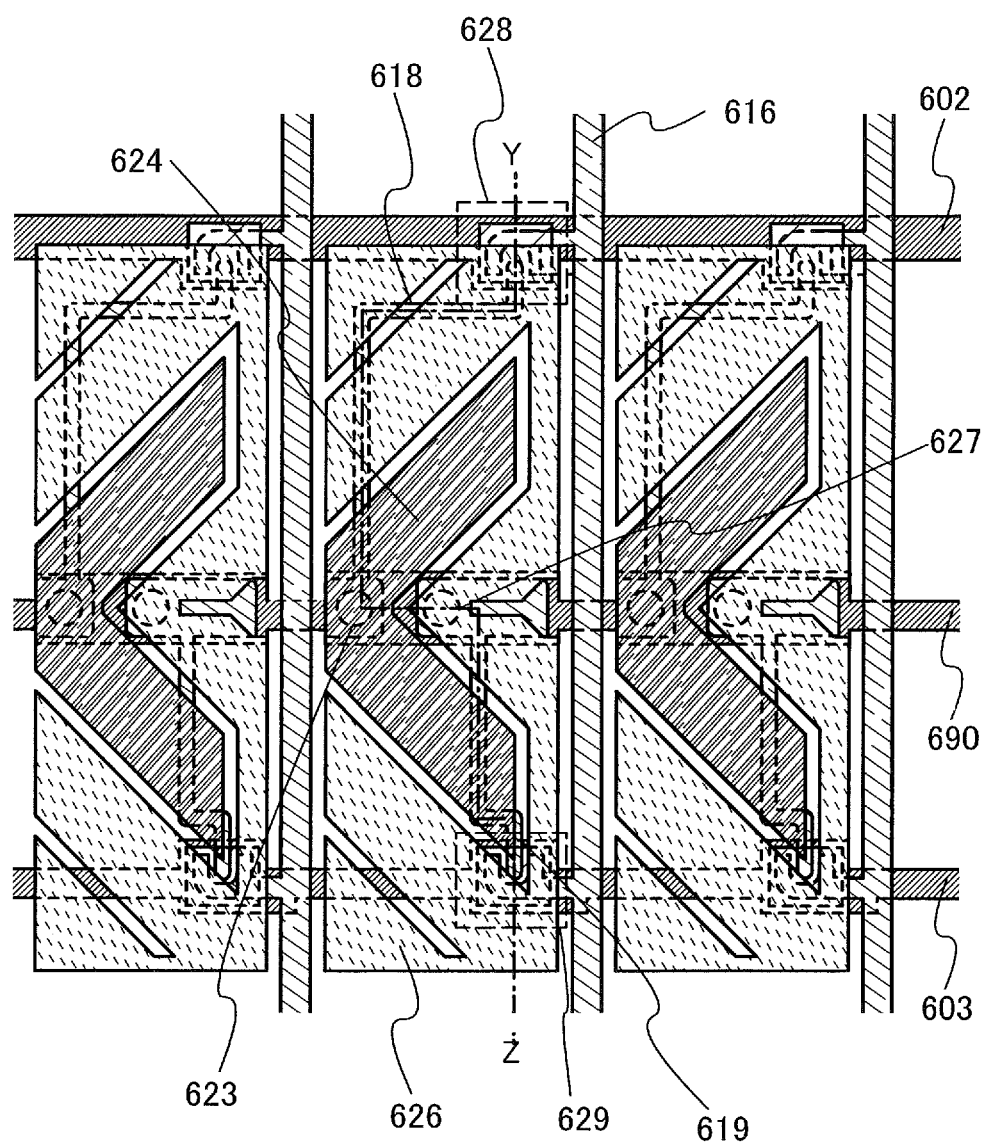
FIG. 11 is a top view illustrating one embodiment of the present invention.

FIG. 10 and FIG. 11 illustrate a pixel structure of a VA liquid crystal display panel formed on a substrate 600. FIG. 11 is a top view of the substrate 600. FIG. 10 is a view of a cross-sectional structure taken along section line Y-Z in FIG. 11. The following description is made with reference to these views.

In this pixel structure, a plurality of pixel electrode layers are provided in one pixel, and a TFT is connected to each of the pixel electrode layers. The plurality of TFTs are driven by different gate signals. In other words, signals applied to individual pixel electrode layers in a multi-domain pixel are controlled independently.

A pixel electrode layer 624 is connected to a source or drain electrode layer 618 of a TFT 628 through a contact hole 623. A pixel electrode layer 626 is connected to a source or drain electrode layer 619 of a TFT 629 through a contact hole 627 penetrating an insulating layer 620, an insulating layer 621 covering the insulating layer 620, and an insulating layer 622 covering the insulating layer 621. A gate wiring 602 of the TFT 628 is separated from a gate wiring 603 of the TFT 629 so that different gate signals can be supplied. On the other hand, a source or drain electrode layer 616 serving as a data line is shared by the TFTs 628 and 629. The thin film transistor described in any of Embodiments 3 to 8 can be used as appropriate as each of the TFTs 628 and 629.

Further, a storage capacitor is formed using a capacitor wiring 690, a gate insulating layer 606 as a dielectric, and a pixel electrode layer or a capacitor electrode electrically connected to the pixel electrode layer.

Figure 13:
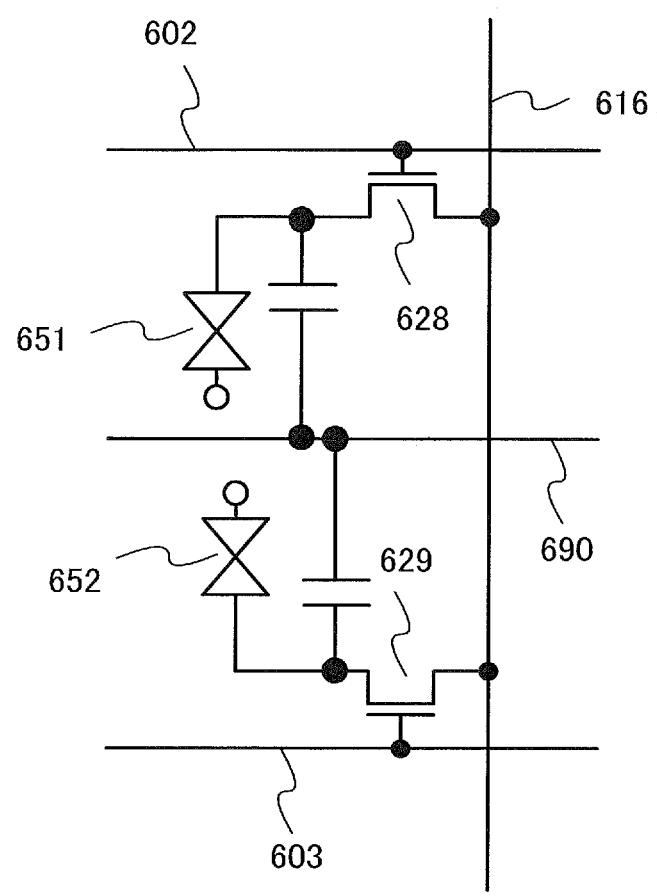
FIG. 13 is an equivalent circuit diagram of a pixel of a semiconductor device.

The shape of the pixel electrode layer 624 is different from that of the pixel electrode layer 626, and the pixel electrode layer 624 and the pixel electrode layer 626 are separated from each other by a slit. The pixel electrode layer 626 is formed so as to surround the external side of the pixel electrode layer 624 which spreads into a V shape. The timings at which voltages are applied to the pixel electrode layers 624 and 626 are made to be different in TFTs 628 and 629, whereby alignment of liquid crystals is controlled. FIG. 13 illustrates an equivalent circuit of this pixel structure. The TFT 628 is connected to the gate wiring 602, and the TFT 629 is connected to the gate wiring 603. When different gate signals are supplied to the gate wirings 602 and 603, the timings of the operations of the TFTs 628 and 629 can vary.

Figure 12:
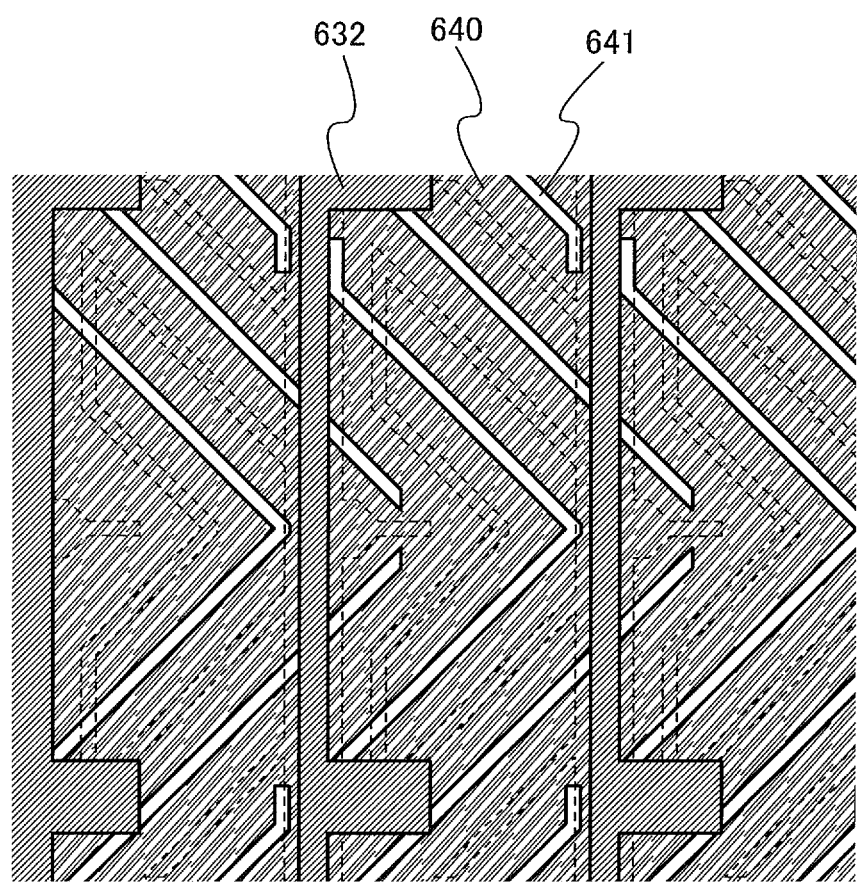
FIG. 12 is a top view illustrating one embodiment of the present invention.

A counter substrate 601 is provided with a light-blocking film 632, a coloring film 636, and a counter electrode layer 640. A planarization film 637 which is also called an overcoat film is formed between the coloring film 636 and the counter electrode layer 640 to prevent alignment disorder of the liquid crystals. An alignment film 648 is formed over the pixel electrode layers 624 and 626, and an alignment film 646 is formed on the counter electrode layer 640. FIG. 12 illustrates a structure on the counter substrate side. The counter electrode layer 640 is an electrode shared by different pixels and slits 641 are formed. The slits 641 and the slits on the pixel electrode layers 624 and 626 side are alternately arranged in an engaging manner so that an oblique electric field is effectively generated, whereby the alignment of the liquid crystals can be controlled. Accordingly, the direction of the alignment of the liquid crystals can vary dependent on the location, which leads to a wider viewing angle.

The counter electrode layer 640 having a pattern with an opening is a first counter electrode layer provided in a pixel portion and has a potential different from that of a second counter electrode layer provided in a driver circuit portion. By providing the second counter electrode layer over the driver circuit portion, highly reliable semiconductor device with an improved resistance to static electricity can be formed.

The pixel electrode layer 624, a liquid crystal layer 650, and the counter electrode layer 640 overlap with one another to form a first liquid crystal element. The pixel electrode layer 626, the liquid crystal layer 650, and the counter electrode layer 640 overlap with one another to form a second liquid crystal element. The pixel structure is a multi-domain structure in which the first liquid crystal element and the second liquid crystal element are provided in one pixel.

This embodiment can be implemented in appropriate combination with any of the other embodiments.

Embodiment 10

A semiconductor device disclosed in this specification can be applied to a variety of electronic appliances (including game machines). Examples of such electronic devices are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a portable information terminal, an audio reproducing device, a large-sized game machine such as a pachinko machine, and the like.

In this embodiment, examples of an electronic appliance on which a liquid crystal display device obtained in any one of Embodiments 1 to 9 is mounted are described with reference to FIGS. 14A to 14E.

Figure 14A:
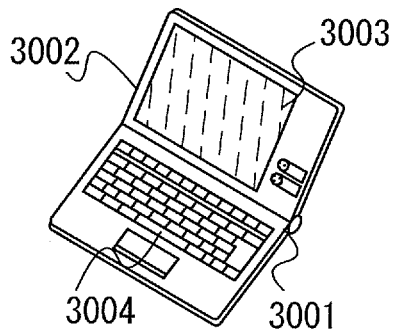
FIGS. 14A to 14E are views each illustrating an example of an electronic device.

FIG. 14A illustrates a laptop personal computer which is manufactured by mounting at least a liquid crystal display device as a component and which includes a main body 3001, a housing 3002, a display portion 3003, a keyboard 3004, and the like. Note that this laptop personal computer includes the liquid crystal display device described in Embodiment 1.

Figure 14D:
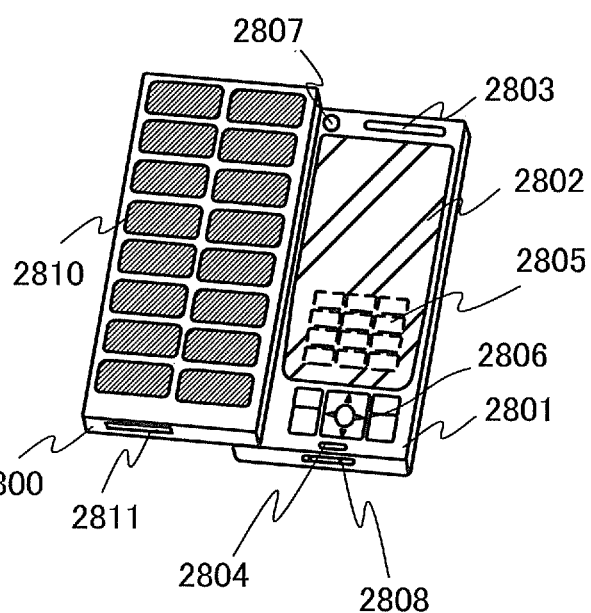
Figure 14B:
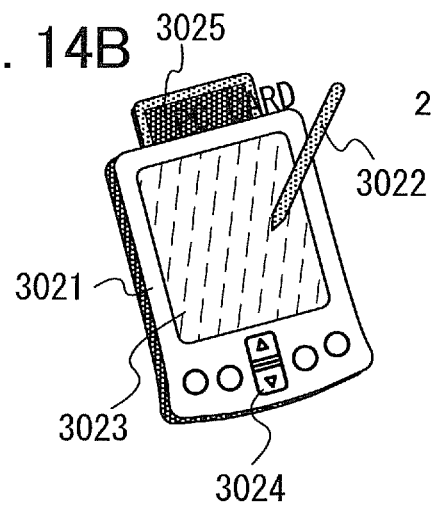

FIG. 14B illustrates a portable information terminal device (which is also referred to as a personal digital assistant (PDA)) which is manufactured by mounting at least a liquid crystal display device as a component. A main body 3021 is provided with a display portion 3023, an outside interface 3025, an operation button 3024, and the like. In addition, the portable information terminal device has a stylus 3022 as an accessory for operation. Note that this portable information terminal device includes the liquid crystal display device described in Embodiment 1.

Figure 14E:
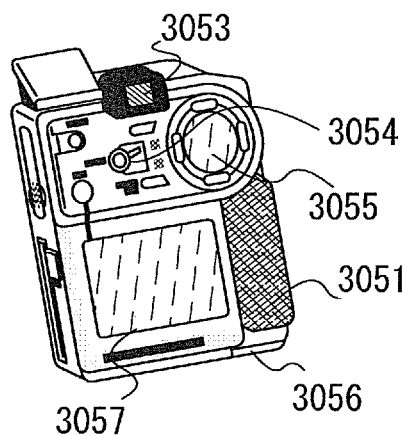
Figure 14C:
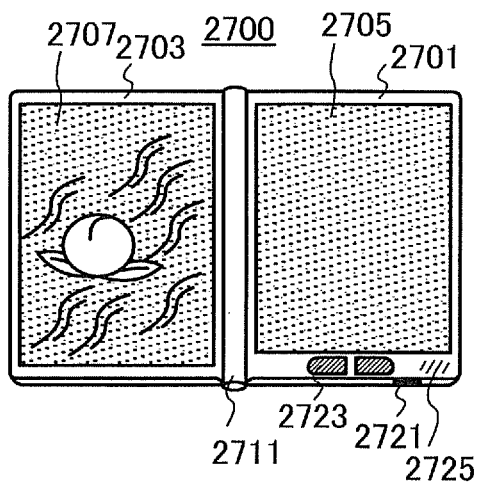
Figure 15:
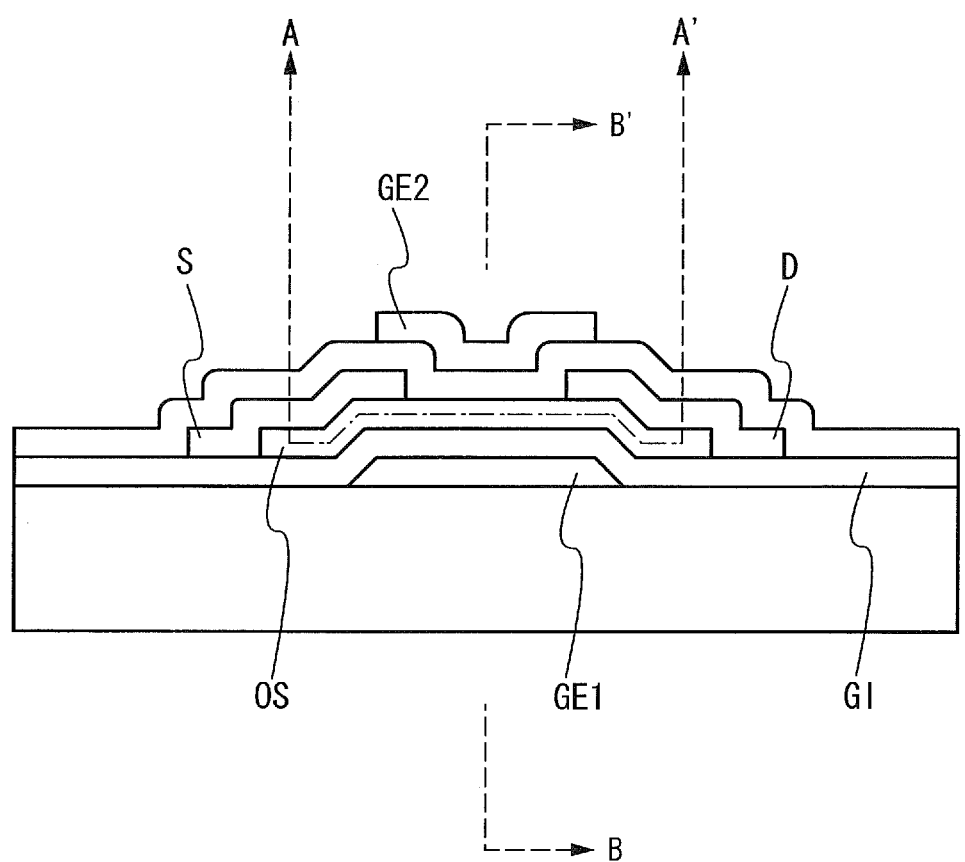
FIG. 15 is a longitudinal sectional view illustrating an inverted-staggered thin film transistor which uses an oxide semiconductor.
Figure 16A:
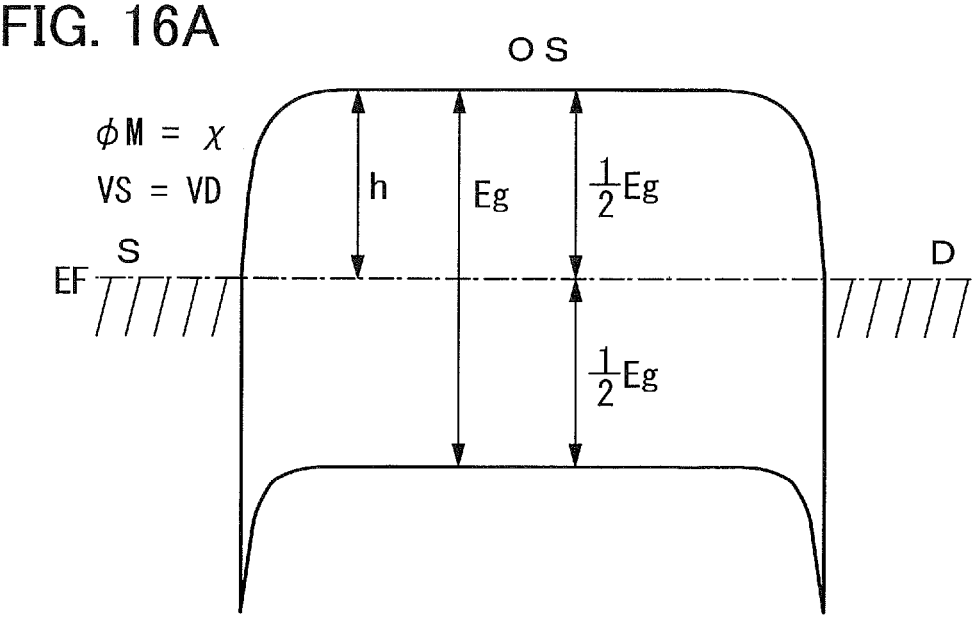
FIGS. 16A and 16B are energy band diagrams (schematic views) each corresponding to a cross section taken along line A-A' in FIG. 15.
Figure 16B:
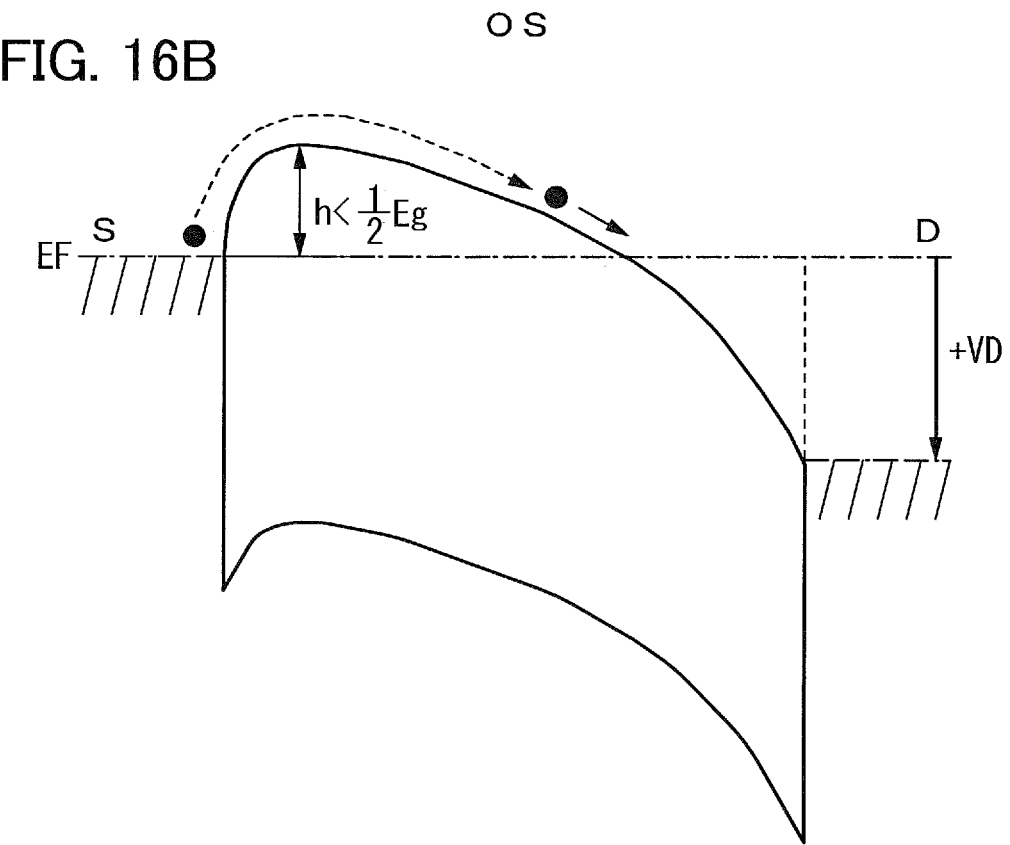
Figure 17A:
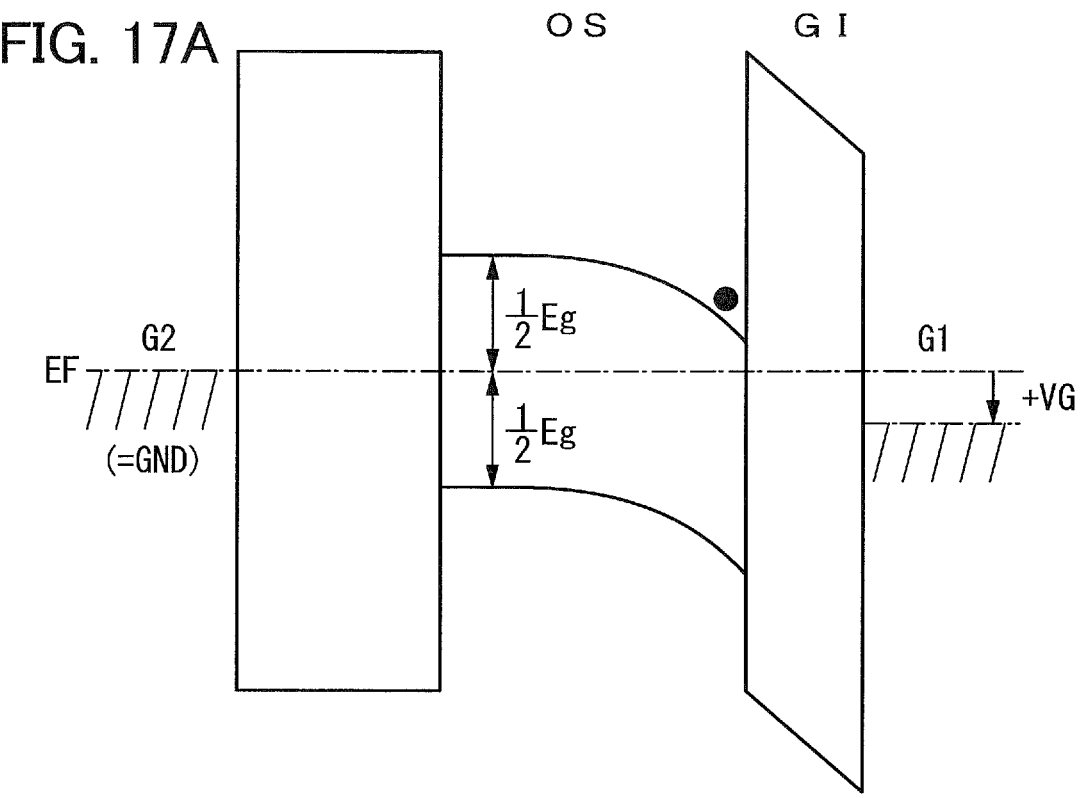
FIG. 17A is a diagram illustrating a state where a positive electric potential ($+V_G$) is applied to the gate (G1) and FIG. 17B is a diagram illustrating a state where a negative electric potential ($-V_G$) is applied to the gate (G1)
Figure 17B:
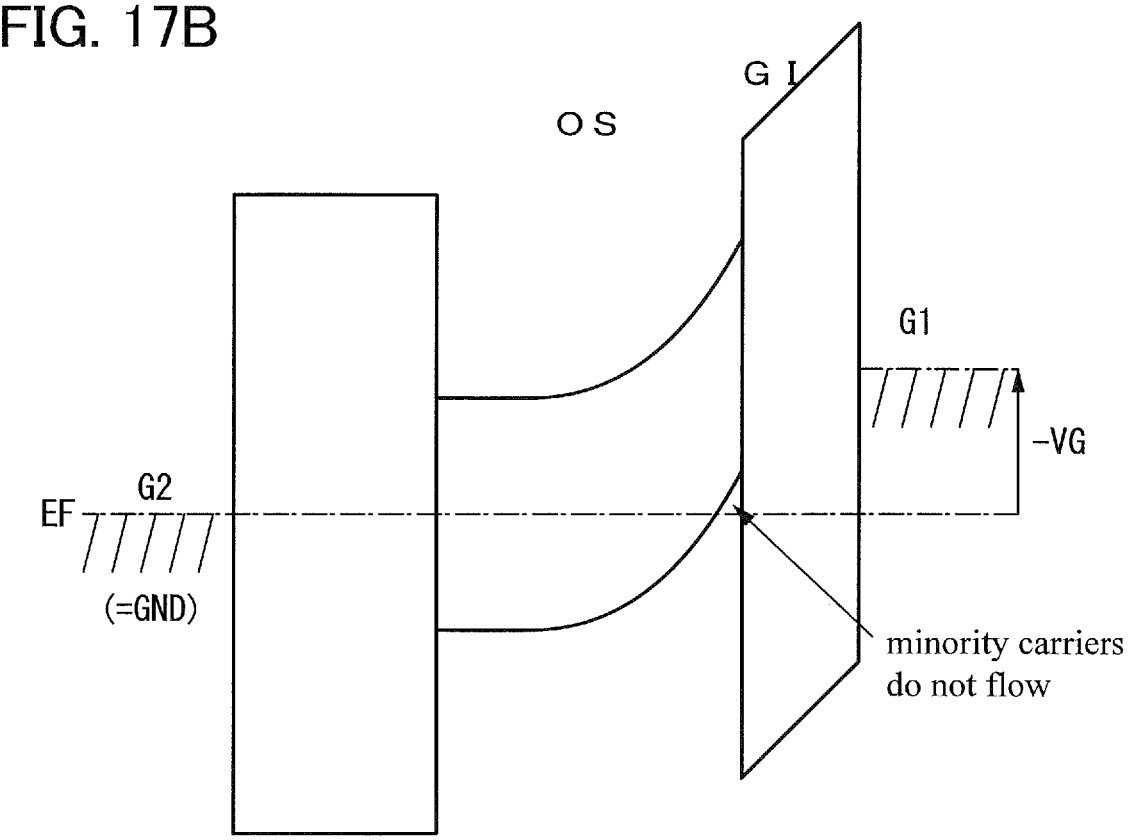
Figure 18:
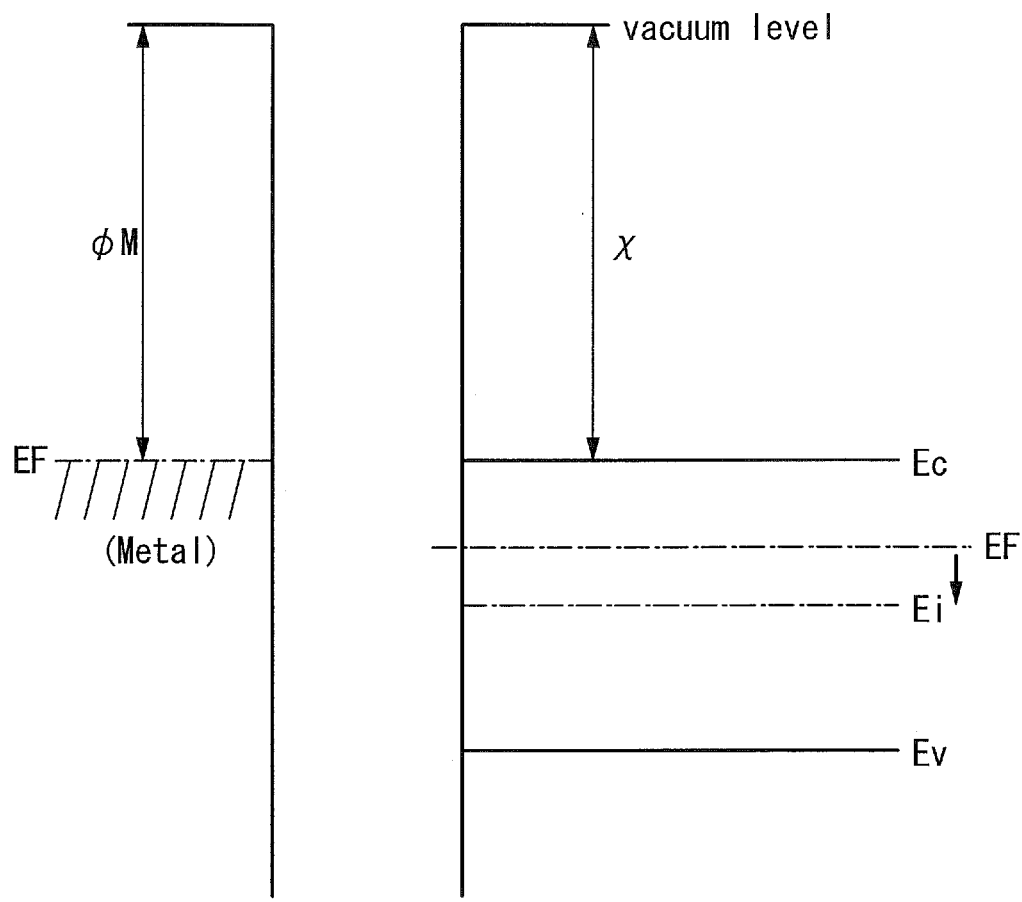
FIG. 18 is a diagram illustrating a relation between a vacuum level and a work function of metal ($\phi_M$) and a relation between the vacuum level and electron affinity ($\chi$) of an oxide semiconductor.

FIG. 14C illustrates an e-book reader manufactured by mounting at least a liquid crystal display device as a component. For example, an e-book reader 2700 includes two housings, a housing 2701 and a housing 2703. The housing 2701 and the housing 2703 are combined with a hinge 2711 so that the e-book reader 2700 can be opened and closed with the hinge 2711 as an axis. With such a structure, the e-book reader 2700 can operate like a paper book.

A display portion 2705 and a display portion 2707 are incorporated in the housing 2701 and the housing 2703, respectively. The display portion 2705 and the display portion 2707 may display one image or different images. In the structure where different images are displayed on different display portions, for example, the right display portion (the display portion 2705 in FIG. 14C) displays text and the left display portion (the display portion 2707 in FIG. 14C) displays images.

FIG. 14C illustrates an example in which the housing 2701 is provided with an operation portion and the like. For example, the housing 2701 is provided with a power switch 2721, an operation key 2723, a speaker 2725, and the like. With the operation key 2723, pages can be turned. Note that a keyboard, a pointing device, or the like may also be provided on the surface of the housing, on which the display portion is provided. Furthermore, an external connection terminal (an earphone terminal, a USB terminal, a terminal that can be connected to various cables such as an AC adapter and a USB cable, or the like), a recording medium insertion portion, and the like may be provided on the back surface or the side surface of the housing. Moreover, the e-book reader 2700 may have a function of an electronic dictionary.

The e-book reader 2700 may have a configuration capable of wirelessly transmitting and receiving data. Through wireless communication, desired book data or the like can be purchased and downloaded from an electronic book server. Note that the e-book reader 2700 includes the liquid crystal display device described in Embodiment 1.

FIG. 14D illustrates a mobile phone which is manufactured by mounting at least a liquid crystal display device as a component and which includes two housings, a housing 2800 and a housing 2801. The housing 2801 includes a display panel 2802, a speaker 2803, a microphone 2804, a pointing device 2806, a camera lens 2807, an external connection terminal 2808, and the like. The housing 2800 includes a solar cell 2810 for charging the mobile phone, an external memory slot 2811, and the like. Further, an antenna is incorporated in the housing 2801.

Further, the display panel 2802 is provided with a touch panel. A plurality of operation keys 2805 which is displayed as images is illustrated by dashed lines in FIG. 14D. Note that a boosting circuit by which a voltage output from the solar cell 2810 is increased to be sufficiently high for each circuit is also included.

In the display panel 2802, the direction of display is changed appropriately depending on an application mode. Further, the mobile phone is provided with the camera lens 2807 on the same surface as the display panel 2802, and thus can be used as a video phone. The speaker 2803 and the microphone 2804 can be used for videophone, recording, playback, and the like without being limited to verbal communication. Moreover, the housings 2800 and 2801 in a state where they are developed as illustrated in FIG. 14D can shift so that one is lapped over the other by sliding; therefore, the size of the portable information terminal can be reduced, which makes the mobile phone suitable for being carried.

The external connection terminal 2808 can be connected to an AC adapter and various types of cables such as a USB cable, and charging and data communication with a personal computer are possible. Moreover, a large amount of data can be stored by inserting a storage medium into the external memory slot 2811 and can be moved.

Further, in addition to the above functions, an infrared communication function, a television reception function, or the like may be provided. Note that this mobile phone includes the liquid crystal display device described in Embodiment 1.

FIG. 14E illustrates a digital camera which is manufactured by mounting at least a liquid crystal display device as a component and which includes a main body 3051, a display portion (A) 3057, an eyepiece 3053, an operation switch 3054, a display portion (B) 3055, a battery 3056, and the like. Note that this digital camera includes the liquid crystal display device described in Embodiment 1.

This embodiment can be combined with any of Embodiments 1 to 9.

This application is based on Japanese Patent Application serial no. 2009-250909 filed with Japan Patent Office on Oct. 30, 2009, the entire contents of which are hereby incorporated by reference.

The invention claimed is:

1. A semiconductor device comprising:
   a first electrode layer and a second electrode layer over a first substrate;
   a liquid crystal layer over the first electrode layer and the second electrode layer;
   a first counter electrode layer and a second counter electrode layer over the liquid crystal layer;
   a second substrate over the first counter electrode layer and the second counter electrode layer; and
   a transistor in a driver circuit, the transistor comprising:
      a channel formation region including an oxide semiconductor, the channel formation region comprising a first region; and
      a source region including the oxide semiconductor, the source region comprising a second region, wherein the first electrode layer is a pixel electrode formed in a position overlapping with the first counter electrode layer with the liquid crystal layer therebetween, wherein the second electrode layer is an electrode layer of the driver circuit formed in a position overlapping with the second counter electrode layer with the liquid crystal layer therebetween, wherein the first counter electrode layer and the second counter electrode layer do not overlap with each other, wherein the first counter electrode and the second counter electrode are in contact with a same plane, wherein the second counter electrode layer has a slit including a bend portion, and wherein the second electrode layer is over the transistor and overlaps with the channel formation region of the transistor.

2. The semiconductor device according to claim 1, wherein a potential of the first counter electrode layer is different from a potential of the second counter electrode layer.

3. The semiconductor device according to claim 1, wherein the first electrode layer is electrically connected to a thin film transistor in a pixel portion.

4. The semiconductor device according to claim 1, wherein the second electrode layer is a gate electrode layer of the transistor of the driver circuit.

5. The semiconductor device according to claim 1, further comprising:
   a third electrode layer over the first substrate; and
   a conductive particle between the third electrode layer and the first counter electrode layer,
   wherein the third electrode layer is electrically connected to the first counter electrode layer through the conductive particle.

6. The semiconductor device according to claim 1, further comprising:
   a fourth electrode layer over the first substrate; and
   a conductive particle between the fourth electrode layer and the second counter electrode layer,
   wherein the fourth electrode layer is electrically connected to the second counter electrode layer through the conductive particle.

7. The semiconductor device according to claim 1, wherein the oxide semiconductor comprises indium, gallium and zinc, and
   wherein the oxide semiconductor has a degree of crystallization of greater than or equal to 80%.

8. The semiconductor device according to claim 1, wherein the oxide semiconductor comprises indium, gallium and zinc, and
   wherein the oxide semiconductor includes a needle-like crystal in a film-thickness direction.

9. The semiconductor device according to claim 1, wherein a concentration of oxygen in the first region is higher than a concentration of oxygen in the second region.

10. The semiconductor device according to claim 1, wherein the first electrode layer and the first counter electrode layer are in a pixel region, and
    wherein the driver circuit is outside the pixel region.

11. The semiconductor device according to claim 1, wherein the same plane is the second substrate.

12. A semiconductor device comprising:
    a first electrode layer, a second electrode layer, a third electrode layer, and a fourth electrode layer over a first substrate;
    a liquid crystal layer over the first electrode layer and the second electrode layer;
    a first counter electrode layer and a second counter electrode layer over the liquid crystal layer;
    a second substrate over the first counter electrode layer and the second counter electrode layer; and
    a transistor in a driver circuit, the transistor comprising:
       a channel formation region including an oxide semiconductor, the channel formation region comprising a first region; and
    a source region including the oxide semiconductor, the source region comprising a second region,
    wherein the third electrode layer is electrically connected to the first counter electrode layer through a first conductive particle,
    wherein the fourth electrode layer is electrically connected to the first counter electrode layer through a second conductive particle,
    wherein the first electrode layer is a pixel electrode formed in a position overlapping with the first counter electrode layer with the liquid crystal layer therebetween,
    wherein the second electrode layer is an electrode layer of the driver circuit formed in a position overlapping with the second counter electrode layer with the liquid crystal layer therebetween,
    wherein the first counter electrode layer and the second counter electrode layer do not overlap with each other,
    wherein the first counter electrode and the second counter electrode are in contact with a same plane,
    wherein the second counter electrode layer has a slit including a bend portion, and
    wherein the second electrode layer is over the transistor and overlaps with the channel formation region of the transistor.

13. The semiconductor device according to claim 12, wherein a potential of the first counter electrode layer is different from a potential of the second counter electrode layer.

14. The semiconductor device according to claim 12, wherein the first electrode layer is electrically connected to a thin film transistor in a pixel portion.

15. The semiconductor device according to claim 12, wherein the second electrode layer is a gate electrode layer of the transistor of the driver circuit.

16. The semiconductor device according to claim 12, further comprising:
    a fifth electrode layer over the first substrate; and
    a third conductive particle between the fourth electrode layer and the second counter electrode layer,
    wherein the fifth electrode layer is electrically connected to the second counter electrode layer through the third conductive particle.

17. The semiconductor device according to claim 12, wherein a concentration of oxygen in the first region is higher than a concentration of oxygen in the second region.

18. The semiconductor device according to claim 12, wherein the first electrode layer and the first counter electrode layer are in a pixel region, and
    wherein the driver circuit is outside the pixel region.

19. The semiconductor device according to claim 12, wherein the same plane is the second substrate.

* * * * *